(12) United States Patent
Itou et al.

(10) Patent No.: US 10,018,139 B2
(45) Date of Patent: Jul. 10, 2018

(54) FUEL INJECTION DEVICE

(71) Applicant: DENSO CORPORATION, Kariya, Aichi-pref. (JP)

(72) Inventors: Takamasa Itou, Kariya (JP); Wakichi Kondoh, Kariya (JP); Shinichiro Kawakita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/175,435

(22) Filed: Jun. 7, 2016

(65) Prior Publication Data
US 2016/0363081 A1   Dec. 15, 2016

(30) Foreign Application Priority Data

Jun. 11, 2015  (JP) .................................. 2015-118321
Sep. 16, 2015  (JP) .................................. 2015-182982
(Continued)

(51) Int. Cl.
*F02D 41/26*   (2006.01)
*F02D 41/38*   (2006.01)
(Continued)

(52) U.S. Cl.
CPC ......... *F02D 41/263* (2013.01); *F02D 35/023* (2013.01); *F02D 35/028* (2013.01);
(Continued)

(58) Field of Classification Search
CPC ...... F02D 41/263; F02D 41/40; F02D 41/402; F02D 35/023; F02D 41/38; F02D 35/028;
(Continued)

(56) References Cited

U.S. PATENT DOCUMENTS

| | | | |
|---|---|---|---|
| 6,141,960 A * | 11/2000 | Takami | B01D 53/9495 |
| | | | 123/431 |
| 2004/0194756 A1* | 10/2004 | Hotta | F02D 41/3836 |
| | | | 123/299 |

(Continued)

FOREIGN PATENT DOCUMENTS

| | | |
|---|---|---|
| JP | 11-153056 | 6/1999 |
| JP | 11-159385 | 6/1999 |

(Continued)

*Primary Examiner* — Joseph Dallo
(74) *Attorney, Agent, or Firm* — Nixon & Vanderhye PC

(57) ABSTRACT

A fuel injection device is used in an internal combustion engine having a combustion chamber partitioned by a cylinder head, a cylinder, and a piston crown surface so that at least one of the amount of NOx, Pmax, and a thermal efficiency $\eta$ is maintained at a predetermined value. The fuel injection device includes a fuel injection change unit. The fuel injection change unit virtually divides the combustion chamber into N number of combustion zones where N is a natural number of 2 or more, and can change a fuel injection method according to the respective combustion zones. The fuel injection change unit divides the combustion chamber into the N number of combustion zones, thereby being capable of eliminating a difference of heat in the respective combustion zones, and precisely controlling an in-cylinder pressure P in the combustion chamber. As a result, the amount of NOx and the thermal efficiency can be optimized. Therefore, both of a reduction in the amount of NOx and the high thermal efficiency can be achieved.

15 Claims, 71 Drawing Sheets

(30) Foreign Application Priority Data

Nov. 13, 2015 (JP) .................................. 2015-223304
Dec. 24, 2015 (JP) .................................. 2015-250811
Jan. 27, 2016 (JP) .................................. 2016-13153

(51) Int. Cl.

| | |
|---|---|
| F02D 41/40 | (2006.01) |
| F02D 35/02 | (2006.01) |
| F02M 61/18 | (2006.01) |
| F02M 45/08 | (2006.01) |
| F02M 45/12 | (2006.01) |
| F02M 47/02 | (2006.01) |
| F02D 41/14 | (2006.01) |
| F02M 45/02 | (2006.01) |

(52) U.S. Cl.
CPC ....... *F02D 41/1401* (2013.01); *F02D 41/146* (2013.01); *F02D 41/1406* (2013.01); *F02D 41/38* (2013.01); *F02D 41/40* (2013.01); *F02D 41/402* (2013.01); *F02M 45/086* (2013.01); *F02M 45/12* (2013.01); *F02M 47/027* (2013.01); *F02M 61/182* (2013.01); *F02M 61/1886* (2013.01); *F02M 61/1893* (2013.01); *F02D 35/024* (2013.01); *F02D 41/1446* (2013.01); *F02D 41/1448* (2013.01); *F02D 41/1463* (2013.01); *F02D 41/1466* (2013.01); *F02D 41/1498* (2013.01); *F02D 41/401* (2013.01); *F02D 2041/1412* (2013.01); *F02D 2250/31* (2013.01); *F02M 45/02* (2013.01); *F02M 2200/46* (2013.01); *Y02T 10/44* (2013.01)

(58) Field of Classification Search
CPC ............. F02D 41/1401; F02D 41/1406; F02D 41/146; F02D 2250/31; F02D 41/401; F02D 41/1498; F02D 35/024; F02M 45/02

See application file for complete search history.

(56) References Cited

U.S. PATENT DOCUMENTS

| | | | |
|---|---|---|---|
| 2005/0027431 A1* | 2/2005 | Todoroki | F01N 3/0821 701/105 |
| 2005/0229898 A1* | 10/2005 | Kikutani | F02D 41/20 123/299 |
| 2007/0256405 A1* | 11/2007 | Gabe | B01D 53/9431 60/274 |
| 2010/0139614 A1* | 6/2010 | Mori | F02D 41/403 123/299 |
| 2010/0170475 A1 | 7/2010 | Okumura et al. | |
| 2011/0106408 A1* | 5/2011 | Morimoto | F02D 41/1401 701/103 |
| 2016/0138486 A1* | 5/2016 | Lee | F02D 41/006 701/104 |

FOREIGN PATENT DOCUMENTS

| | | |
|---|---|---|
| JP | 2008-175078 | 7/2008 |
| JP | 4148009 | 9/2008 |
| JP | 2009-85117 | 4/2009 |
| JP | 4396006 B2 * | 1/2010 |
| JP | 2010-174737 | 8/2010 |

* cited by examiner

FIG. 17A LOW INJECTION RATE
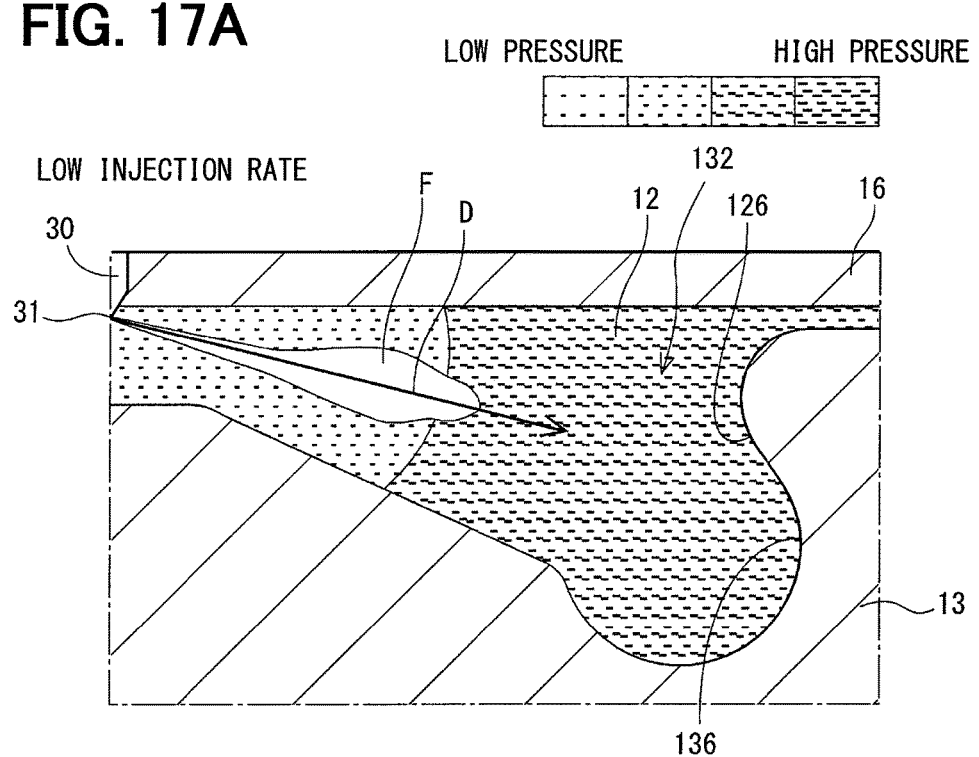
FIG. 17B HIGH INJECTION RATE
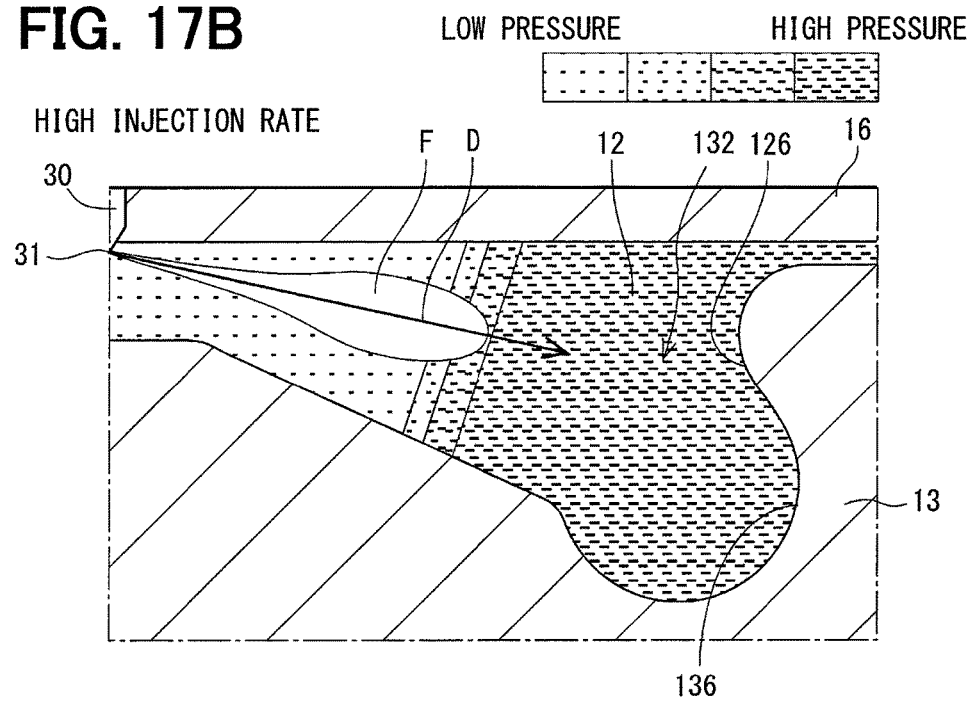

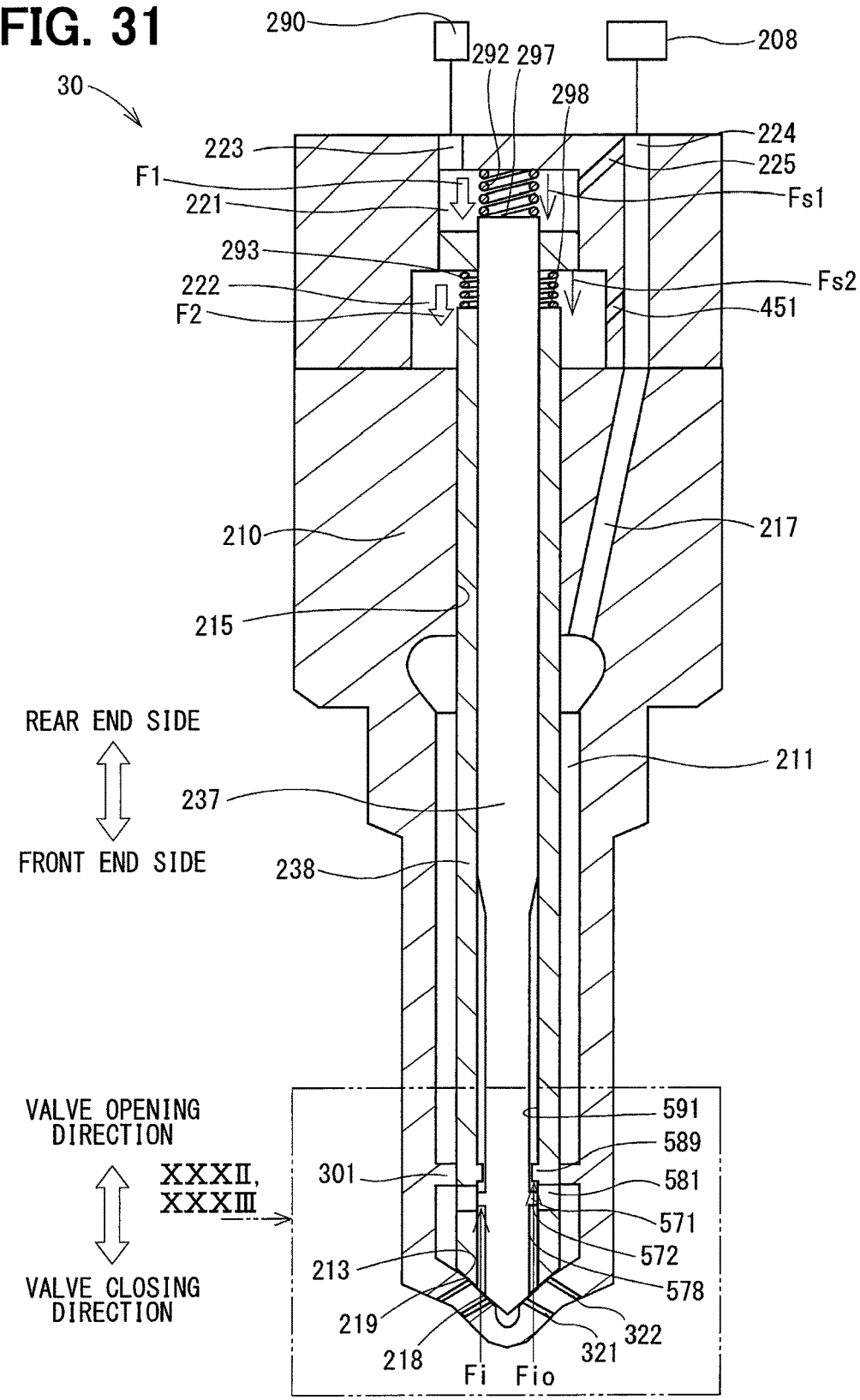

REAR END SIDE ⇕ FRONT END SIDE

VALVE OPENING DIRECTION ⇕ VALVE CLOSING DIRECTION

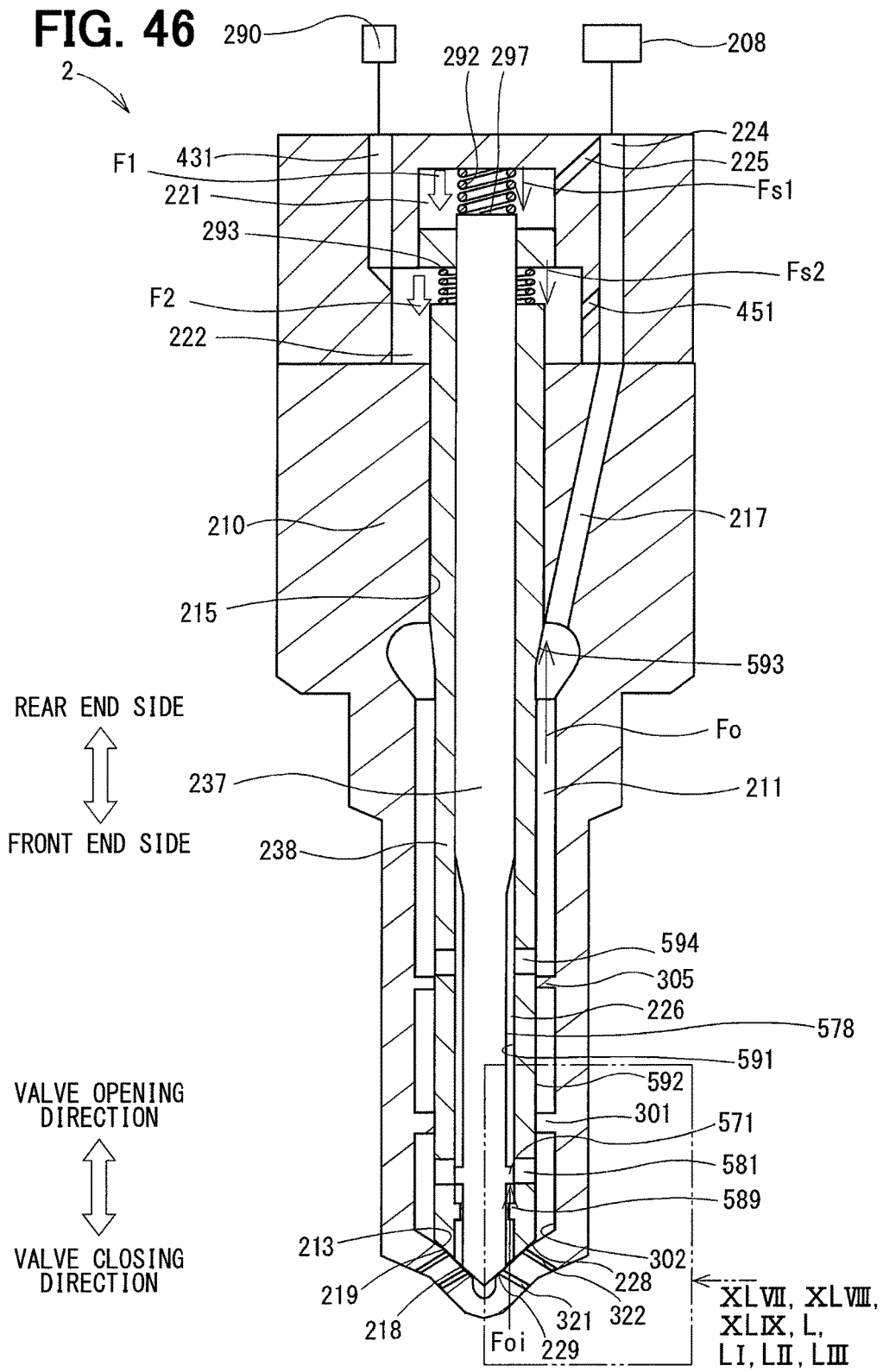

REAR END SIDE ⇕ FRONT END SIDE

VALVE OPENING DIRECTION ⇕ VALVE CLOSING DIRECTION

REAR END SIDE
⇕
FRONT END SIDE

VALVE OPENING DIRECTION
⇕
VALVE CLOSING DIRECTION

REAR END SIDE ⇅ FRONT END SIDE

VALVE OPENING DIRECTION ⇅ VALVE CLOSING DIRECTION

FIG. 65
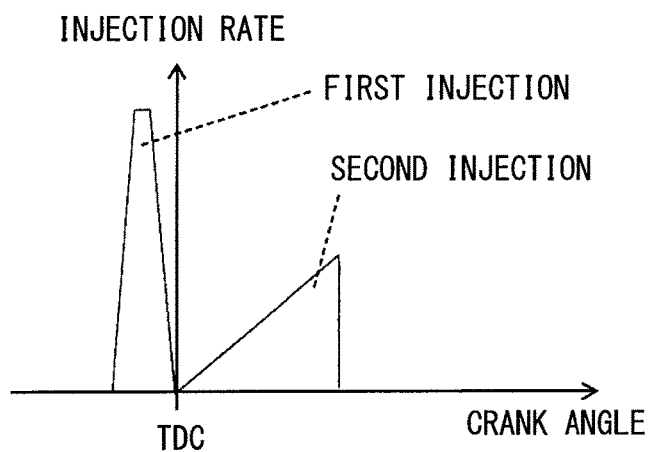
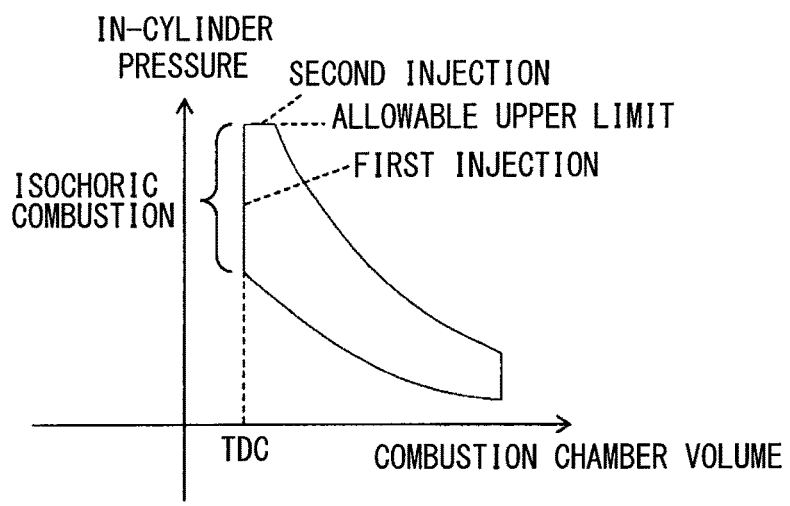

FUEL INJECTION DEVICE

CROSS REFERENCE TO RELATED APPLICATION

This application is based on Japanese Patent Application No. 2015-118321 filed on Jun. 11, 2015, No. 2015-223304 filed on Nov. 13, 2015, No. 2015-182982 filed on Sep. 16, 2015, No. 2015-50811 filed on Dec. 24, 2015 and No. 2016-13153 filed on Jan. 27, 2016, the disclosures of which are incorporated herein by reference.

TECHNICAL FIELD

The present disclosure relates to a fuel injection device for supplying a fuel to an engine system such as a diesel engine.

BACKGROUND

Up to now, a technique for detecting an actual combustion state of an internal combustion engine with the use of an in-cylinder pressure sensor, and subjecting the detected combustion state to various corrections, to thereby control a combustion engine has been known. As disclosed in Patent Literature 1, a technique for performing an external exhaust gas recirculation for introducing a relatively large amount of exhaust gas into a cylinder for the purpose of reducing the amount of nitrogen oxide (NOx) to be generated in a diesel engine has been known.

In the diesel engine, it is allegedly difficult to achieve all of a high thermal efficiency, a low fuel consumption, a reduction in the amount of NOx, a reduction in the amount of hydrocarbon (HC), the suppression of vibration noise, and the limitation of an maximum in-cylinder pressure. In particular, it is difficult to achieve both of the high thermal efficiency and the reduction in the amount of NOx. In the configuration of Patent Literature 1, the maximum in-cylinder pressure or a maximum change rate of the in-cylinder pressure is detected, and a fuel injection timing and the amount of exhaust gas (EGR amount) are corrected to obtain a desired maximum in-cylinder pressure and a desired maximum change rate of the in-cylinder pressure, thereby being capable of reducing the amount of NOx.

As described above, in the case of using the external exhaust gas recirculation, because a low temperature combustion is generated, the maximum in-cylinder pressure can be controlled to be reduced, and the amount of NOx is reduced. However, a specific heat ratio of the cylinder is lowered by impurities contained in the exhaust gas, and the thermal efficiency is lowered. In this way, the reduction in the amount of NOx has a contradictory relationship with the high thermal efficiency.

Up to now, a fuel injection device of a twin needle type which adjusts the amount of lift of an outer needle and an inner needle coaxially housed in a housing to perform the injection control of a fuel has been known.

On the other hand, a diesel cycle and a Sabathe cycle having a constant pressure heating process are thermal cycles used in a compression ignition engine such as a medium-speed or high-speed diesel engine, and have excellent thermal efficiency. For that reason, the diesel cycle and the Sabathe cycle can take out a large amount of energy with a small amount of fuel, and therefore are small in carbon dioxide emission and environmentally friendly. Therefore, in order to create a favorable combustion state due to the diesel cycle and the Sabathe cycle, it is necessary to control the fuel injection amount with high precision.

In a fuel combustion device of a twin needle type in the configuration of Patent Literature 2, pressures on a back side of an inner needle and an outer needle are adjusted to control the fuel injection amount. For that reason, the fuel injection amount can be changed in two stages of the inner needle and the outer needle. However, because the fuel injection amount of the fuel injection device thus configured is determined according to a minimum flow channel area of a first injection hole and a minimum flow channel area of a second injection hole, the fuel injection amount is converged to a constant amount. When a certain amount of fuel injection amount is given, combustion is not promoted during a constant pressure heating process of the diesel cycle and the Sabathe cycle. This causes a problem that when a piston in a combustion chamber of an engine is retracted, in other words, when a volume in the combustion chamber expands, the pressure decreases in spite of the constant pressure heating process, and an excellent combustion state is not obtained.

In the diesel engine, because the fuel injected from a fuel injector is self-injected due to a compression in the combustion chamber, a compression ratio is high as compared with a gasoline engine, and a peak of the in-cylinder pressure in the combustion chamber, which is generated by the combustion of fuel, is increased. When the peak of the in-cylinder pressure (hereinafter referred to as "maximum in-cylinder pressure Pmax") exceeds an allowable upper limit pressure, there is a concern that the reliability of the engine is lowered. For that reason, it is conceivable that the strength of the engine is improved to increase the allowable upper limit pressure "Pulim". However, when the strength of the engine is improved, there is a concern that the weight and cost of the engine are increased.

Under the circumstances, as disclosed in Patent Literature 3, in an operation region on a high load side where a maximum in-cylinder pressure Pmax is increased, a fuel injection control for executing a rising injection pattern in which a fuel injection rate is gradually increased is performed. As a result, the in-cylinder pressure can be gradually increased according to an expansion of a combustion chamber volume in an expansion stroke, and the maximum in-cylinder pressure Pmax can be reduced.

However, when the fuel injection rate is gradually increased as disclosed in Patent Literature 3, a long time is required until the in-cylinder pressure reaches the maximum in-cylinder pressure Pmax, and the thermal efficiency is lowered. As a result, a power of the diesel engine is also decreased.

[Patent Literature 1] JP-2010-174737-A
[Patent Literature 2] JP-2009-062920-A
[Patent Literature 3] JP-2009-5117-A

SUMMARY

An object of the present disclosure is to provide a fuel injection device that can achieve both of a reduction in the amount of NOx and a high thermal efficiency.

The fuel injection device according to the present disclosure is used in an internal combustion engine having a combustion chamber partitioned by a cylinder head, a cylinder, and a crown surface of a piston so that at least one of the amount of nitrogen oxide, a maximum in-cylinder pressure, and a thermal efficiency becomes a predetermined value.

The fuel injection device includes a fuel injector, an exhaust valve, and a fuel injection change unit.

The fuel injector injects a fuel into the combustion chamber toward a cavity provided in a piston crown surface.

The exhaust valve can open or close an exhaust port of the cylinder head.

The fuel injection change unit virtually divides the combustion chamber into N number of combustion zones where N is a natural number of 2 or more, and can change a fuel injection method according to the respective combustion zones.

The fuel injection change unit divides the combustion chamber 12 into the N number of combustion zones, thereby being capable of eliminating a difference of heat in the respective combustion zones, and precisely controlling an in-cylinder pressure P in the combustion chamber 12. As a result, the amount of NOx and the thermal efficiency can be optimized. Therefore, both of the reduction in the amount of NOx and the high thermal efficiency can be achieved.

Another object of the present disclosure is to provide a fuel injection device that controls a fuel injection amount with high precision, and suppresses a pressure drop in a constant pressure heating process in an engine using a thermal cycle having the constant pressure heating process.

The present disclosure provides a fuel injection device that controls a fuel injection amount in a combustion chamber of an engine in an engine system, including a housing, an outer needle, and an inner needle.

The housing includes a first injection hole from which the fuel is injected, a second injection hole located on a rear end side of the first injection hole from which the fuel is injected, and a housing flange on a bottomed cylindrical distal part.

The housing flange protrudes from an inner surface of the housing inwardly in a radially inward direction.

The outer needle is slidably housed in the housing, can open or close the second injection hole while sliding in an axial direction, and includes at least one communication hole that communicates an inner surface of a sidewall with an outer surface of the side wall, in the side surface.

The communication hole includes an inlet surface on an outer peripheral side of the outer needle and an outlet surface of an inner peripheral side of the outer needle, and communicates the inlet surface with the outlet surface. The communication hole is provided on a distal side of the housing flange when the outer needle closes the injection hole.

The inner needle is slidably housed in the outer needle, can open or close the first injection hole while sliding in the axial direction, and includes an inner needle flange.

The inner needle flange protrudes from the outer surface of the inner needle outwardly in the radially inward direction. The inner needle flange overlaps with the outlet surface of the communication hole when the inner needle closes the injection hole.

When the inner needle or the outer needle is slid, a first flow channel, a second flow channel, a third flow channel, an outlet hole flow channel, and an inlet hole flow channel are defined by the housing, the outer needle, and the inner needle.

The first flow channel is defined between the outer surface of the inner needle and an inner surface of the outer needle, and the second flow channel is defined between an inner surface of the housing and an outer surface of the outer needle. The third flow channel is defined between the outer surface of the inner needle and the inner surface of the housing.

The outlet hole flow channel is defined between the inner needle flange and the outlet surface of the communication hole. The inlet hole flow channel is defined between the housing flange and an inlet surface of the communication hole. The first flow channel communicates the outlet hole flow channel with the inlet hole flow channel when the inner needle and the outer needle close the injection holes.

When the inner needle or the outer needle is slid, that is, when the inner needle or the outer needle opens or closes the injection hole, the inner needle flange passes along the outlet surface of the communication hole, and closes and opens the outlet hole flow channel. In this situation, a flow channel area of the outlet hole flow channel is changed.

The inner needle flange is formed to set a change rate of a flow channel area in the outlet hole flow channel to be smaller than the change rate of the flow channel area in the first flow channel when the inner needle is slid. For that reason, the diameters of the housing, the inner needle, the inner needle flange, the outer needle, and the communication hole are set.

The outlet hole flow channel is formed to set the flow channel area of the outlet hole flow channel to be smaller than the flow channel area of the first injection hole when the inner needle and the outer needle close the injection holes. This is because when the flow channel area of the outlet hole flow channel is larger than the flow channel area of the first injection hole, the fuel injection amount is determined according to the flow channel area of the first injection hole.

When the outer needle is slid, the housing flange passes along the inlet surface of the communication hole, and closes and opens the inlet hole flow channel. In this situation, a flow channel area of the inlet hole flow channel is changed.

The housing flange is formed to set a change rate of a flow channel area in the inlet hole flow channel to be smaller than the change rate of the flow channel area in the second flow channel when the outer needle is slid. For that reason, the diameters of the housing, the housing flange, the inner needle, the outer needle, and the communication hole are set.

In the present disclosure, the inner needle flange and the housing flange change the flow channel areas of the inlet hole flow channel and the outlet hole flow channel of the communication hole by sliding between the inner needle and the outer needle. As a result, a flow channel configuration is increased, and the controllability of the flow channel area is enhanced. Because the fuel injection amount is changed according to the flow channel area, the fuel injection amount can be continuously increased. Therefore, the fuel injection amount can be controlled with high precision, and the pressure drop in the constant pressure heating process of the thermal cycle can be suppressed.

Another object of the present disclosure is to provide a fuel injection device which is capable of restraining a peak of the pressure in a combustion chamber from increasing beyond an allowable upper limit pressure even if the fuel injection amount is larger, and capable of restraining the thermal efficiency and power of a diesel engine from decreasing.

A fuel injection device that is applied to a diesel engine including a fuel injector that injects a fuel directly into a combustion chamber, and a state detection unit that detects a combustion state of the fuel, and causes the fuel injector to execute a fuel injection including a first injection and a second injection when a load of the diesel engine falls within a predetermined high load zone: includes a first injection unit that executes the first injection at an injection rate higher than the injection rate of the second injection, and increases a pressure in the combustion chamber up to a predetermined allowable upper limit pressure; a second injection unit that executes the second injection at the injection rate increasing with a time after the first injection, and maintains the pressure in the combustion chamber at the allowable upper limit pressure; and a control unit that controls an injection state of at least one of the first injection and the second injection to put the combustion state detected by the state detection unit into a predetermined allowable state.

In the fuel injection device, at least the first injection and the second injection are executed when the load of the diesel engine falls within the predetermined high load zone. The injection rate of the first injection is set to be higher than the injection rate of the second injection, and the first injection is executed at the higher injection rate to increase the pressure in the combustion chamber up to the predetermined allowable upper limit pressure. As a result, the diesel engine can early increase the in-cylinder pressure up to the allowable upper limit pressure without damaging the cylinder. After the execution of the first injection, the second injection is executed. The injection rate of the second injection is set to increase with the time with the results that even if a volume in the combustion chamber increases with the time in an expansion stroke, the pressure in the combustion chamber can be maintained at the allowable upper limit pressure. In other words, the thermal efficiency and power of the diesel engine can be restrained from being decreased. Further, the injection state of at least one of the first injection and the second injection is controlled so that the combustion state of the fuel is put into the predetermined allowable state, as a result of which, for example, the generated amount of PM and vibration generated in the diesel engine can be controlled without deviating from the predetermined allowable state.

BRIEF DESCRIPTION OF THE DRAWINGS

FIGS. 17A and 17B are schematic views illustrating a state of a change in a pressure field in the combustion chamber after fuel injection has been performed.

FIG. 31 is a cross-sectional view illustrating an injector according to a third embodiment.

FIG. 46 is a cross-sectional view illustrating an injector according to a fourth embodiment.

FIG. 65 is a graph illustrating a timing (upper graph) when a first injection or a second injection is implemented, and an influence (lower graph) of the combustion of a fuel by the first injection or the second injection on an in-cylinder pressure.

DETAILED DESCRIPTION

Hereinafter, embodiments of the present disclosure will be described with reference to the accompanying drawings. In the description of the multiple embodiments, substantially the same configurations as those in a first embodiment are denoted by identical symbols, and repetitive description will be omitted. A fuel injection device is used in an internal combustion engine to maintain at least one of the amount of NOx which is the emission of generated nitrogen oxide, a maximum in-cylinder pressure, and a thermal efficiency at a predetermined value.

First Embodiment

First, an engine 1 as an internal combustion engine using a fuel injection device 10 according to the present embodiment will be described with reference to FIG. 1.

Figure 1:
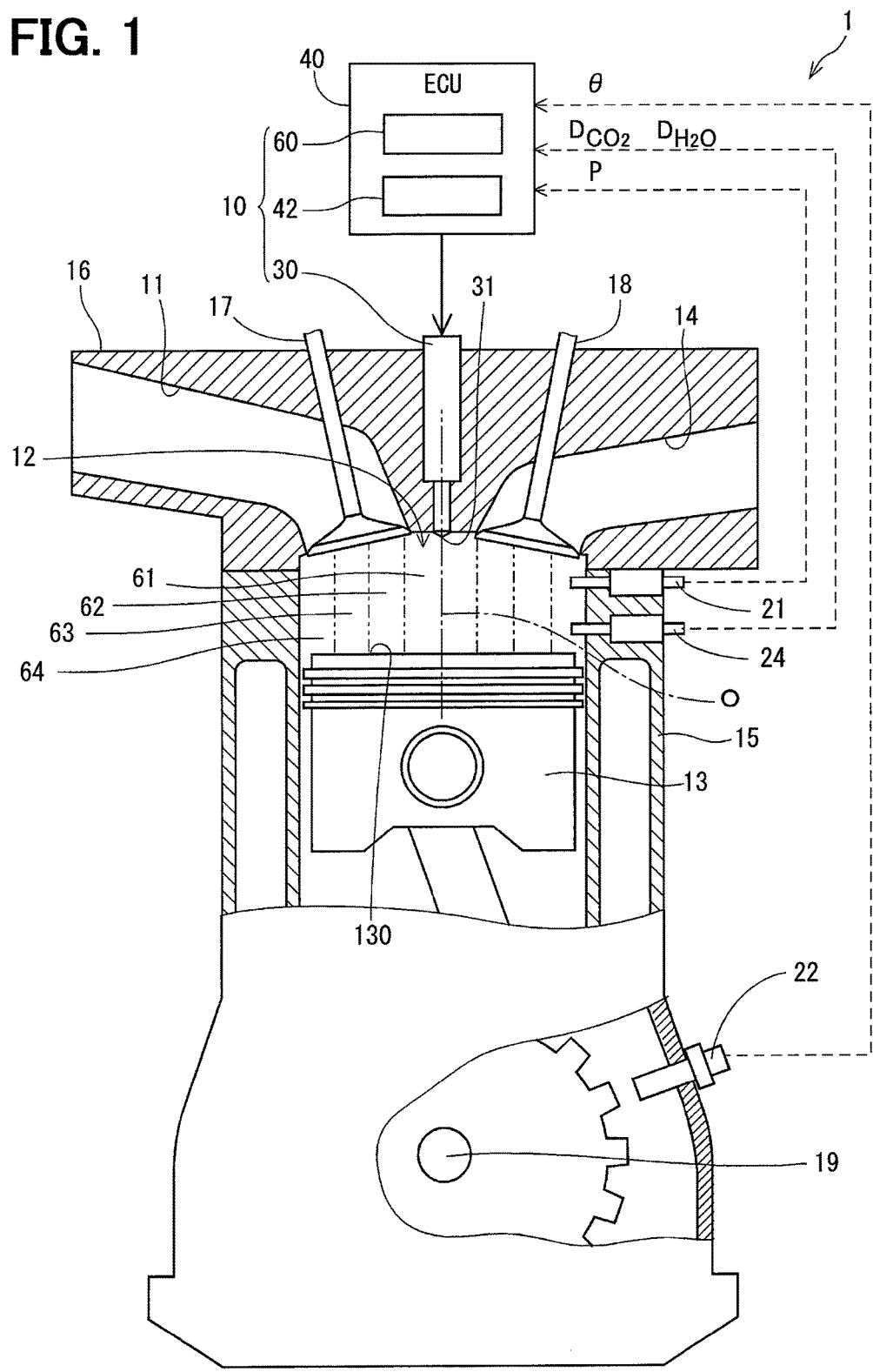
FIG. 1 is a schematic view illustrating an engine using a fuel injection device according to a first embodiment of the present disclosure.

As illustrated in FIG. 1, the engine 1 is, for example, a stroke diesel engine 4 that injects a fuel such as a light oil directly into a combustion chamber 12. When a fuel injector 30 injects the fuel after a piston 13 has reached a top dead center, a mixture of an air and the fuel supplied from an intake manifold 11 is self-ignited and combusted in the combustion chamber 12. The piston 13 is reciprocated by an explosion force at the time of combustion, and a reciprocating motion of the piston 13 is converted into a rotational motion of a crankshaft 19. A combustion gas generated by the combustion is discharged into an atmosphere through an exhaust manifold 14.

The combustion chamber 12 is partitioned by a cylindrical cylinder 15, a piston crown surface 130 disposed in an opening of the cylinder 15, and a lower surface of a cylinder head 16. An intake valve 17 is disposed in an intake port of the cylinder head 16 which is an inlet of the combustion chamber 12. An exhaust valve 18 is disposed in an exhaust port of the cylinder head 16 which is an outlet of the combustion chamber 12. The intake valve 17 and the exhaust valve 18 can be opened or closed by a valve drive mechanism (not shown).

An electronic control unit 40 is configured by a microcomputer including a CPU, a ROM, a RAM, and input and output ports. Hereinafter, the electronic control unit is called "ECU". As indicated by dashed arrows in FIG. 1, signals from various sensors such as an in-cylinder pressure sensor 21, a crank angle sensor 22, and a gas sensor 24 which are fitted to the respective portions of the engine 1 are input to the ECU 40. The in-cylinder pressure sensor 21 detects an in-cylinder pressure P [Pa] in the combustion chamber 12, and the crank angle sensor 22 detects a crank angle θ [degrees] of the crankshaft 19. The gas sensor 24 detects a carbon dioxide concentration $D_{CO2}$ and a water vapor concentration $D_{H2O}$ in the combustion chamber 12. The ECU 40 controls an operating state of the engine 1 on the basis of detection signals from those various sensors.

The fuel injection device 10 according to the present embodiment includes the fuel injector 30, a fuel injection change unit 60, and an injection control unit 42. The fuel injector 30 is installed in the cylinder head 16 so that injection holes 31 are exposed to the combustion chamber 12, and can inject the fuel into the combustion chamber 12 from the injection holes 31. The fuel injection change unit 60 is installed, for example, in the ECU 40, and virtually divides the combustion chamber 12. As with the fuel injection change unit 60, the injection control unit 42 is installed in the ECU 40, and controls a fuel injection rate "Rinj" of the fuel injector 30.

The detail of the fuel injection device 10 will be described with reference to FIGS. 2 and 3.

In the present embodiment, the fuel injector 30 is located in a radially center part of the combustion chamber 12, and injects the fuel from a radially inward side toward a radially outward side of the combustion chamber 12.

Figure 2:
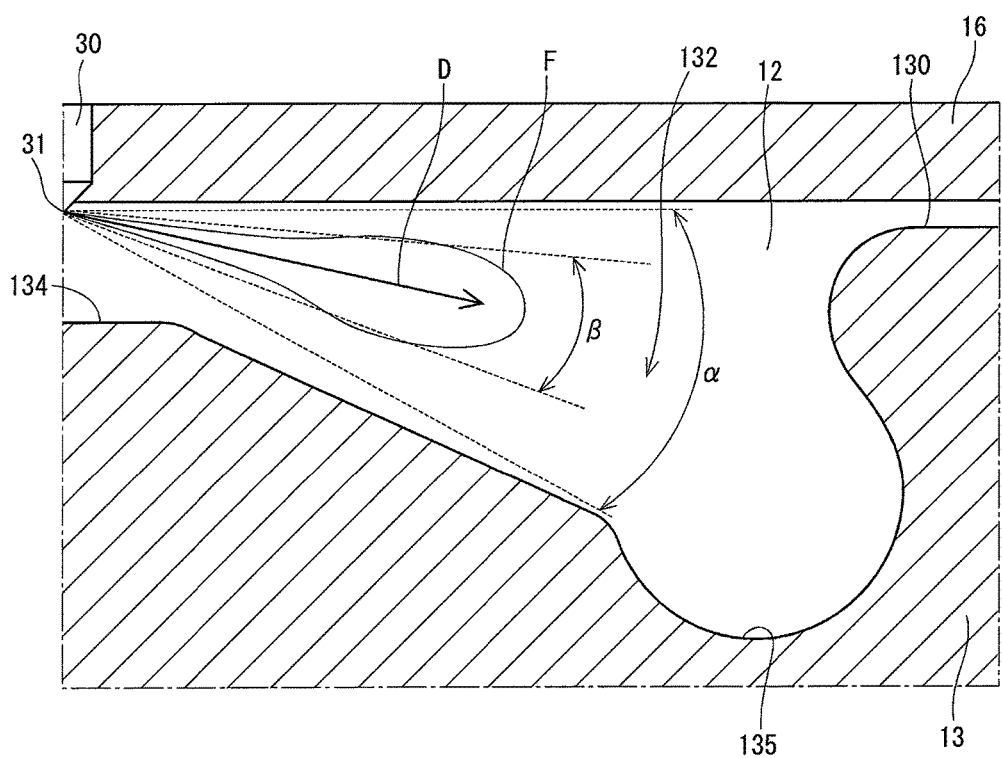
FIG. 2 is an enlarged cross-sectional view illustrating a combustion chamber of an engine.

As illustrated in FIG. 2, an injection direction D of the fuel injector 30 is directed from the radially inward side toward the radially outward side of the combustion chamber 12. The injected fuel is formed into a fuel spray flow F while being mixed with a surrounding air.

A cavity 132 of a reentrant type is provided in the piston crown surface 130 configuring the combustion chamber 12. A central protruding portion 134 and a recessed part 135 that surrounds the central protruding portion 134 are provided in a bottom surface of the cavity 132.

It is assumed that a maximum spray angle at which the fuel spray flow F can reach the recessed part 135 without any collision with the central protruding portion 134 of the cavity 132 is α. It is preferable that a spray angle β caused by the fuel injector 30 is $0.4\alpha \leq \beta \leq \alpha$. For example, the spray angle β caused by the fuel injector 30 is equal to or more than 12 degrees and equal to or less than 30 degrees.

Figure 3:
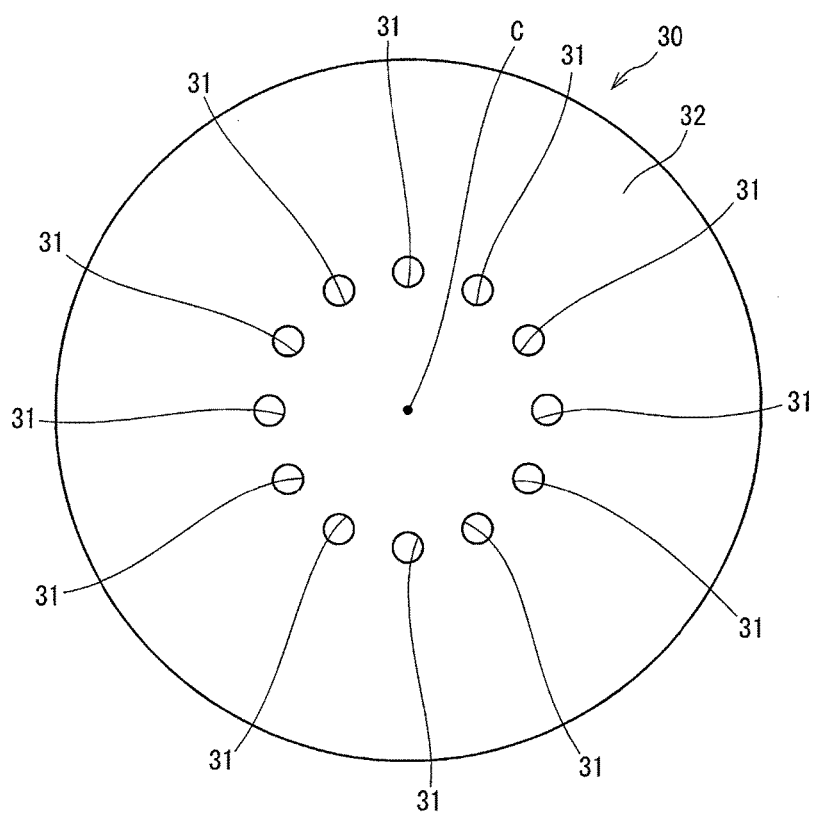
FIG. 3 is a diagram illustrating a distal part of a fuel injector equipped in the fuel injection device according to the first embodiment of the present disclosure.
Figure 4:
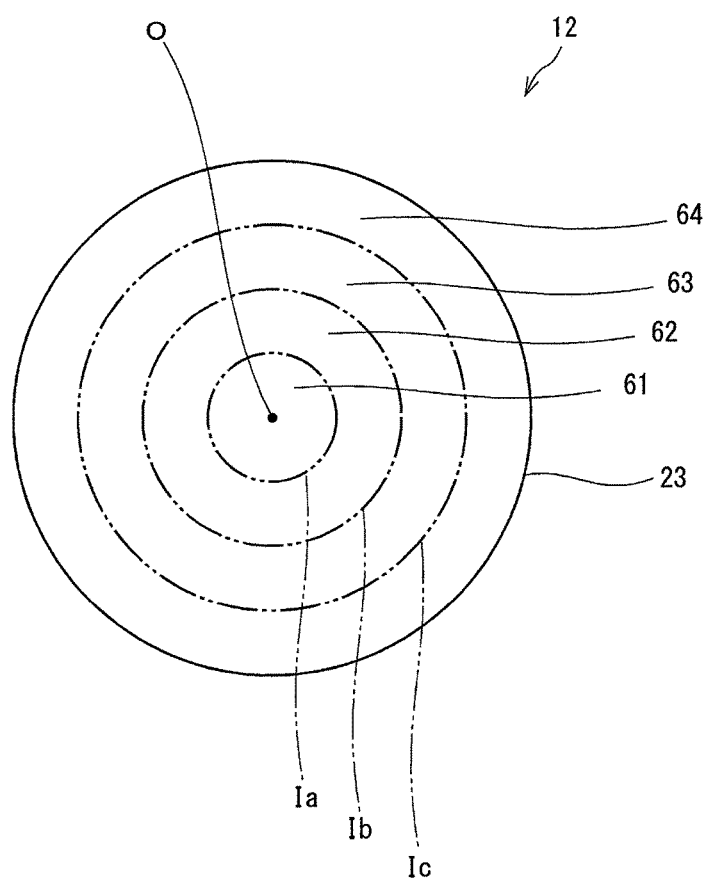
FIG. 4 is a schematic view illustrating a combustion zone according to the first embodiment of the present disclosure.

As illustrated in FIG. 3, the fuel injector 30 according to the present embodiment includes the plurality of injection holes 31 concentrically defined around a center axis C of the fuel injector 30. The fuel spray flow F sprayed from those injection holes 31 radially proceeds into the combustion chamber 12 from the fuel injector 30.

It is preferable that the number of injection holes 31 is, for example, 12 or more. It is preferable that a diameter of the injection holes 31 is, for example, 1.0 mm or less.

The fuel injection change unit 60 divides the combustion chamber 12 into N number of combustion zones, and can change a fuel injection method in the respective combustion zones. It is assumed that N is a natural number of 2 or more. The fuel injection change unit 60 divides a period from a time at which the fuel injector 30 is opened to a time at which the exhaust valve 18 is opened into M number of zone injection periods, and allocates each of the N number of combustion zones to any one of the M number of zone injection periods. M is a natural number of 2 or more. In the present embodiment, for simplification of the description, a value of the natural number N is set to 4, and a value of the natural number M is set to 4.

The fuel injection change unit 60 virtually divides a zone of the combustion chamber 12 into four zones from a radially inward side toward a radially outward side of the combustion chamber 12.

Figure 14:
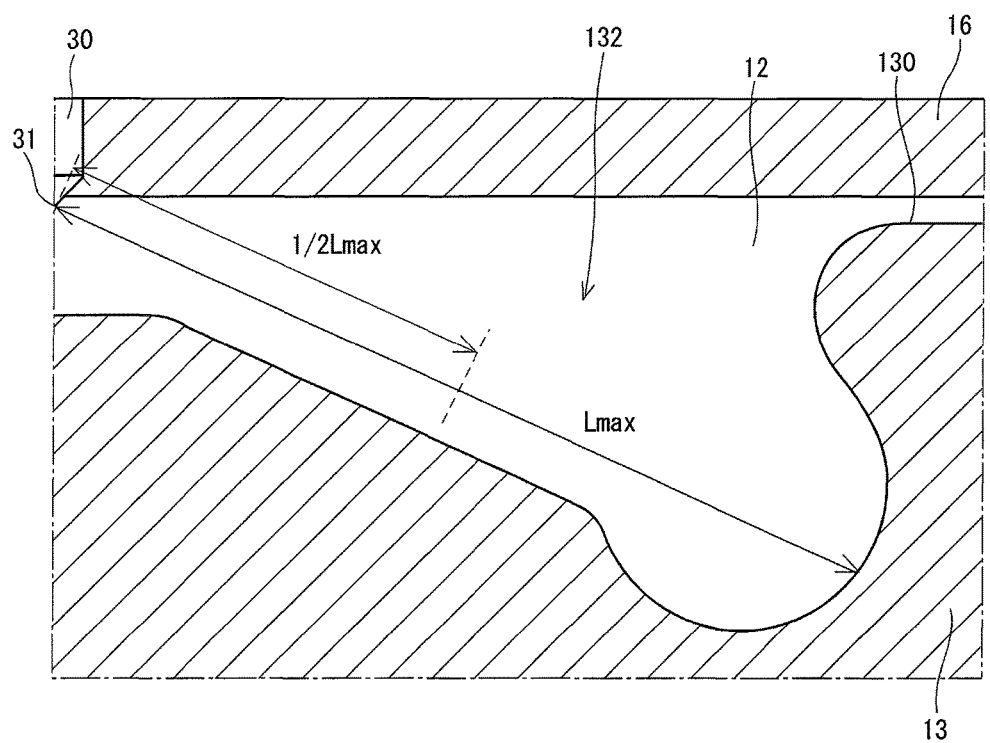
FIG. 14 is a schematic view illustrating a coverage of a fuel spray flow in ignition timing.

As illustrated in FIG. 14, the fuel injection change unit 60 divides the zone of the combustion chamber 12 into first to fourth combustion zones 61 to 64. The first to fourth combustion zones 61 to 64 are partitioned by circumferential virtual circles Ia, Ib, and Ic with a center O and an outer wall surface 23. A diameter of the virtual circle Ia is smaller than a diameter of the virtual circle Ib, and a diameter of the virtual circle Ib is smaller than a diameter of the virtual circle Ic. A diameter of the virtual circle Ic is smaller than a diameter of the combustion chamber 12.

The first combustion zone 61 is partitioned by the virtual circle Ia, and adjacent to the second combustion zone 62. The second combustion zone 62 is partitioned by the virtual circle Ia and the virtual circle Ib, and set between the first combustion zone 61 and the third combustion zone 63. The third combustion zone 63 is partitioned by the virtual circle Ib and the virtual circle Ic, and set between the second combustion zone 62 and the fourth combustion zone 64. The fourth combustion zone 64 is partitioned by the virtual circle Ic and the outer wall surface 23 of the combustion chamber 12. As described above, the zone of the combustion chamber 12 is divided into four zones from the center O of the combustion chamber 12 toward the outside of the combustion chamber 12 in a radial direction of the combustion chamber 12.

Figure 5:
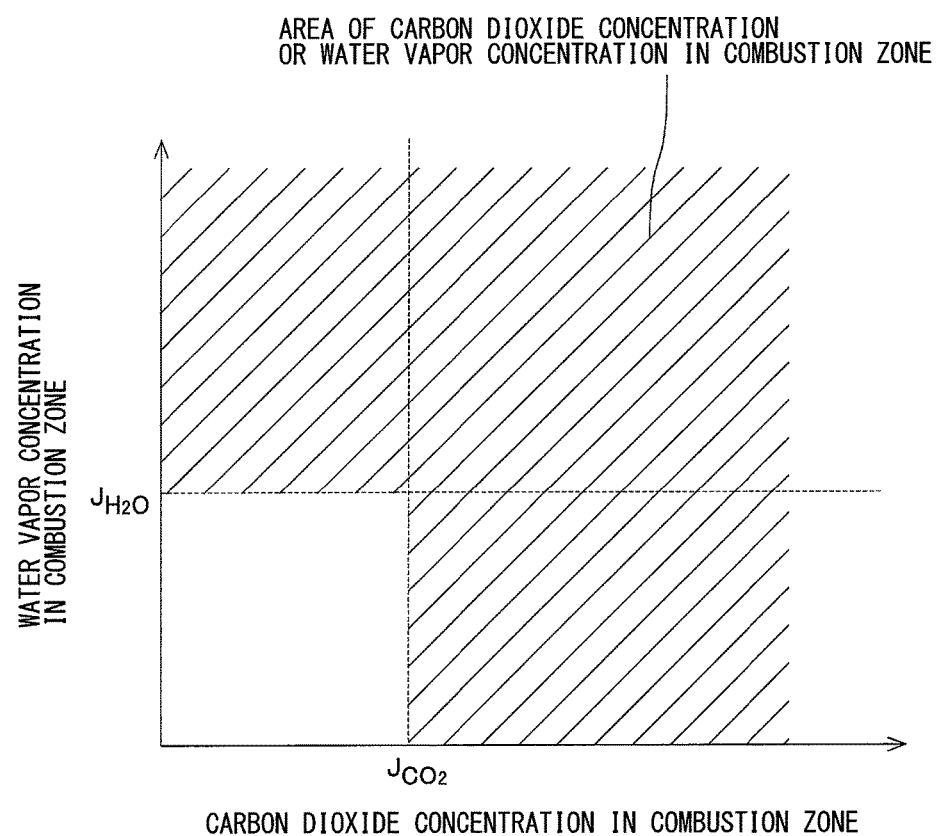
FIG. 5 is a characteristic view illustrating a carbon dioxide concentration and a water vapor concentration of the combustion zone according to the first embodiment of the present disclosure.

As illustrated in FIG. 5, in the first to fourth combustion zones 61 to 64, a carbon dioxide concentration $D_{CO2}$ immediately after the intake valve 17 is closed is set to be larger in value than a predetermined carbon dioxide reference concentration $J_{CO2}$. Alternatively, in the first to fourth combustion zones 61 to 64, a water vapor concentration $D_{H2O}$ is set to be larger in value than a predetermined water vapor reference concentration $J_{H2O}$. The fuel injection change unit 60 divides a zone that is set to a value larger than the carbon dioxide reference concentration $J_{CO2}$ or the water vapor reference concentration $J_{H2O}$ in the combustion chamber 12.

The fuel injection change unit 60 divides a period from a time at which the fuel injector 30 is opened to a time at which the exhaust valve 18 is opened into four zone injection periods. The period from the time at which the fuel injector 30 is opened to a time at which the exhaust valve 18 is opened is expressed by, for example, a crank angle θ. A crank angle at the time when the fuel injector 30 is opened is set to θ0, and a crank angle at the time when the exhaust valve 18 is opened is set to θ4.

Figure 6:
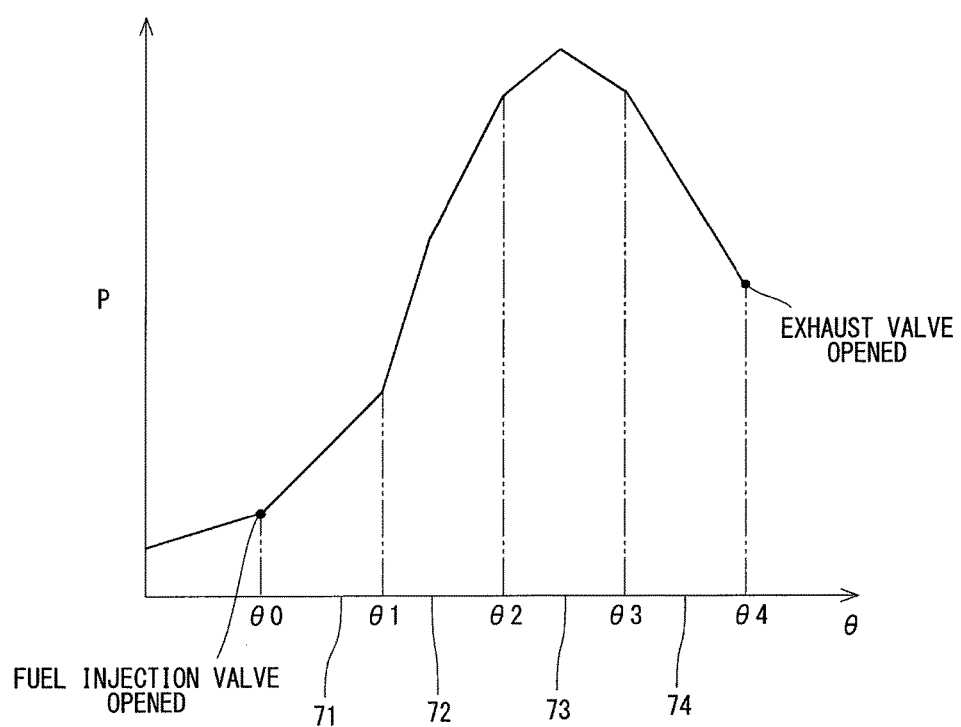
FIG. 6 is a characteristic view illustrating a relationship between a crank angle and an in-cylinder pressure for illustrating a zone injection period according to the first embodiment of the present disclosure.

As illustrated in FIG. 6, a period from the crank angle θ0 to the crank angle θ4 is equally divided into four periods, and the respective crank angles between the crank angle θ0 and the crank angle θ4 are set to crank angles θ1, θ2, and θ3. In first to fourth zone injection periods 71 to 74, the in-cylinder pressure P corresponds to a combustion state in the combustion chamber 12.

It is assumed that the first zone injection period 71 is a period from the crank angle θ0 to the crank angle θ1, and the second zone injection period 72 is a period from the crank angle θ1 to the crank angle θ2. It is assumed that the third zone injection period 73 is a period from the crank angle θ2 to the crank angle θ3, and the fourth zone injection period 74 is a period from the crank angle θ3 to the crank angle θ4.

The fuel injection change unit 60 allocates each of the first to fourth combustion zones 61 to 64 to any period of the first to fourth zone injection periods 71 to 74 on the basis of the combustion state of the first to fourth combustion zones 61 to 64. For example, the fuel injection change unit 60 allocates the first combustion zone 61 to the first zone injection period 71, and allocates the second combustion zone 62 to the second zone injection period 72. Likewise, the fuel injection change unit 60 allocates the third combustion zone 63 to the third zone injection period 73, and allocates the fourth combustion zone 64 to the fourth zone injection period 74. The fuel injection change unit 60 may redundantly allocate the first to fourth combustion zones 61 to 64 to any one period of the first to fourth zone injection periods 71 to 74, for example, so as to allocate the first combustion zone 61 and the second combustion zone 62 to the first zone injection period 71.

The fuel injection change unit 60 changes a fuel injection method in the first to fourth combustion zones 61 to 64. The fuel injection method indicates the injection of fuel with the use of at least one of an injection direction D, a fuel injection rate "Rinj", a fuel injection pressure, a fuel injection frequency, and a fuel injection period. The fuel injection change unit 60 according to the present embodiment changes the fuel injection rate "Rinj" as the fuel injection method. The fuel injection rate "Rinj" is a fuel injection amount per unit time.

The fuel injection change unit 60 changes the fuel injection method in the first to fourth combustion zones 61 to 64 in an arbitrary order. For example, the fuel injection change unit 60 changes the fuel injection method in the first combustion zone 61, and changes the fuel injection method in the second to fourth combustion zones 62 to 64 in order. The fuel injection change unit 60 may change the fuel injection method in the first to fourth combustion zones 61 to 64 in order, and proceed with the fuel combustion in order from the first combustion zone 61.

The fuel injection change unit 60 implements the division of the zone in the combustion chamber 12 in the period from the time at which the fuel injector 30 is opened to the time at which the exhaust valve 18 is opened, multiple times. For example, the fuel injection change unit 60 again divides the zones in the combustion chamber 12 which have been divided into the first to fourth combustion zones 61 to 64 into four zones. In this situation, the fuel injection change unit 60 may change areas of the regions of the first to fourth combustion zones 61 to 64 which have been again divided, or may change the number of divisions from the four first to fourth combustion zones 61 to 64. As described above, the fuel injection change unit 60 can divide the combustion chamber 12 into N number of combustion zones, and change the fuel injection method in each of the combustion zones.

Up to now, in the diesel engine, it is difficult to achieve both of the high thermal efficiency and the reduction in the amount of NOx.

Figure 30:
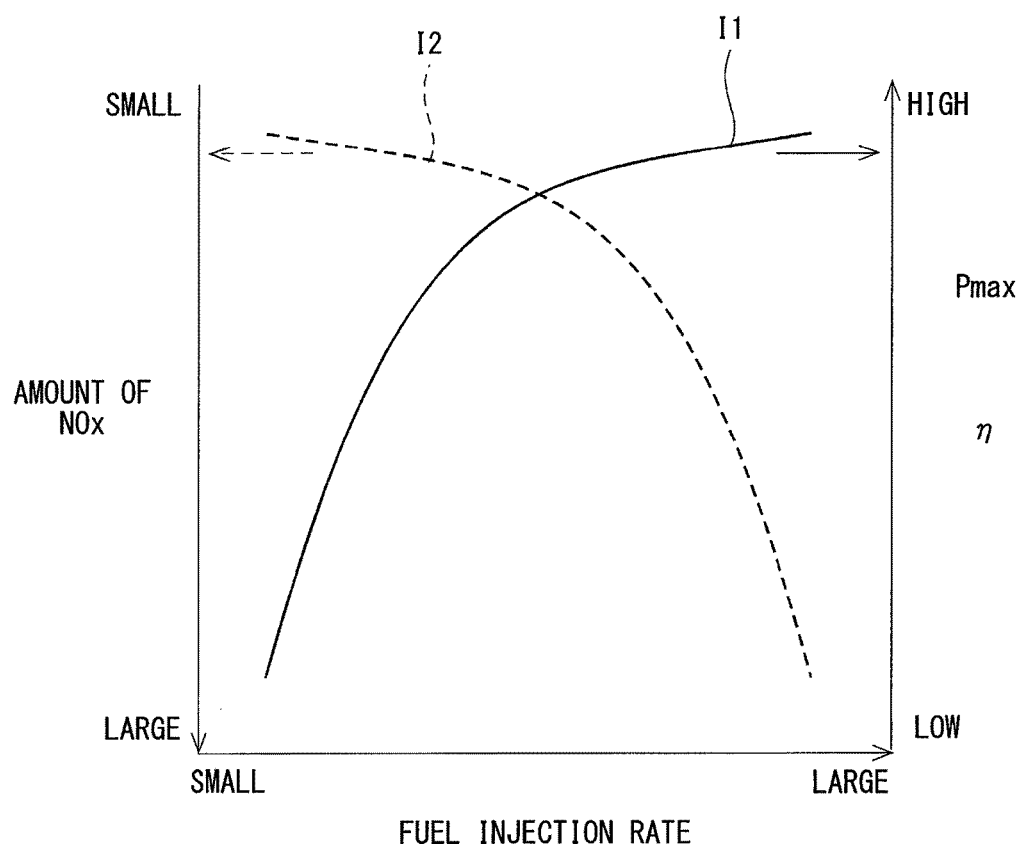
FIG. 30 is a characteristic view illustrating a relationship of a fuel injection rate, a thermal efficiency, a maximum in-cylinder pressure, and the amount of NOx.

As illustrated in FIG. 30, the high thermal efficiency and the reduction in the amount of NOx has a contradictory relationship with each other. A relationship of the fuel injection rate "Rinj", the maximum in-cylinder pressure Pmax, and the thermal efficiency η is indicated by a solid line I1, and a relationship between the fuel injection rate "Rinj" and the amount of NOx is indicated by a dashed line I2.

When the fuel injection rate "Rinj" is increased, because the maximum in-cylinder pressure Pmax in the combustion chamber becomes higher, and a temperature also becomes higher, the combustion of fuel is advanced. For that reason, when the fuel injection rate "Rinj" is increased, the thermal efficiency η is increased. However, in this situation, because the temperature becomes higher, the generation of NOx is facilitated, and the amount of NOx is increased. On the other hand, when the fuel injection rate "Rinj" is decreased, because the temperature becomes lower, the amount of NOx is reduced, but the thermal efficiency η is lowered. Further, in order to decrease the amount of NOx, an external exhaust gas recirculation may be executed. However, a specific heat ratio of the cylinder is decreased by impurities contained in an exhaust gas, and the thermal efficiency η is lowered.

(Advantages)

In the present embodiment, the fuel injection change unit 60 virtually divides the combustion chamber 12 into the first to fourth combustion zones 61 to 64, and can change the fuel injection rate "Rinj" in each of the first to fourth combustion zones 61 to 64. For example, in the fourth combustion zone 64 large in an area of a wall surface, because the fuel is combusted in the vicinity of the wall surface, a cooling loss is increased as compared with the first to third combustion zones 61 to 63. The combustion chamber 12 is divided into the multiple zones to eliminate a difference in the amount of heat in the respective combustion zones, as a result of which the in-cylinder pressure P in the combustion chamber 12 can be controlled with precision.

As a comparative example, the controllability of the in-cylinder pressure P is compared between the present embodiment and a comparative example, with the use of the fuel injection device having no portion corresponding to the fuel injection change unit 60. In order to limit the amount of NOx generated, a limit value may be set in the in-cylinder pressure P, and the limit value of the in-cylinder pressure P is set as an in-cylinder pressure limit value P_lim. The in-cylinder pressure limit value P_lim is an optimum value that achieves both of the thermal efficiency η and the amount of NOx.

Figure 7:
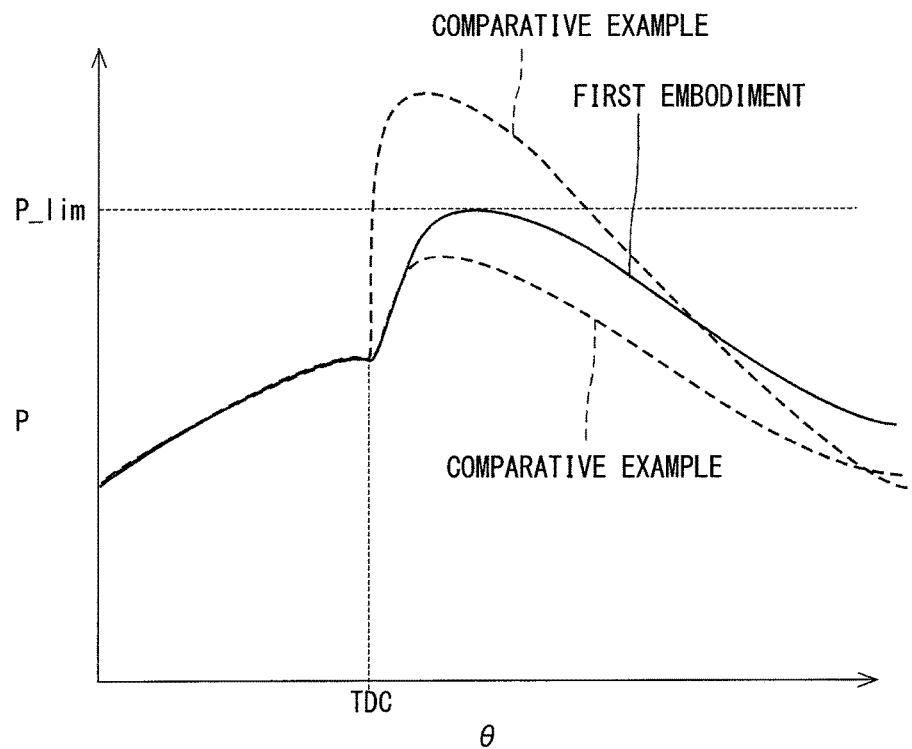
FIG. 7 is a characteristic view illustrating a relationship between the crank angle and the in-cylinder pressure according to the first embodiment of the present disclosure.

As illustrated in FIG. 7, in the comparative example, the in-cylinder pressure P may exceed or fall below the in-cylinder pressure limit value P_lim. In the present embodiment, the in-cylinder pressure P is a value in the vicinity of a limit without exceeding the in-cylinder pressure limit value P_lim. The in-cylinder pressure P can be brought closer to the in-cylinder pressure limit value P_lim, thereby being capable of optimizing the amount of NOx and the thermal efficiency η. Therefore, both of the amount of NOx and the high thermal efficiency can be achieved. In the figure, TDC is an abbreviation of top dead center, and indicates the top dead center.

The fuel injection change unit 60 divides a period from a time at which the fuel injector 30 is opened to a time at which the exhaust valve 18 is opened into four first to fourth zone injection periods 71 to 74. With the above configuration, because the in-cylinder pressure P in the first to fourth combustion zones 61 to 64 can be discriminated, the fuel injection method compatible with the respective first to fourth combustion zones 61 to 64 can be performed.

In general, in the fuel injection device applied to the internal combustion engine such as a diesel engine, the fuel injector injects the fuel from the inside of the combustion chamber toward the outside. As described above, when the injected fuel is combusted in the vicinity of the wall surface of the combustion chamber, the combusted high-temperature gas may contact with the wall surface. In this situation, the heat is radiated from the combustion chamber, the cooling loss is increased, and the thermal efficiency η is lowered. For example, in JP-A-2008-15078 as a patent literature, a heat insulating layer is placed on the wall surface that partitions the combustion chamber, to thereby reduce the cooling loss.

In the present embodiment, the fuel injection device 10 can achieve both of the high thermal efficiency and the reduction in the amount of NOx while reducing the cooling loss.

Hereinafter, a description will be given of a specific control method for achieving both of the high thermal efficiency and the reduction in the amount of NOx while reducing the cooling loss by the fuel injection device 10 according to the present embodiment. In the present embodiment, the advance of the fuel spray flow F is suppressed, to thereby prevent the fuel spray flow F from reaching the wall surface of the combustion chamber 12. As a result, the fuel is combusted in a center part of the combustion chamber 12. Hereinafter, the combustion in the center part of the combustion chamber 12 is called "center combustion".

Figure 8:
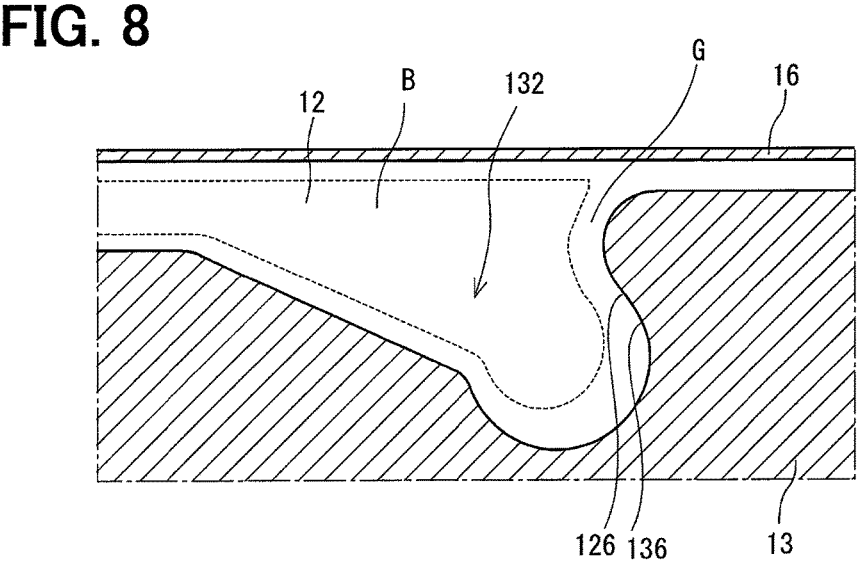
FIG. 8 is a schematic view illustrating a center combustion according to the first embodiment of the present disclosure.

As illustrated in FIG. 8, when the center combustion is performed, a combusted gas layer B of high temperature is formed in the center part of the combustion chamber 12, and a thermal insulation gas layer G produced by an uncombusted air is formed in an outer periphery of the combustion chamber 12. With the presence of the thermal insulation gas layer G, the combusted gas layer B of high temperature can be restrained from contacting with the wall surface of the combustion chamber 12, and the cooling loss can be reduced.

In particular, in the present embodiment, the combusted gas is restrained from contacting with an inner peripheral surface 126 of the combustion chamber 12, in other words, a wall surface 136 on a radially outward side of the cavity 132.

As the fuel injection method for realizing the center combustion, the injection control unit 42 controls the fuel injector 30 so as to inject the fuel at the fuel injection rate "Rinj" of a set value Rs or more.

Figure 9:
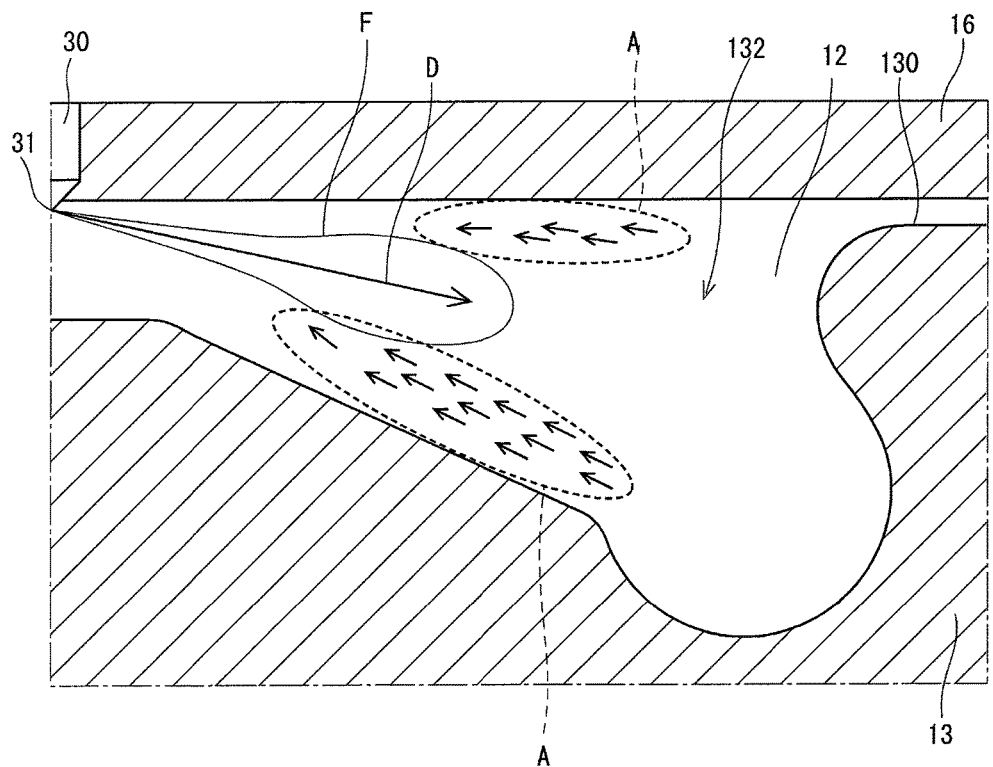
FIG. 9 is a schematic view illustrating an air flow induced in a combustion chamber according to the first embodiment of the present disclosure.

As illustrated in FIG. 9, the set value Rs is set to a value for inducting an air flow A for directing the fuel spray flow F toward a direction opposite to an injection direction D of the fuel injector 30. It is preferable that a flow rate of the air flow A directed in the direction opposite to the injection direction D is, for example, 120 m/s or more.

In the present embodiment, the set value Rs of the fuel injection rate "Rinj" is 290 mm$^3$/ms.

Figure 10:
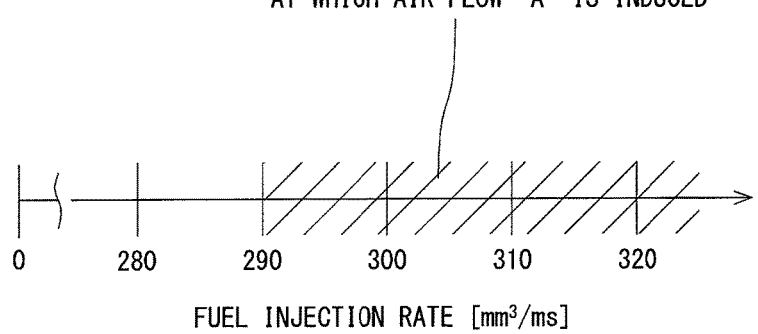
FIG. 10 is a characteristic view illustrating a relationship between the air flow and a fuel injection rate according to the first embodiment of the present disclosure.

It is found that the above air flow A is induced when the fuel is injected at the fuel injection rate "Rinj" of 290 mm$^3$/ms or more in a general combustion chamber of the reentrant type as illustrated in FIG. 10.

In the general diesel engine, even in the case of the high load (the amount of input fuel per cylinder is about 60 mm$^3$), the fuel injection rate "Rinj" in each cylinder is about 40 mm$^3$/ms. The set value Rs of the fuel injection rate "Rinj" in the present embodiment is set to an extremely high value as compared with the related art. As described above, when the fuel injection rate "Rinj" is set to the high value, the maximum in-cylinder pressure Pmax becomes higher, and the thermal efficiency η becomes higher, but the amount of NOx is increased. However, the fuel injection change unit 60 virtually divides the interior of the combustion chamber 12, thereby being capable of controlling the in-cylinder pressure P with precision. For that reason, in particular, when the fuel injection rate "Rinj" is large, the fuel injection device 10 according to the present embodiment exerts the effect of achieving both of the increased thermal efficiency η and the reduction in the amount of NOx.

An upper limit of the fuel injection rate "Rinj" for realizing the center combustion is not particularly limited. In other words, the above air flow A can be induced if the fuel injection rate "Rinj" is equal to or more than the set value Rs. A light oil used as a fuel of the general diesel engine has a property that is solidified at a pressure of about 500 MPa. Hence, when an upper limit for the injection pressure for causing no deterioration such as solidification is determined according to a nature of the fuel to be used, the upper limit of the fuel injection rate "Rinj" is determined according to the upper limit of the injection pressure and the number of injection holes 31 in the fuel injector 30.

Figure 11:
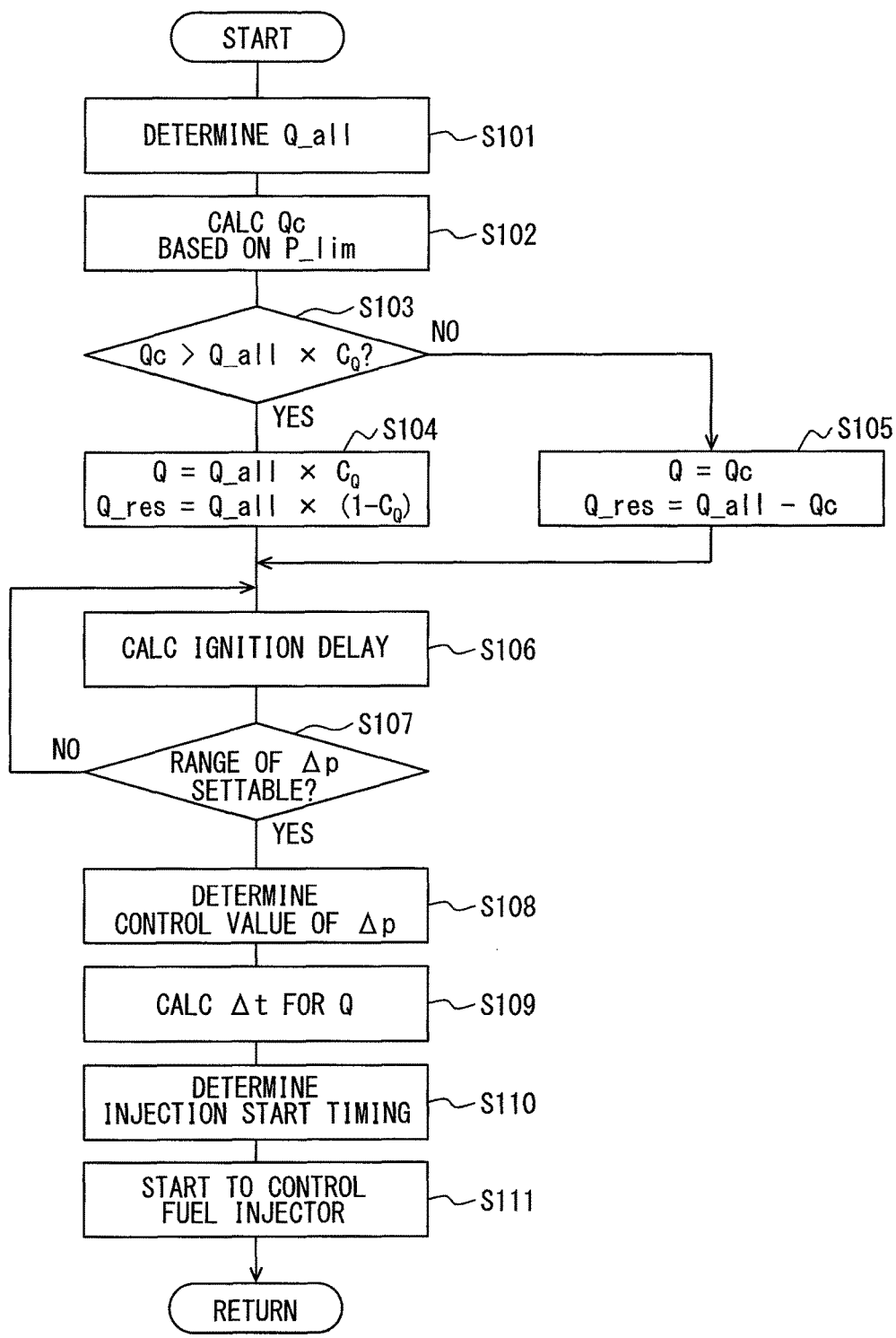
FIG. 11 is a flowchart illustrating processing performed by the fuel injection device according to the first embodiment of the present disclosure.

Subsequently, processing performed by the injection control unit 42 will be described with reference to a flowchart of FIG. 11. For example, the injection control unit 42 starts the processing together with the start of the engine 1. The injection control unit 42 performs the following control, to thereby achieve both of the high thermal efficiency and the reduction in the amount of NOx while reducing the cooling loss.

First, in S101, a total fuel volume Q_all [mm³] which is a fuel volume to be injected per cylinder is determined. The total fuel volume Q_all is a value determined by the ECU 40 on the basis of a load [Nm] of the engine 1 and a rotation speed [rpm] of the engine 1 which are operating states of the engine 1.

In S102, a compatible fuel volume Qc [mm³] determined on the basis of the in-cylinder pressure limit value P_lim is calculated with the fuel volume per cylinder. A specific calculation method of the compatible fuel volume Qc will be described later.

It is assumed that a coefficient by which the total fuel volume Q_all is multiplied is a fuel volume coefficient $C_Q$.

Figure 12:
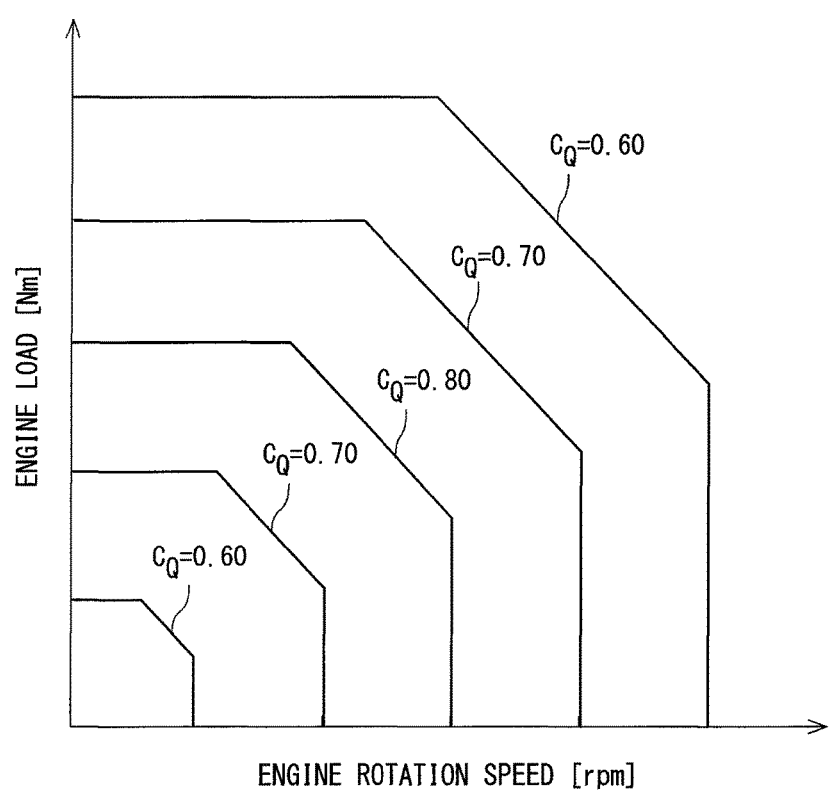
FIG. 12 is a characteristic view illustrating a relationship of an engine rotation speed, an engine load, and a fuel flow rate coefficient according to the first embodiment of the present disclosure.

As illustrated in FIG. 12, the fuel volume coefficient $C_Q$ is a value calculated on the basis of the operating state of the engine 1. The fuel volume coefficient $C_Q$ can be obtained through experiments or simulation.

Figure 13:
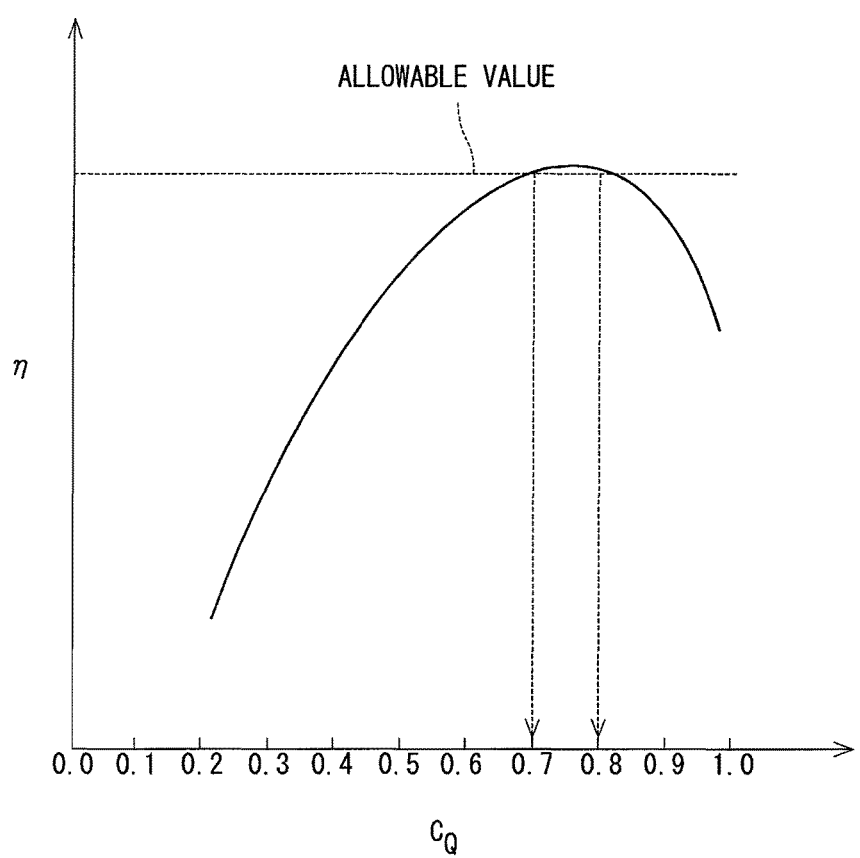
FIG. 13 is a characteristic view illustrating a relationship between a fuel volume coefficient and a thermal efficiency according to the first embodiment of the present disclosure.

As illustrated in FIG. 13, the fuel volume coefficient $C_Q$ in the present embodiment is set to be equal to or more than 0.7, and equal to or less than 0.8, to thereby obtain a relatively high thermal efficiency that exceeds the allowable value of the thermal efficiency η.

In S103, a value obtained by multiplying the total fuel volume Q_all by the fuel volume coefficient $C_Q$ is compared with the compatible fuel volume Qc. When the value obtained by multiplying the total fuel volume Q_all by the fuel volume coefficient $C_Q$ is smaller than the compatible fuel volume Qc, the processing proceeds to S104.

In S104, it is assumed that the value obtained by multiplying the total fuel volume Q_all by the fuel volume coefficient $C_Q$ is an injection fuel volume Q injected per cylinder. A remaining fuel volume Q_res [mm³] per cylinder, which is calculated by subtracting the injection fuel volume Q from the total fuel volume Q_all, is calculated.

On the other hand, when the value obtained by multiplying the total fuel volume Q_all by the fuel volume coefficient $C_Q$ is equal to or more than the compatible fuel volume Qc in S103, the processing proceeds to S105.

In S105, the remaining fuel volume Q_res is calculated assuming that the compatible fuel volume Qc is equal to the injection fuel volume Q.

In S106, it is determined whether an injection pressure difference Δp that meets the following Formulas (1) and (2) can be set, or not, on the basis of a structure or the combustion state of the fuel injector 30.

$$\frac{\pi}{4} d_{INJ}^2 \cdot n_{INJ} \cdot C \sqrt{\frac{2\Delta p}{\rho_F}} \geq Rs \qquad (1)$$

$$C \sqrt{\frac{2\Delta p}{\rho_F}} \cdot \tau \leq a \cdot L\max \qquad (2)$$

In those Formulae, $n_{INJ}$ is the number of injection holes 31 provided in the fuel injector 30, and $d_{INJ}$ is a diameter [mm] of the injection holes 31, which are known values. $\rho_F$ is a fuel density [kg/m³] which is a known value based on a fuel type to be used. C is a flow rate coefficient which can be calculated through a table or an empirical formula on the basis of the fuel density $\rho_F$ and the injection pressure difference Δp. τ is an ignition delay [ms] of the fuel calculated in S106. Lmax is a maximum distance [mm] from the injection holes 31 to the wall surface of the cavity 132.

A left-hand side of Formula (1) represents the fuel injection rate "Rinj" by the fuel injector 30. When Formula (1) is met, the fuel injection rate "Rinj" is set to the set value Rs or more.

A left-hand side of Formula (2) represents a distance from the injection holes 31 to the arrival position of the fuel spray flow F in the ignition timing.

As illustrated in FIG. 14, when the following Formula (2) is met, the arrival position of the fuel spray flow F in the ignition timing is set to a range of ½ or less of a maximum distance Lmax from the injection holes 31.

When it is determined that the injection pressure difference Δp can be set in S107, the processing proceeds to S108. On the other hand, when it is determined that the injection pressure difference Δp cannot be set in S107, the processing returns to S106.

In S108, a control value of the injection pressure difference Δp used in the control of the fuel injector 30 is determined in the range of the injection pressure difference Δp determined to be settable.

In S109, the injection period Δt of the fuel injector 30 is calculated on the basis of the following Formula (3) with the use of the control value of the injection pressure difference Δp determined in S13.

$$\frac{Q}{\Delta t} = \frac{\pi}{4} d_{INJ}^2 \cdot n_{INJ} \cdot C \sqrt{\frac{2\Delta p}{\rho_F}} \qquad (3)$$

In S110, an injection start timing is determined on the basis of the injection period Δt calculated in S109. Specifically, the injection start timing is determined so that a period between the injection start timing and the ignition timing becomes longer than the injection period Δt.

In S111, the fuel injector 30 is controlled on the basis of the control value of the injection pressure difference Δp, the injection period Δt, and the injection start timing, which have been obtained in S108 to S110 till now. As a result, the fuel injector 30 injects the fuel at the fuel injection rate "Rinj" of the set value Rs or more, and completes the injection before the ignition timing.

A method of calculating the compatible fuel volume Qc performed by the injection control unit 42 will be described with reference to a characteristic view of FIG. 15 and a flowchart of FIG. 16.

Figure 15:
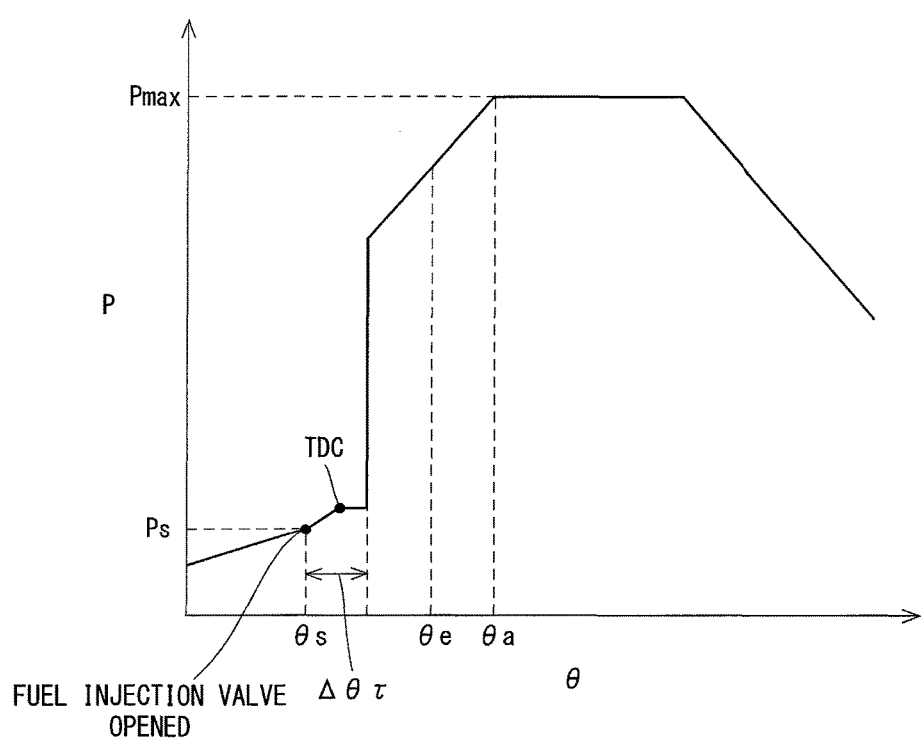
FIG. 15 is a characteristic view illustrating a relationship between the crank angle and the in-cylinder pressure for illustrating a compatible fuel volume according to the first embodiment of the present disclosure.

As illustrated in FIG. 15, it is assumed that the crank angle θ at which the fuel injector 30 is opened is an injection start crank angle θs, and the in-cylinder pressure P at that time is an injection start pressure Ps. In addition, it is assumed that the crank angle θ at which the fuel injector 30 is closed is an injection end crank angle θe, and the crank angle θ at a time when the fuel combustion has been completed is a combustion end crank angle θa. It is assumed that a value obtained by converting the ignition delay τ of the fuel into the crank angle θ is an ignition delay crank period Δθτ.

Figure 16:
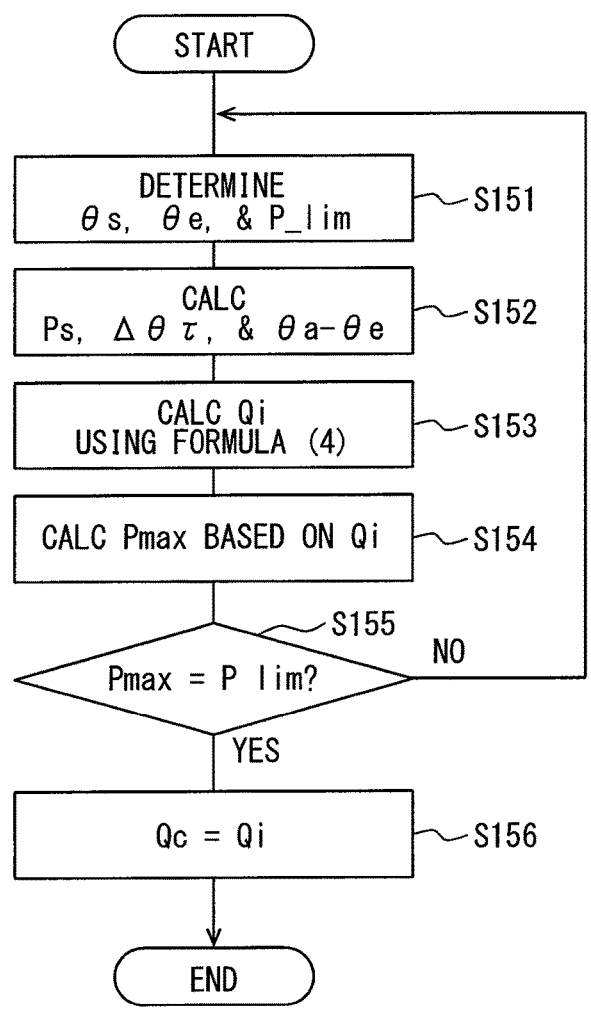
FIG. 16 is a flowchart illustrating a method of calculating the compatible fuel volume according to the first embodiment of the present disclosure.

As illustrated in FIG. 16, in S151, the injection start crank angle θs, the injection end crank angle θe, and the in-cylinder pressure limit value P_lim are determined.

In S152, the ignition delay crank period Δθτ, a period from the injection end crank angle θe to the combustion end crank angle θa, and the injection start pressure Ps are calculated. The period from the injection end crank angle θe to the combustion end crank angle θa is calculated by subtracting the injection end crank angle θe from the combustion end crank angle θa.

In S153, a virtual fuel volume Qi that is a fuel volume calculated virtually is calculated through the following Formula (4). In the formula, V represents a volume in the combustion chamber 12, which is a function of the crank angle θ. γ represents a specific heat ratio in the combustion chamber 12. dP/dθ represents a change rate of the in-cylinder pressure P to the crank angle θ. dV/dθ represents a change rate of the volume V in the combustion chamber 12 to the crank angle θ.

$$Qi = \int_{\theta_s}^{\theta_e} \left( \frac{V}{\gamma - 1} \cdot \frac{dP}{d\theta} \right) d\theta + \int_{\theta_s}^{\theta_e} \left( \frac{\gamma}{\gamma - 1} \cdot P \cdot \frac{dV}{d\theta} \right) d\theta \quad (4)$$

In S154, the maximum in-cylinder pressure Pmax is calculated on the basis of the virtual fuel volume Qi.

In S155, the calculated maximum in-cylinder pressure Pmax is compared with the in-cylinder pressure limit value P_lim, and it is determined whether the calculated maximum in-cylinder pressure Pmax is equal to the in-cylinder pressure limit value P_lim, or not. In the present specification, "equal" includes a common-sense error range. When the calculated maximum in-cylinder pressure Pmax is equal to the in-cylinder pressure limit value P_lim, the processing proceeds to S156. When the calculated maximum in-cylinder pressure Pmax is not equal to the in-cylinder pressure limit value P_lim, the processing returns to S151. In S156, the compatible fuel volume Qc is set to be equal to the virtual fuel volume Qi, in other words, Qc=Qi is set, and the compatible fuel volume Qc is calculated.

In S101 to S105, both of the high thermal efficiency and the reduction in the amount of NOx can be achieved. When the injection fuel volume Q is a value obtained by multiplying the total fuel volume Q_all by the fuel volume coefficient $C_Q$, because the injection fuel volume Q falls below the compatible fuel volume Qc, the fuel injection device 10 prioritizes the thermal efficiency η.

On the other hand, when the injection fuel volume Q is set as the compatible fuel volume Qc, the fuel injection device 10 achieves both of the thermal efficiency η and the amount of NOx. Because the compatible fuel volume Qc is calculated on the basis of the in-cylinder pressure limit value P_lim, the compatible fuel volume Qc is a fuel volume that optimizes the thermal efficiency η and the amount of NOx. Therefore, when the injection fuel volume Q is set to be equal to the compatible fuel volume Qc, both of the thermal efficiency η and the amount of NOx are achieved.

In S106 to S111, the cooling loss is reduced.

The advantages of a reduction in the cooling loss caused by the set value Rs set to induce the air flow A for directing the fuel spray flow F injected from the fuel injector 30 toward a direction opposite to an injection direction D of the fuel injector 30 will be described. Hereinafter, for convenience of the description, the fuel injection rate "Rinj" of the set value Rs or more is called "high injection rate", and the fuel injection rate "Rinj" less than the set value Rs is called "low injection rate".

(Additional Advantages)

[4] The fuel injection device 10 according to the present embodiment is applied to the engine 1 having the combustion chamber 12 partitioned by the cylinder head 16, the cylinder 15, and the piston crown surface 130. The fuel injection device 10 includes the fuel injector 30 that injects the fuel into the combustion chamber 12 toward the cavity 132 provided in the piston crown surface 130, and the injection control unit 42 that controls the fuel injector 30 so as to inject the fuel at the fuel injection rate "Rinj" of the set value Rs or more.

For example, FIGS. 17A and 17B are diagrams illustrating pressure fields in the combustion chamber 12 immediately after the fuel injection has been performed. FIG. 17A illustrates a case in which the fuel is injected at the low injection rate, and FIG. 17B illustrates a case in which the fuel is injected at the high injection rate.

In FIG. 17A, an adverse pressure gradient produced in the injection direction D is moderate.

On the other hand, in FIG. 17B, it is found that an air is compressed between the fuel spray flow F and the inner peripheral surface 126 that is the wall surface of the combustion chamber 12, to thereby produce a steep adverse pressure gradient in the injection direction D. Because the fuel spray flow F proceeds under the adverse pressure gradient, the advance of the fuel spray flow F is suppressed.

Figure 18A:
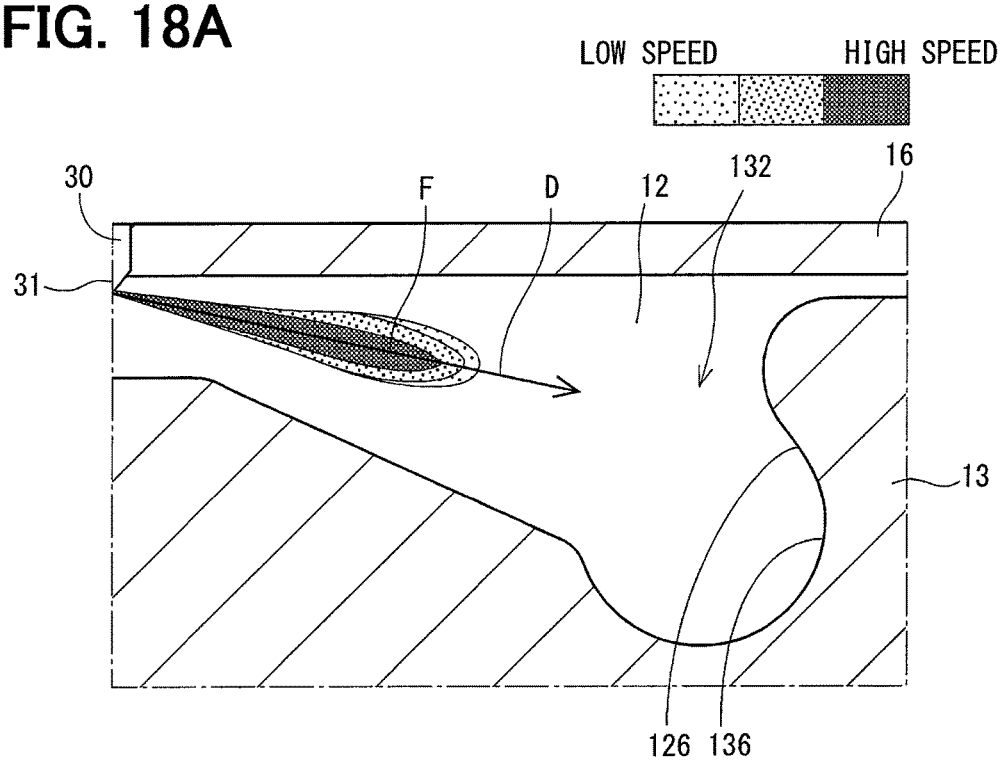
FIGS. 18A and 18B are schematic views illustrating one state of a change in a velocity field in the combustion chamber after the fuel injection has been performed.
Figure 18B:
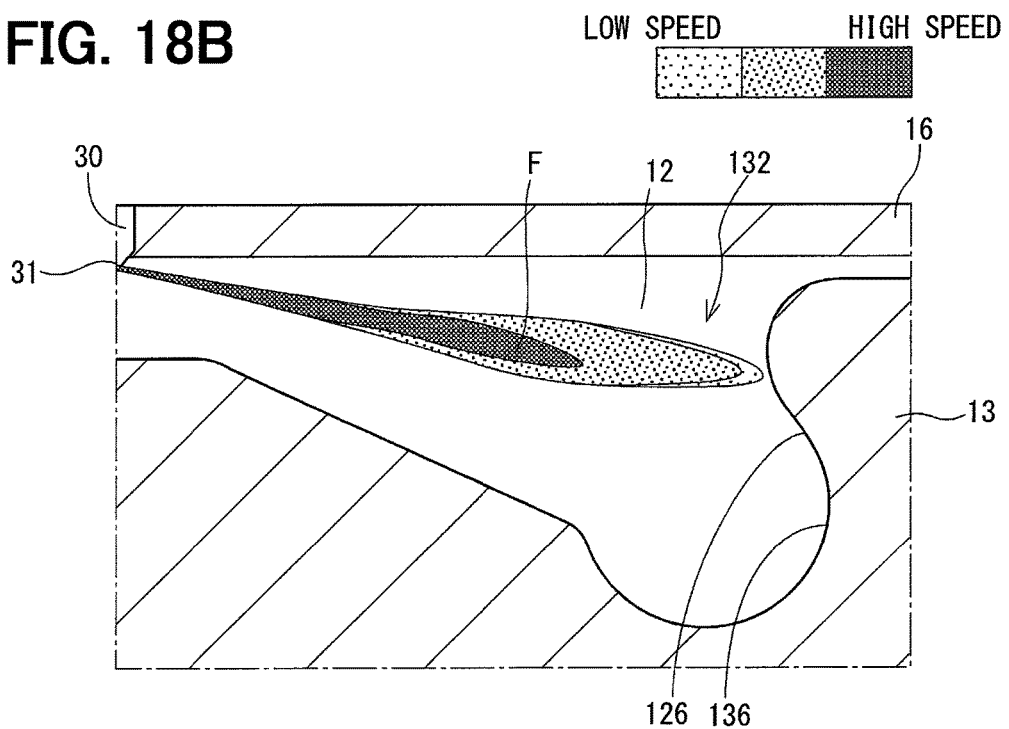
Figure 19A:
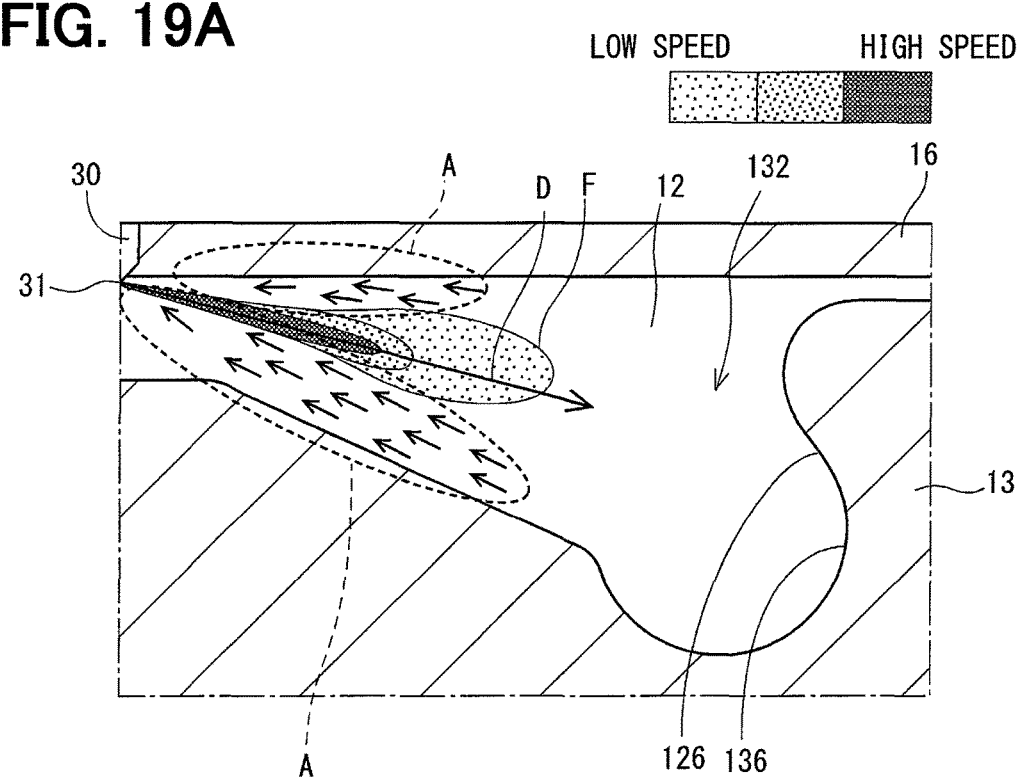
FIGS. 19A and 19B are schematic views illustrating another state of the change in the velocity field in the combustion chamber after the fuel injection has been performed.
Figure 19B:
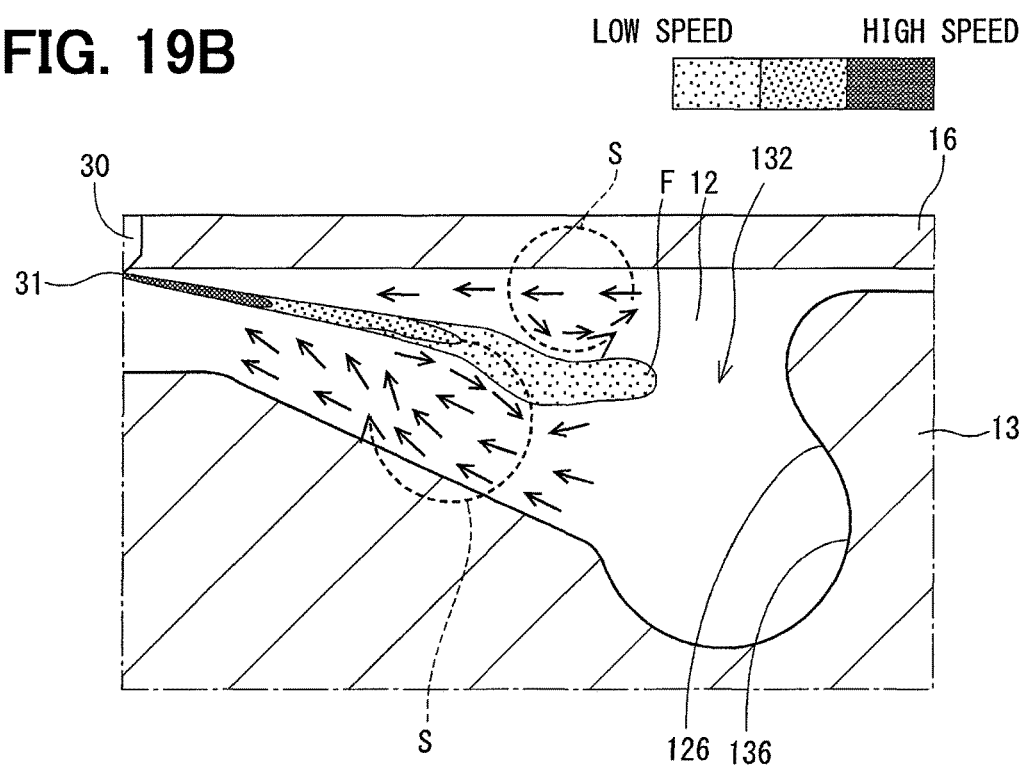

FIGS. 18 and 19 are diagrams illustrating states of a change in a velocity field in the combustion chamber 12 immediately after the fuel injection has been performed. FIG. 18 illustrates a case in which the fuel is injected at the low injection rate, and FIG. 19 illustrates a case in which the fuel is injected at the high injection rate.

In FIG. 18, the fuel spray flow F travels straight along the injection direction D in the combustion chamber 12, and reaches the inner peripheral surface 126 of the combustion chamber 12.

On the other hand, in FIG. 19, the air flow A directed in the direction opposite to the injection direction D is induced above and below the fuel spray flow F. After the air flow A has been induced, a large-scale vortex structure S is formed in a boundary between the fuel spray flow F and the air flow A. As a result, the fuel spray flow F is sheared by the air flow A, and also mixed with the air flow A, and a momentum of the fuel spray flow F is reduced whereby the advance of the fuel spray flow F is suppressed.

From the above, the advance of the fuel spray flow F is suppressed by two phenomena such as the adverse pressure gradient produced in the injection direction D and the air flow A flowing in the direction opposite to the injection direction D. For that reason, the fuel spray flow F is prevented from reaching the wall surface of the combustion chamber 12.

Therefore, according to the present embodiment, the thermal insulation gas layer caused by the uncombusted air can be formed between the combusted gas of the high temperature generated by the combustion of the fuel spray flow F and the wall surface of the combustion chamber 12. As a result, because a contact between the combusted gas and the wall surface of the combustion chamber 12 is suppressed, the fuel injection device 10 that can reduce the cooling loss is provided.

In the present embodiment, the fuel injector 30 is disposed in a radially center part of the combustion chamber 12, and injects the fuel from a radially inward side toward a radially outward side of the combustion chamber 12.

According to the above configuration, a contact between the wall surface 136 on the radially outer side of the cavity 132 forming the inner peripheral surface 126 of the combustion chamber 12 and the combusted gas can be suppressed. For that reason, the heat radiated from the combustion chamber 12 toward the external can be more suppressed, and the cooling loss can be more reduced.

In the present embodiment, the injection control unit 42 controls the injection pressure difference Δp as the injection pressure of the fuel injector 30 so that the arrival position of the fuel spray flow F in the ignition timing is located inside of the wall surface of the combustion chamber 12. Specifically, it is preferable that the arrival position of the fuel spray flow F in the ignition timing falls within ½ or less of the maximum distance Lmax from the injection holes 31 to the cavity 132.

Figure 20A:
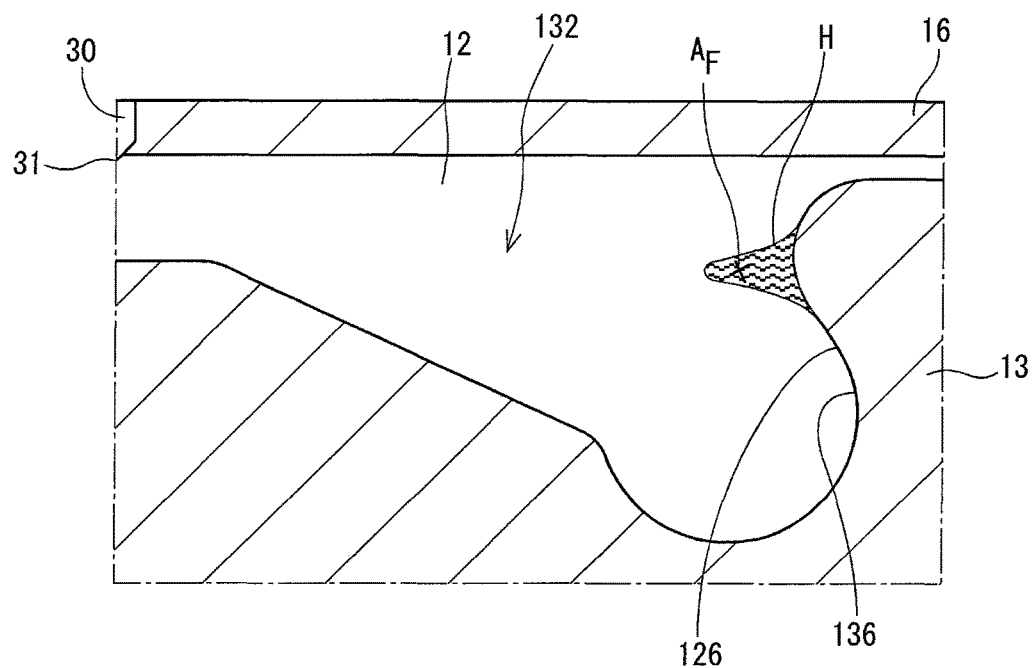
FIGS. 20A and 20B are schematic views illustrating a state of one change in a temperature field in the combustion chamber.
Figure 20B:
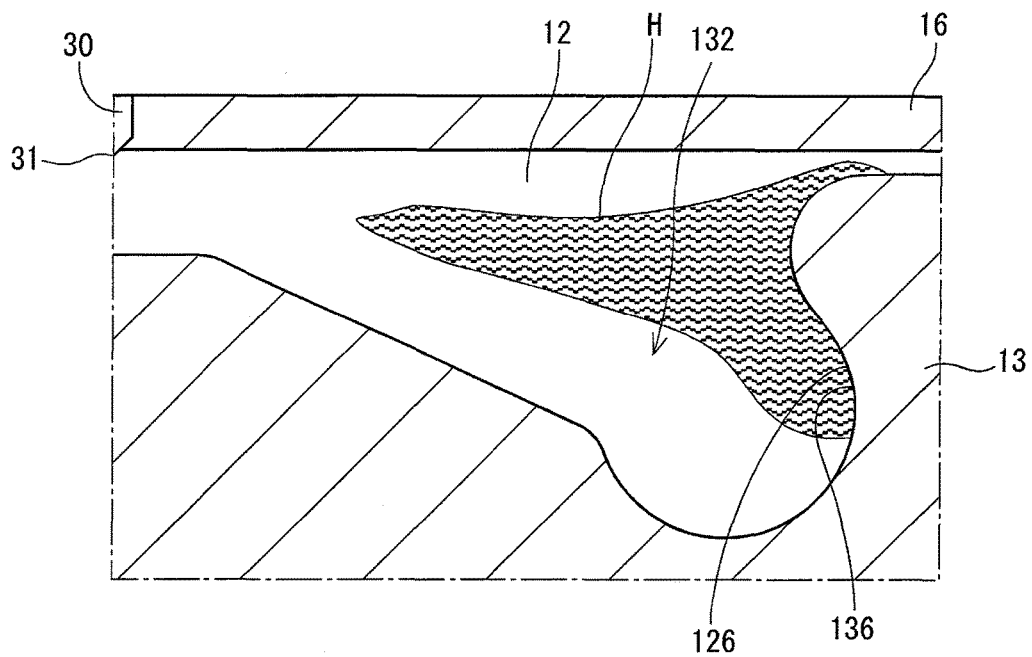
Figure 21A:
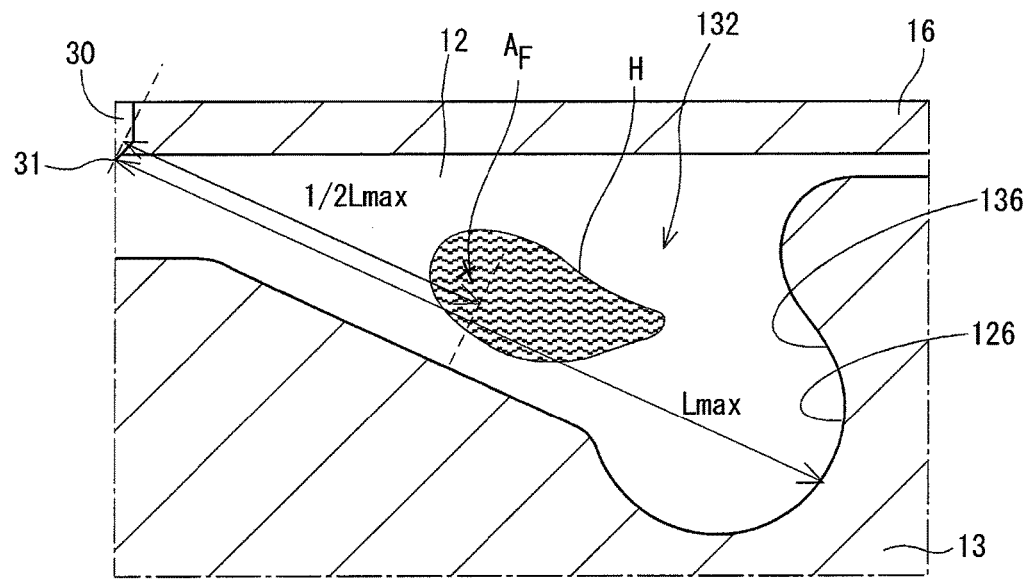
FIGS. 21A and 21B are schematic views illustrating a state of another change in a temperature field in the combustion chamber.
Figure 21B:
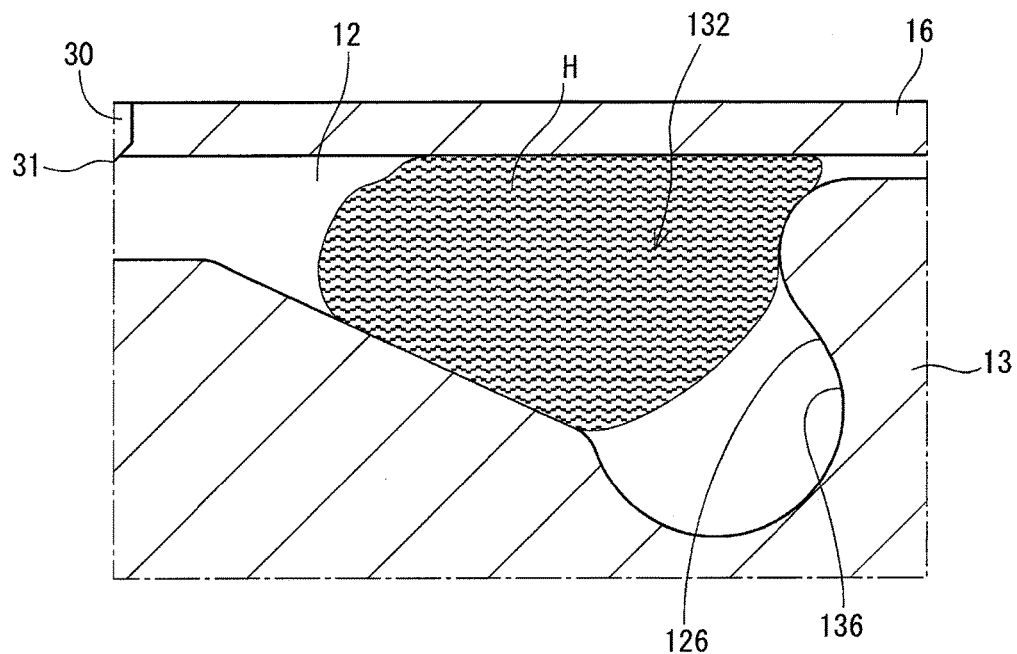
Figure 22A:
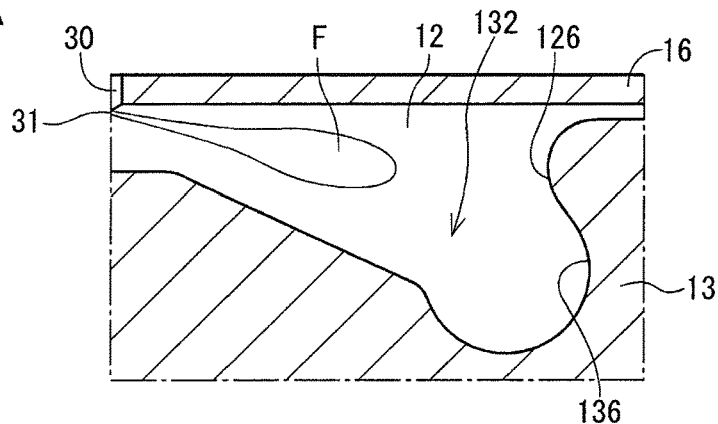
FIGS. 22A, 22B, 22C, and 22D are schematic views illustrating one relationship between a timing of a combustion injection completion and a high temperature zone caused by a combusted gas.
Figure 22B:
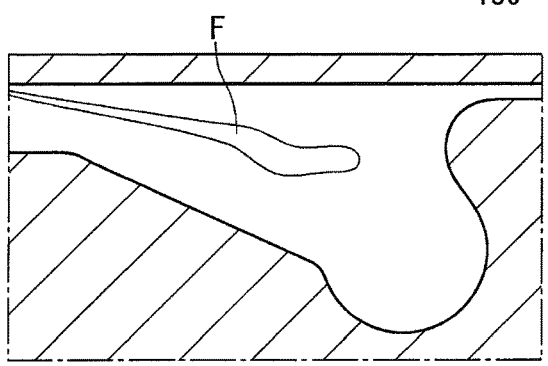
Figure 22C:
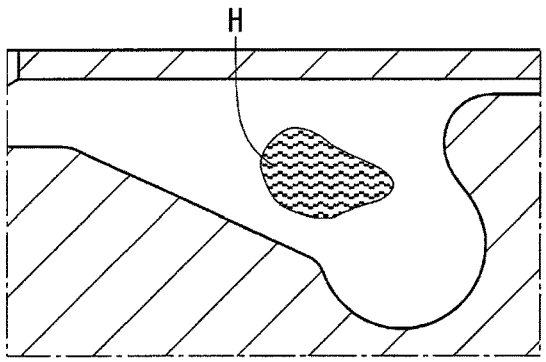
Figure 22D:
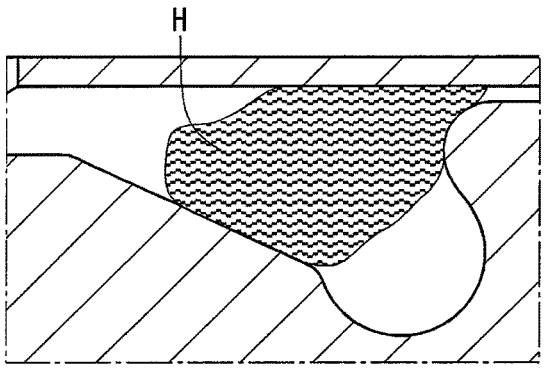
Figure 23A:
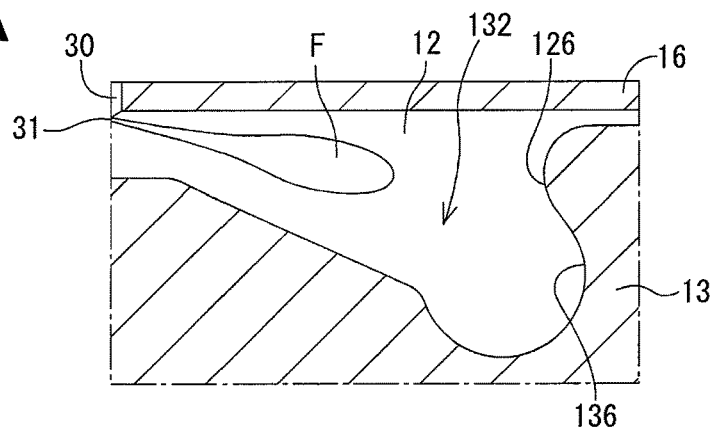
FIGS. 23A, 23B, 23C, and 23D are schematic views illustrating another relationship between the timing of the combustion injection completion and the high temperature zone caused by the combusted gas.
Figure 23B:
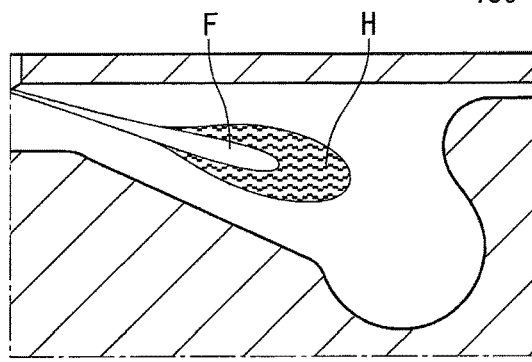
Figure 23C:
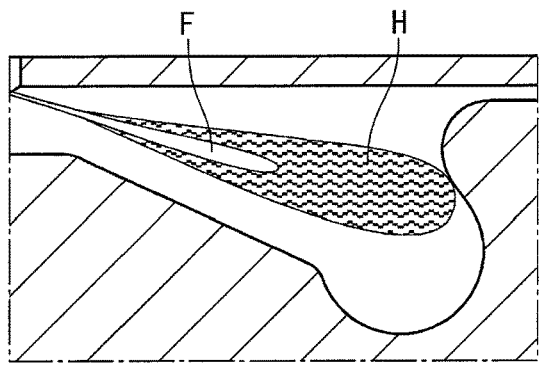
Figure 23D:
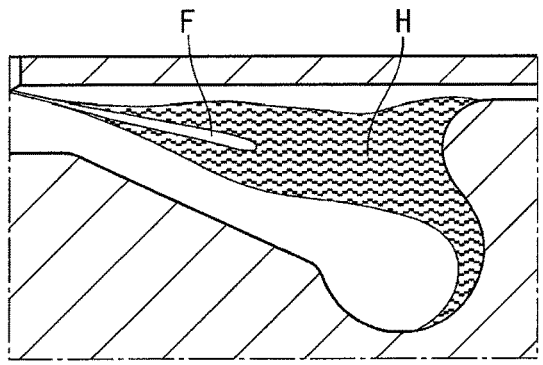

For example, FIGS. 20 and 21 are diagrams illustrating states of a change in a temperature field in the combustion chamber 12. FIG. 20 illustrates a case (a case of low injection rate) in which the fuel spray flow F reaches the inner peripheral surface 126 of the combustion chamber 12 in the ignition timing, and FIG. 21 illustrates a case (a case of high injection rate) in which the arrival position of the fuel spray flow F in the ignition timing is equal to or less than ½ of the maximum distance Lmax from the injection holes 31 to the cavity 132.

In FIG. 20, an ignition position $A_F$ is located in the vicinity of the inner peripheral surface 126 of the combustion chamber 12. As a result, a high temperature zone H caused by the combustion or the combusted gas comes in contact with the inner peripheral surface 126 of the combustion chamber 12 from a combustion initial stage, and comes in wide contact with the inner peripheral surface 126 of the combustion chamber 12 in a combustion late stage.

On the other hand, in FIG. 21, the ignition position $A_F$ is located not in the vicinity of the inner peripheral surface 126 of the combustion chamber 12, but in the vicinity of a middle between the radially center part of the combustion chamber 12 and the inner peripheral surface 126.

According to an example illustrated in FIG. 21, the high temperature zone H caused by the combustion or the combusted gas is restrained from coming in contact with the inner peripheral surface 126 of the combustion chamber 12. In other words, the thermal insulation gas layer caused by the uncombusted air is formed between the combusted gas of high temperature caused by the combustion of the fuel spray flow F and the wall surface of the combustion chamber 12. With this configuration, the contact between the combusted gas and the wall surface of the combustion chamber 12 can be more preferably suppressed.

In the present embodiment, the injection control unit 42 controls the injection start timing of the fuel injector 30 so as to terminate the fuel injection at the injection rate "Rinj" of the set value Rs or more before the ignition timing.

According to the above configuration, the vicinity of the ignition position $A_F$ is put into an oxygen deficiency, and a flame can be prevented from spreading into the combustion chamber 12. With this configuration, the contact between the combusted gas and the wall surface of the combustion chamber 12 can be more preferably suppressed.

For example, FIGS. 22A to 22D and FIGS. 23A to 23D are diagrams illustrating states in the combustion chamber 12 immediately after the fuel injection until the combustion.

In FIGS. 22A to 22D, because the fuel injection is terminated before the ignition, the center combustion described above is performed.

On the other hand, in FIGS. 23A to 23D, the fuel injection is continued even after the ignition whereby the vicinity of the ignition position $A_F$ is put into an oxygen deficiency, and a flame spreads into the combustion chamber 12. As a result, the high temperature zone H caused by the combustion or the combusted gas comes in contact with the inner peripheral surface 126 of the combustion chamber 12.

In the present embodiment, when it is assumed that a maximum spray angle at which the fuel spray flow F can reach the wall surface 136 on the radially outer side of the cavity 132 without any collision with the central protruding portion 134 is $\alpha$, a spray angle $\beta$ caused by the fuel injector 30 satisfies $0.4\alpha \leq \beta \leq \alpha$. Specifically, the spray angle $\beta$ caused by the fuel injector 30 is equal to or more than 12 degrees and equal to or less than 30 degrees. According to the above configuration, because the fuel spray flow F can preferably compress the air between the fuel spray flow F and the wall surface 136 of the cavity 132, the fuel spray flow F can preferably induce the air flow A directed toward the direction opposite to the injection direction D.

In the present embodiment, the fuel injector 30 has multiple injection holes 31 arranged concentrically. With this arrangement, distances between the respective fuel spray flows F sprayed from the respective injection holes 31 can be reduced. The air flows A formed around the fuel spray flows F interfere with each other, to thereby form the large-scale vortex structure, and the advance of the fuel spray flows F can be more preferably suppressed. In addition, the mixing of the fuel spray flow F and the air is advanced, thereby being capable of avoiding the deterioration of the combustion state caused by oxygen deficiency.

Second Embodiment

Figure 24:
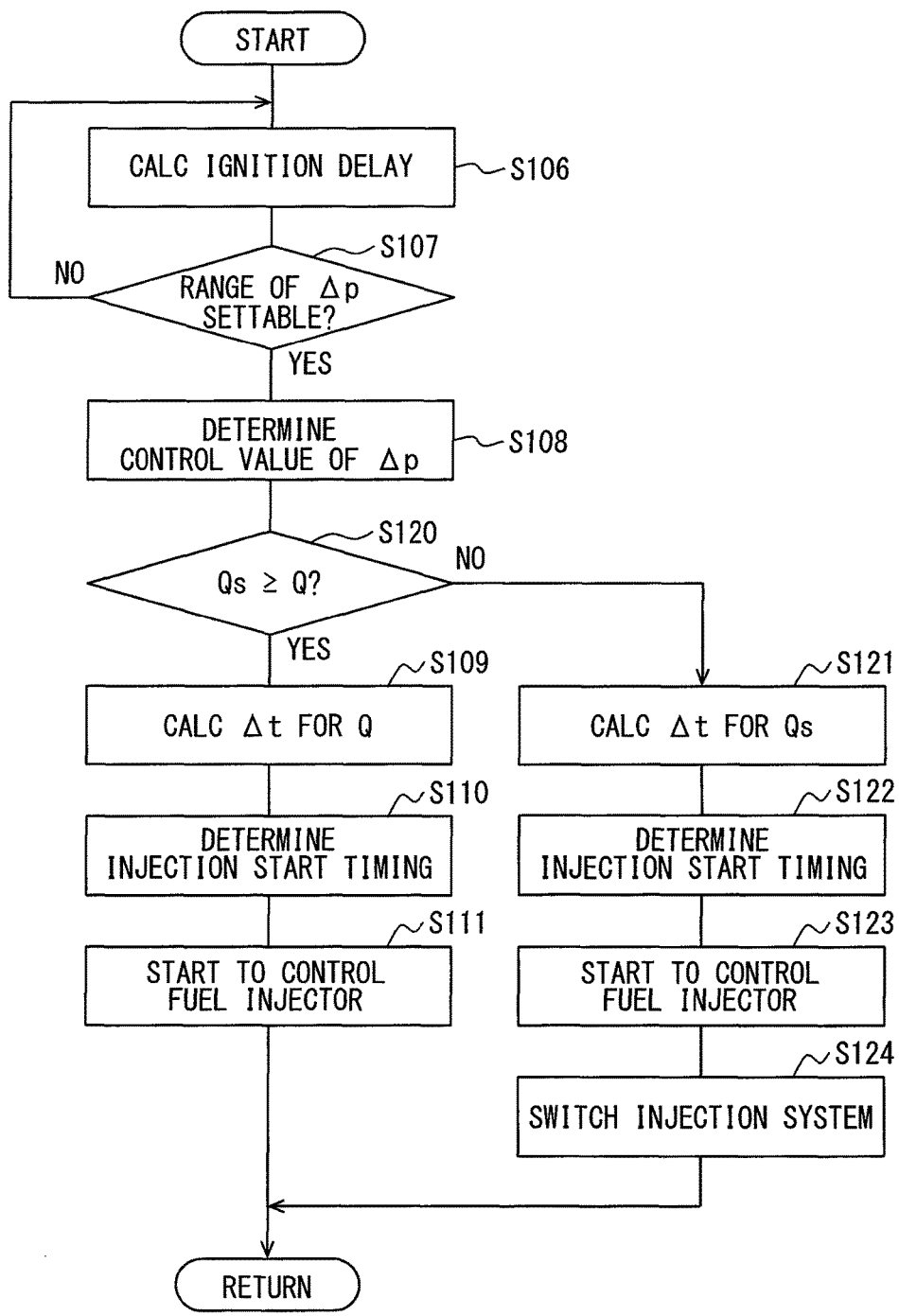
FIG. 24 is a flowchart illustrating processing performed by a fuel injection device according to a second embodiment of the present disclosure.

A fuel injection device 10 according to a second embodiment of the present disclosure will be described with reference to FIGS. 24, 25A, and 25B. The second embodiment is different from the first embodiment in that an injection control unit 42 reduces and adds switchover of an injection system.

When the amount of fuel per injection is large (high load), there is a possibility that all of a fuel cannot be subjected to center combustion due to an insufficient air. When the fuel is to be forcedly subjected to the center combustion, because the fuel remains in an uncombusted state, a combustion efficiency is deteriorated. Hence, the second embodiment is intended to combust a remaining fuel on a side closer to an inner peripheral surface 126 of a combustion chamber 12 after an available fuel has been first subjected to the center combustion.

Specifically, an injection control unit 42 switches an injection system during one injection of a fuel injector 30 so as to inject the fuel at a fuel injection rate "Rinj" smaller than a set value Rs continuously after the fuel injector 30 has injected the fuel at the fuel injection rate "Rinj" of the set value Rs or more.

Processing performed by the injection control unit 42 will be described with reference to a flowchart of FIG. 24. The injection control unit 42 starts the processing, for example, together with a start of an engine 1.

First, the processing from S101 to S105 as in the first embodiment is not performed, and is reduced. The same processing as that in the first embodiment is performed in S106 to S108.

Then, in S120, it is determined whether an injection fuel volume Q per cylinder is equal to or less than a predetermined value Qs, or not. The predetermined value Qs is a maximum value of the amount of fuel that can be subjected to the center combustion.

In S120, when the injection fuel volume Q per cylinder is equal to or less than the predetermined value Qs, a flow in S109 to S111 is performed as in the first embodiment. As a result, the fuel injector 30 injects the fuel at the fuel injection rate "Rinj" of the set value Rs or more, and completes the injection before the ignition timing.

On the other hand, in S120, when the injection fuel volume Q per cylinder is more than the predetermined value Qs, the processing proceeds to S121.

In S121, an injection period Δt [ms] is calculated on the basis of the following Formula (5) with the use of a value of an injection pressure difference Δp determined in S108.

$$\frac{Qs}{\Delta t} = \frac{\pi}{4} d_{INJ}^2 \cdot n_{INJ} \cdot C \sqrt{\frac{2\Delta p}{\rho_F}} \quad (5)$$

As a result, in the fuel for the predetermined value Qs, the injection period Δt for injecting the fuel at the fuel injection rate "Rinj" of the set value Rs or more is obtained.

Then, in S122, like S110, an injection start timing is determined on the basis of the injection period Δt calculated in S121.

Then, in S123, the control of the fuel injector 30 starts on the basis of the injection pressure difference Δp, the injection period Δt, and the injection start timing obtained in the above S108, S121, and S122. As a result, the fuel injector 30 injects the fuel for the predetermined value Qs at the fuel injection rate "Rinj" of the set value Rs or more, and completes the injection before the ignition timing.

Then, in S124, the injection system is switched to another, and the fuel injector 30 continuously injects the remaining fuel under control.

The switchover of the injection system may be performed by reducing the injection pressure difference Δp of the fuel injector 30, or may be performed by reducing the number of injection holes 31 for performing the injection of the fuel injector 30. As a result, the fuel injector 30 can inject the remaining fuel at the fuel injection rate "Rinj" less than the set value Rs. It is preferable that the fuel injection rate "Rinj" of the fuel after the injection system has been switched to another is 115 mm³/ms or less.

Figure 25A:
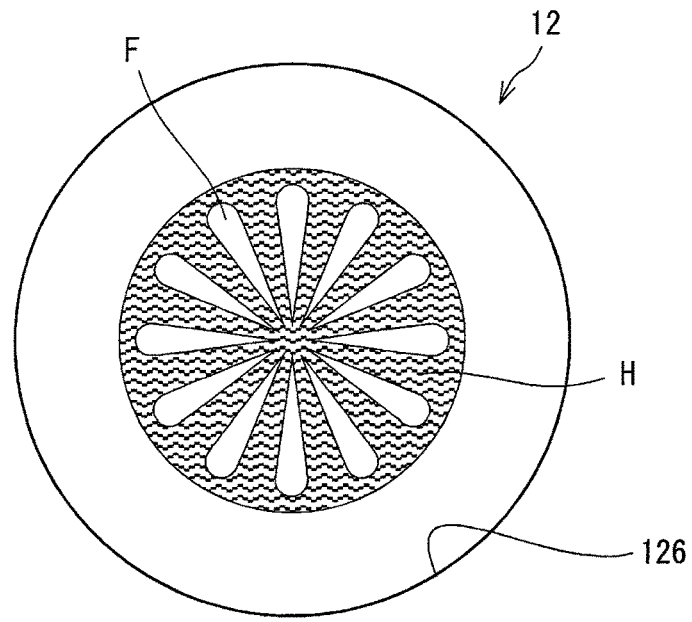
FIGS. 25A and 25B are schematic views illustrating an example of switching a fuel injection system.
Figure 25B:
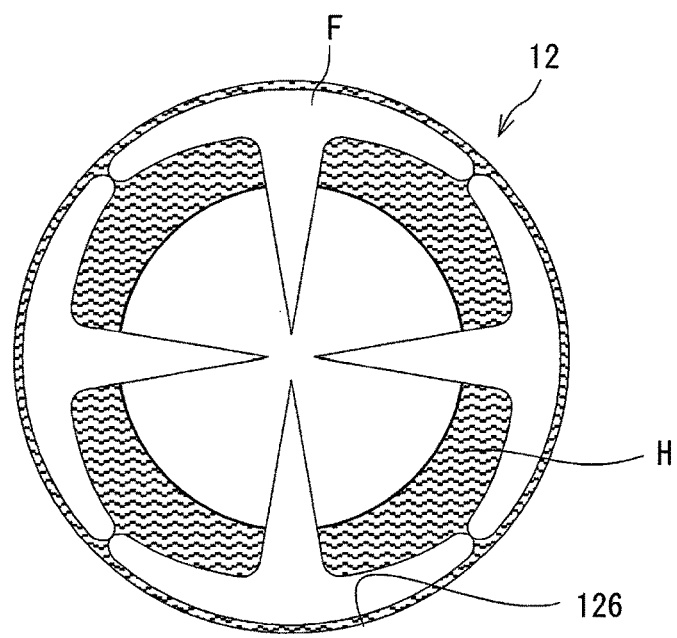

For example, FIGS. 25A and 25B illustrate a case in which the number of injection holes 31 for performing the injection is reduced from 12 to 4. The fuel injection rate "Rinj" after the injection system has been switched to another is reduced to about ⅓ of the fuel injection rate "Rinj" before the switchover. The fuel injector 30 is configured to switch the number of injection holes 31 for performing the injection to another.

In an injection initial stage, as illustrated in FIG. 25A, a fuel spray flow F does not reach the inner peripheral surface 126 of the combustion chamber 12, and the combustion is performed in a center part of the combustion chamber 12. After the switchover of the injection system, the fuel spray flow F reaches the inner peripheral surface 126 of the combustion chamber 12, and the combustion is performed in an outer part in the interior of the combustion chamber 12.

According to the second embodiment, when all of the fuel cannot be subjected to the center combustion due to the insufficient air, after the available fuel has been first subjected to the center combustion, the remaining fuel can be combusted on a side closer to the inner peripheral surface 126 of the combustion chamber 12. As a result, the cooling loss can be reduced while the deterioration of the combustion efficiency is prevented.

Other Embodiments

Figure 26:
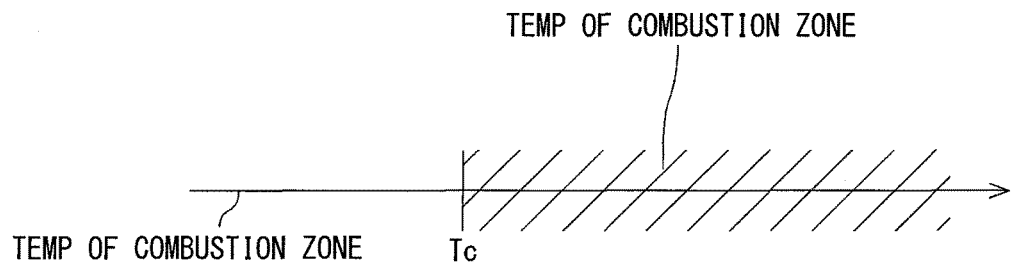
FIG. 26 is a characteristic view illustrating a temperature in a combustion zone according to another embodiment.

As illustrated in FIG. 26, first to fourth combustion zones 61 to 64 may be set to a temperature higher than a predetermined reference temperature Tc. The reference temperature Tc is calculated, for example, according to a temperature of a combustion chamber or a volume of the combustion chamber before a fuel injector is opened, and the amount of heat in the combustion chamber until a predetermined time since the fuel injector is opened. A combustion injection change unit may divide a zone set to a value higher than the reference temperature Tc in the combustion chamber. A combustion zone in the division of the combustion chamber according to the present embodiment is not limited to the zone set to a value higher than a carbon dioxide reference concentration $J_{CO2}$ or a water vapor reference concentration $J_{H2O}$.

Figure 27:
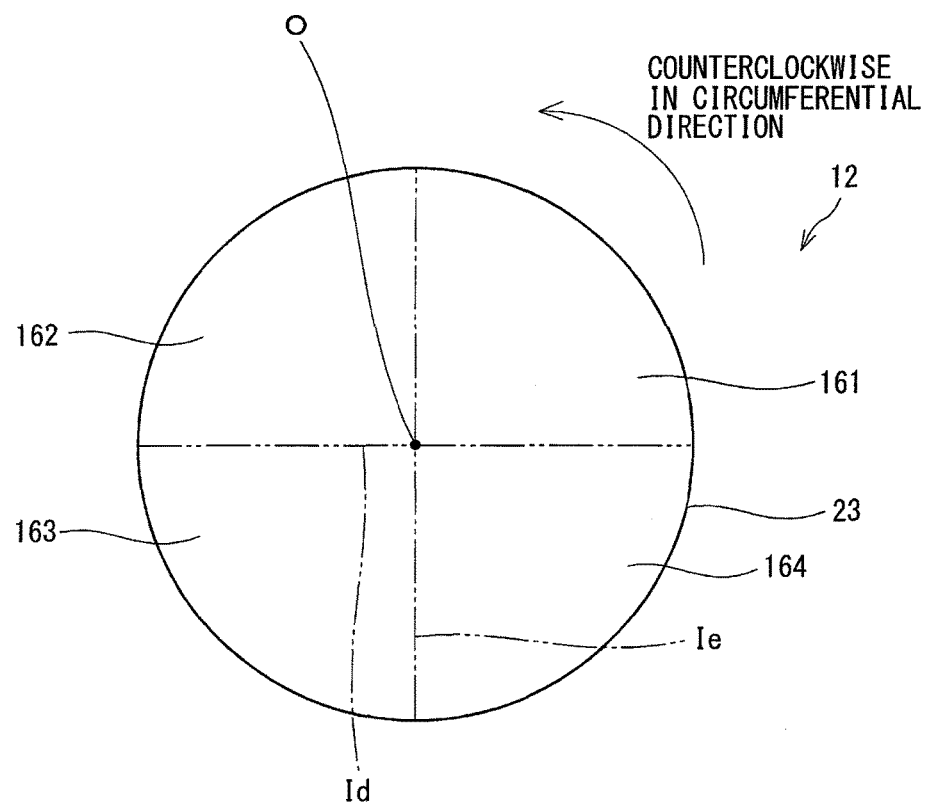
FIG. 27 is a schematic view illustrating the combustion zone according to another embodiment.

As illustrated in FIG. 27, the fuel injection change unit may divide a zone of the combustion chamber 12 into four zones from a center O of the combustion chamber 12 toward a circumferential direction of the combustion chamber 12. Referring to FIG. 27, first to fourth combustion zones 161 to 164 are provided in order counterclockwise about the center O. The first to fourth combustion zones 161 to 164 are partitioned by a virtual line Id and virtual line Ie.

Figure 28:
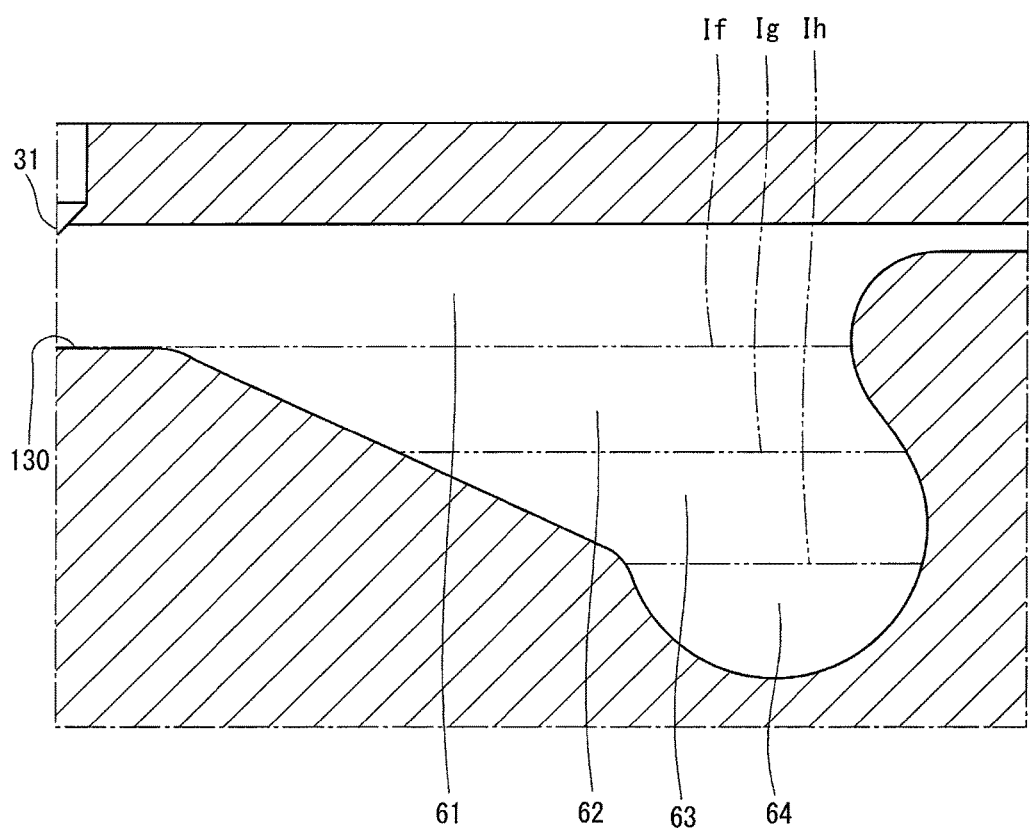
FIG. 28 is a schematic view illustrating the combustion zone according to another embodiment.

As illustrated in FIG. 28, the fuel injection change unit may divide the zone of the combustion chamber 12 into four zones in an axial direction of the combustion chamber 12. Referring to FIG. 27, first to fourth combustion zones 261 to 264 are provided in order from the fuel injector 30 toward the piston crown surface 130. The first to fourth combustion zones 261 to 264 are partitioned by the combustion chamber 12, a virtual line If, a virtual line Ig, and a virtual line Ih.

Figure 29:
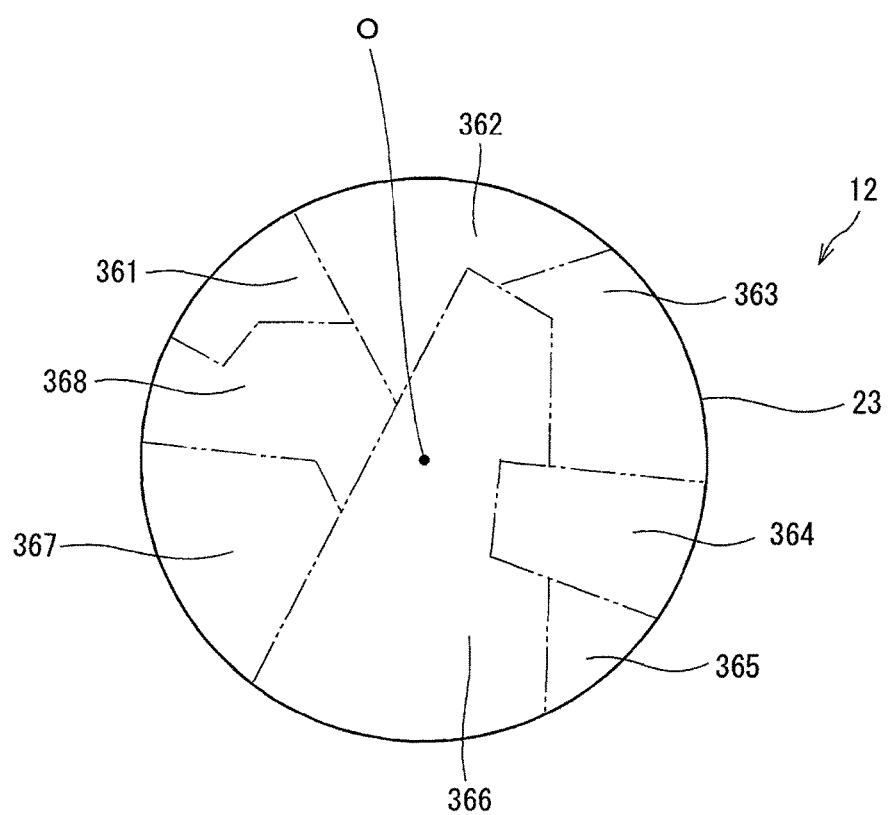
FIG. 29 is a schematic view illustrating the combustion zone according to another embodiment.

As illustrated in FIG. 29, the fuel injection change unit may divide the zone of the combustion chamber 12 into multiple first to eighth combustion zones 361 to 368 in an arbitrary zone. The same advantages as those in the first embodiment are obtained without depending on the divided zones of the combustion chamber 12.

The set value Rs of the fuel injection rate "Rinj" is 290 mm³/ms, but the present disclosure is not limited to this configuration. The set value Rs may be set to a value allowing the fuel spray flow F injected from the fuel injector 30 to induce an air flow A directed in a direction opposite to an injection direction D. The value can be obtained through experiments or simulation.

The fuel injector 30 is disposed in a radially center part of the combustion chamber 12, but may not be located in a strict radially center. The fuel injector that injects the fuel from a radially inner side of the combustion chamber 12 toward a radially outer side is preferably available. A shape of the piston crown surface 130 is not limited to the reentrance type, but may have a cavity on a side of injecting the fuel.

The arrival position of the fuel spray flow F is set to a range of ½ or less of the maximum distance Lmax from the injection holes 31 to the wall surface of the cavity 132, but the present disclosure is not limited to this configuration. When the arrival position of the fuel spray flow F is set to another range, ½ of a multiplier of Lmax in Formula (2) may be changed to another positive number of 1 or less.

The number and arrangement of injection holes 31 in the fuel injector 30 are not limited to those in the present embodiment. For example, when the fuel injector 30 has a larger number of injection holes 31, the injection holes 31 may be alternately arranged on two or more concentric circles.

The fuel injection device may estimate the amount of HC with the use of the amount of NOx, and calculate a fuel consumption with the use of the thermal efficiency η. The fuel injection device may calculate the change rate dP/dθ in the crank angle θ of the in-cylinder pressure P, and estimate vibration or noise with the use of the change rate dP/dθ. The fuel injection device according to the present embodiment is not limited to be used in the internal combustion engine so that at least one of the amount of NOx, the maximum in-cylinder pressure Pmax, and the thermal efficiency η is maintained at a predetermined value. The fuel injection device in the present embodiment may be used so that at least one of the amount of NOx, the maximum in-cylinder pressure Pmax, the thermal efficiency η, the amount of HC, the vibration noise, and the fuel consumption is maintained at the predetermine value.

The present disclosure is not limited to the embodiments described above, but can be implemented in various configurations without departing from the spirit of the present disclosure.

Third Embodiment

A fuel injection device (hereinafter referred to as "injector") according to a third embodiment of the present disclosure will be described with reference to FIGS. 31 to 45. A configuration of the injector will be described with reference to FIGS. 31 to 33. A polygonal line will be omitted in cross-sectional views of the figures.

An injector 1 according to the present embodiment is fitted to each cylinder of a diesel engine, and injects a fuel stored in a common rail 208 in a high pressure state to each cylinder.

As illustrated in FIG. 31, the injector 1 includes a housing 210, an outer needle 238, an inner needle 237, and a drive unit 290.

The housing 210 is made of a metal material such as carbon steel and formed into a bottomed cylindrical shape. The housing 210 includes fuel passages 217, 223, 224, 225, 451, a first back pressure chamber 221, and a second back pressure chamber 222 on a rear end side.

The housing 210 includes a nozzle chamber 211, a valve seat 213, first injection holes 321, second injection holes 322, and housing flanges 301 on a front end side.

The fuel passage 224 communicates with the fuel passage 217, the fuel passage 225, and the fuel passage 451. The fuel passage 223 and the fuel passage 225 communicate with the first back pressure chamber 221. The fuel passage 451 communicates with the second back pressure chamber 222.

The nozzle chamber 211 communicates with the fuel passage 217. The valve seat 213 is formed into a conical inner wall surface of a bottom part.

The first injection hole 321 is provided on the front end side of the second injection hole 322, in other words, on an axial center side of the housing 210. The multiple first injection holes 321 and the multiple second injection holes 322 are provided at predetermined intervals in a circumferential direction of the housing 210.

Figure 32A:
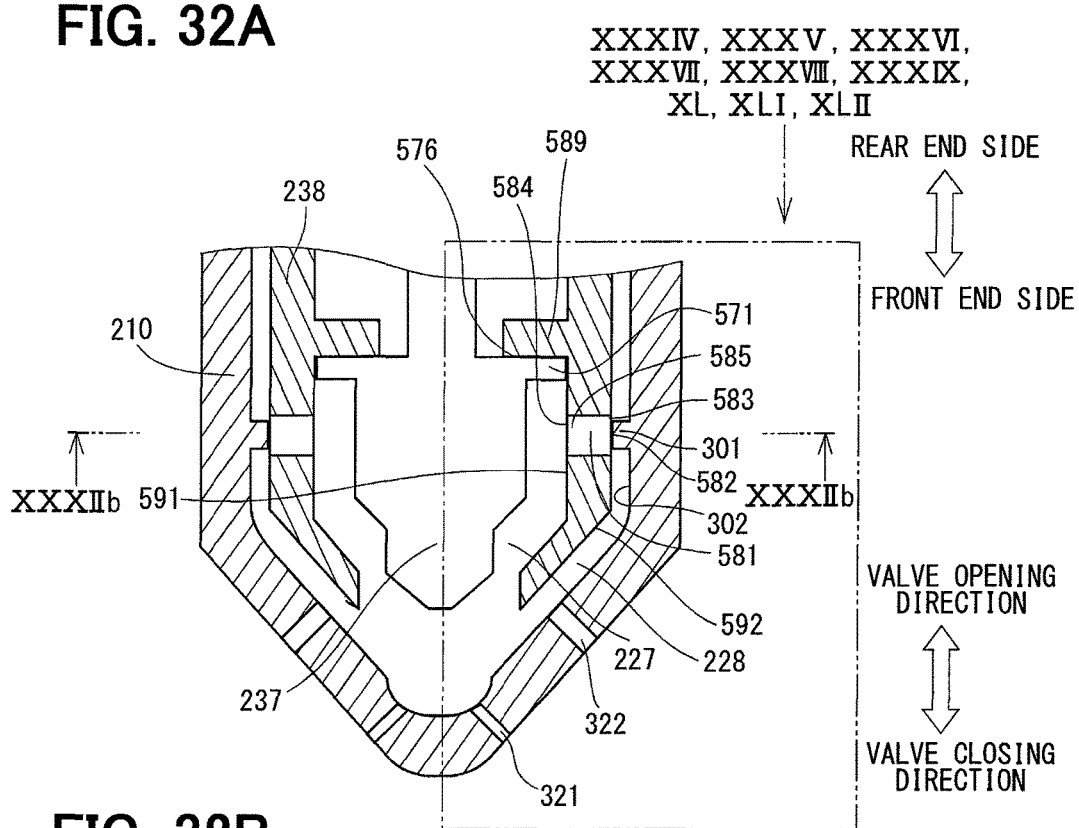
FIG. 32A is an enlarged view of a part II in FIG. 31 when an injector valve is opened according to the third embodiment.
Figure 32B:
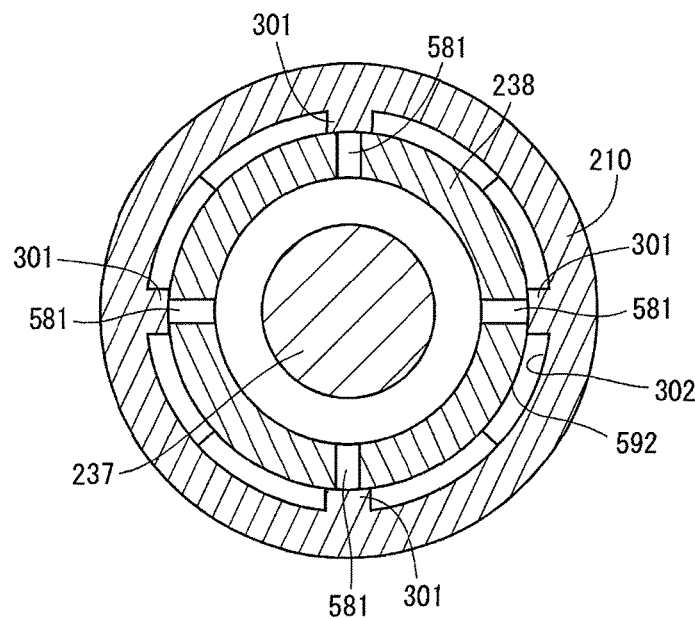
FIG. 32B is a cross-sectional view taken along a line IIb-IIb in FIG. 32A.

As illustrated in FIGS. 32A and 32B, the housing flanges 301 are enlarged in a radially inward direction, and protruded from an inner surface 302 of the housing 210. The housing flanges 301 are abutted against an outer surface 592 of an outer needle 238 to be described later. The housing flanges 301 are disposed on a rear end side of communication holes 581 of the outer needle 238 when the outer needle 238 performs the valve closing operation. When the outer needle 238 slides, the housing flanges 301 pass through inlet surfaces 582 of the respective communication holes 581.

The outer needle 238 is formed into a cylindrical shape, and housed in the interior of the housing so as to be reciprocally slidable in an axial direction. The outer needle 238 slides with a predetermined clearance from a sliding contact part 215 of the housing 210.

The outer needle 238 includes an outer needle spring 293 on the rear end side. The outer needle 238 includes a seat part 219, a protruding portion 589, and the communication holes 581 on the front end side.

The outer needle spring 293 is abutted against a head part 298 that is an end of the rear end side of the outer needle 238, and the housing 210 in the second back pressure chamber 222, and urges the outer needle 238 toward the front end side.

The seat part 219 is formed on an end of the front end side of the outer needle 238. The seat part 219 is unseated from and seated on the valve seat 213 by the outer needle 238 to open or close the second injection holes 322.

The protruding portion 589 is disposed on the rear end side of the communication holes 581, and enlarged in a radially inward direction of the outer needle 238, and protruded from an inner surface 591 of the outer needle 238.

As illustrated in FIGS. 32A, 32B and 33A, 33B, the respective communication holes 581 include inlet surfaces 582 disposed on the outer surface 592 of the outer needle 238, and outlet surfaces 584 disposed on the inner surface 591 of the outer needle 238, and communicate the inlet surfaces 582 with the outlet surfaces 584. The four communication holes 581 which are identical in number with the housing flanges 301 are formed at regular intervals.

Further, the communication holes 581 are arranged on the front end side of the housing flanges 301 when the outer needle 238 performs the valve closing operation. A diameter of the communication holes is constant, and a cross-section of the communication holes in the radial direction is rectangular. A method of machining the communication holes may include any methods such as machining using a tool such as a drill, or an electric discharge machining.

The inner needle 237 is formed into a cylindrical shape, and housed in the radially inward direction of the outer needle 238 so as to be reciprocally slidable in the axial direction coaxially with the outer needle 238. The inner needle 237 liquid-tightly comes in sliding contact with an inner wall of the outer needle 238 in the radially inward direction to regulate a flow of the fuel in the first back pressure chamber 221. An outer surface 578 of the inner needle 237 is recessed from a part on the rear end side of the communication holes 581 to the front end side.

The inner needle 237 includes an inner needle spring 292 on the rear end side. The inner needle 237 includes a seat part 218 and an inner needle flange 571 on the front end side.

The inner needle spring 292 is abutted against a head part 297 that is an end of the rear end side of the inner needle 237 and the housing 210 within the first back pressure chamber 221, and urges the inner needle 237 toward the front end side.

The seat part 218 is formed on an end of the front end side of the inner needle 237. The seat part 218 is unseated from and seated on the valve seat 213 by the inner needle 237 to open or close the first injection holes 321.

Figure 33A:
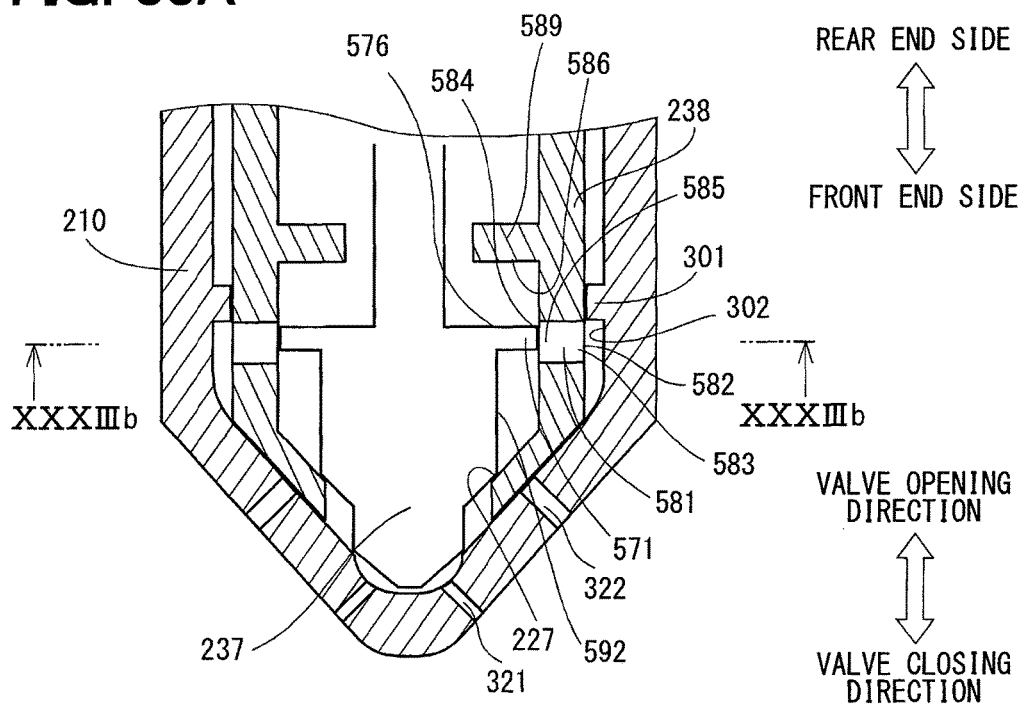
FIG. 33A is an enlarged view of a part III in FIG. 31 when the injector valve is closed according to the third embodiment.
Figure 33B:
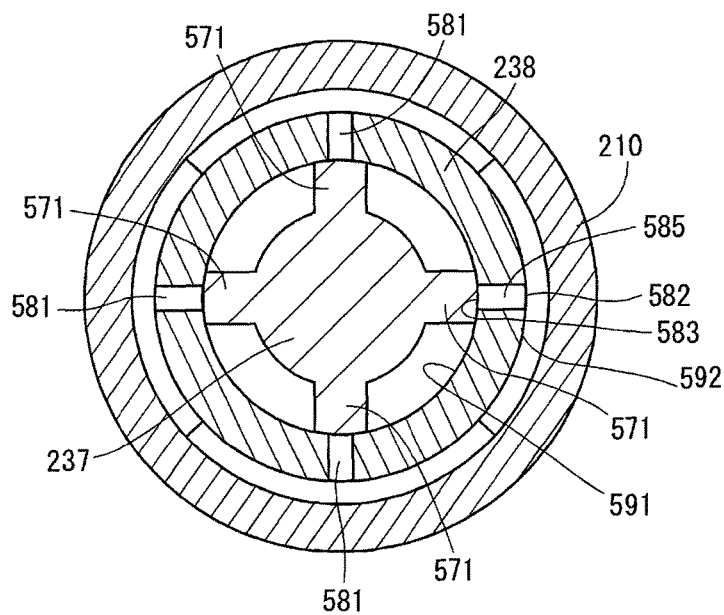
FIG. 33B is a cross-sectional view taken along a line IIIb-IIIb in FIG. 33A.

As illustrated in FIGS. 33A and 33B, the inner needle flanges 571 of the same number as that of the communication holes are formed, enlarged in the radially outward direction, and protruded from the outer surface 578, as with the housing flanges 301. The inner needle flanges 571 are abutted against the inner surface 591 of the outer needle 238.

The inner needle flanges 571 cover the outlet surfaces 584 of the communication holes 581 when the inner needle 237 performs the valve closing operation.

When the inner needle 237 slides, upper end surfaces 576 of the inner needle flanges 571 are abutted against a lower end surface 586 of the protruding portion 589 of the outer needle 238. Further, when the inner needle 237 slides, the respective inner needle flanges 571 pass through the outlet surfaces 584 of the communication holes 581.

The drive unit 290 opens or closes the fuel passage 223 of the first back pressure chamber 221, and includes an electronic control unit (ECU). The drive unit 290 includes a solenoidal coil that generates a magnetic attractive force upon receiving an energization according to an instruction from the ECU, and displaces the fuel passage 223 in an open direction.

Then, the operation of the injector 1 according to the third embodiment will be described.

A high-pressure fuel is supplied to the nozzle chamber 211 of the housing 210 from the common rail 208 through the fuel passages 224 and 217. The high-pressure fuel in the nozzle chamber 211 is supplied through the communication holes 581 of the outer needle 238. The supplied fuel is exerted on a pressure receiving surface 372 of first flanges 571 of the inner needle 237, and urges the inner needle 237 toward a valve opening direction. In this example, a pressure receiving surface may be provided, separately. For example, a fuel passage hole that passes through the outer needle 238 is provided on the rear end side of the housing flanges 301. The high-pressure fuel in the nozzle chamber 211 is supplied through the fuel passage hole, and the supplied fuel acts on the recessed surface of the inner needle as the pressure receiving surface.

The high-pressure fuel of the same pressure as that of the nozzle chamber 211 is supplied to the first back pressure chamber 221 from the common rail 208 through the fuel passage 225. The high-pressure fuel in the first back pressure chamber 221 acts on the head part 297 of the inner needle 237, and urges the inner needle 237 in a valve closing direction.

It is assumed that an urging force that acts on the head part 297 by the aid of a fuel pressure in the first back pressure chamber 221 is F1, and an urging force of the inner needle spring 292 is Fs1. It is assumed that an urging force that acts on the pressure receiving surface 372 by the aid of the fuel pressure of the nozzle chamber 211 is Fi. The urging forces F1 and Fs1 urge the inner needle 237 in the valve closing direction, and the urging force Fi urges the inner needle 237 in the valve opening direction.

When the solenoidal coil of the drive unit 290 is deenergized, in other words, when a valve body is displaced in the closing direction, the following Relational Expression (6) is satisfied.

$$F1+Fs1>Fi \quad (6)$$

For that reason, the seat part 218 of the inner needle 237 is seated on the valve seat 213, and closes the first injection holes 321.

It is assumed that an urging force that acts on the head part 298 by the aid of a fuel pressure in the second back pressure chamber 222 is F2 and an urging force of the outer needle spring 293 is Fs2. The urging forces F2 and Fs2 urge the outer needle 238 in the valve closing direction. The outer needle 238 is urged by the urging forces F2 and Fs2. The seat part 219 of the outer needle 238 is seated on the valve seat 213, and closes the second injection holes 322.

When the solenoidal coil of the drive unit 290 is energized according to an instruction from the ECU, the fuel flows out of the first back pressure chamber 221, and the fuel pressure in the first back pressure chamber 221 is decreased. In this situation, the following Relational Expression (7) is satisfied.

$$F1+Fs1<Fi \quad (7)$$

For that reason, the inner needle 237 slides in the valve opening direction. When the seat part 218 of the inner needle 237 is unseated from the valve seat 213, the nozzle chamber 211 communicates with the first injection holes 321, and the fuel is injected from the first injection holes 321.

When the solenoidal coil is continuously energized, the upper end surfaces 576 of the first flange 571 of the inner needle 237 are abutted against the lower end surface 586 of the protruding portion 589 of the outer needle 238. The inner needle 237 is abutted against the outer needle 238, and it is assumed that an urging force by which the inner needle 237 acts on the outer needle 238 is Fio. The urging force Fio urges the outer needle 238 in the valve opening direction. In this situation, the following Relational Expression (8) is satisfied.

$$F2+Fs2<Fio \quad (8)$$

For that reason, the outer needle 238 slides in the valve opening direction together with the inner needle 237. When the seat part 219 of the outer needle 238 is unseated from the valve seat 213, the fuel is injected from the first injection holes 321 and the second injection holes 322.

When the energization of the solenoidal coil stops according to an instruction of the ECU, the fuel flows into the first back pressure chamber 221 through the fuel passage 225, and the fuel pressure in the first back pressure chamber 221 increases. As a result, the Relational Expression (6) is satisfied. For that reason, the inner needle 237 slides in the valve closing direction. In this situation, because the urging force Fo becomes zero, the outer needle 238 also slides in the valve closing direction due to the urging forces F2 and Fs2. In other words, both of the inner needle 237 and the outer needle 238 slide in the valve closing direction. When the seat part 218 of the inner needle 237 is seated on the valve seat 213, the fuel injection of the first injection holes 321 is stopped. Likewise, when the seat part 219 of the outer needle 238 is seated on the valve seat 213, the fuel injection of the second injection holes 322 is stopped.

Then, the flow channels configured by the housing 210, the outer needle 238, and the inner needle 237 will be described. The flow channels thus configured include a first flow channel 227, a second flow channel 228, a third flow channel 229, inlet hole flow channels 583, and outlet hole flow channels 585.

Figure 34:
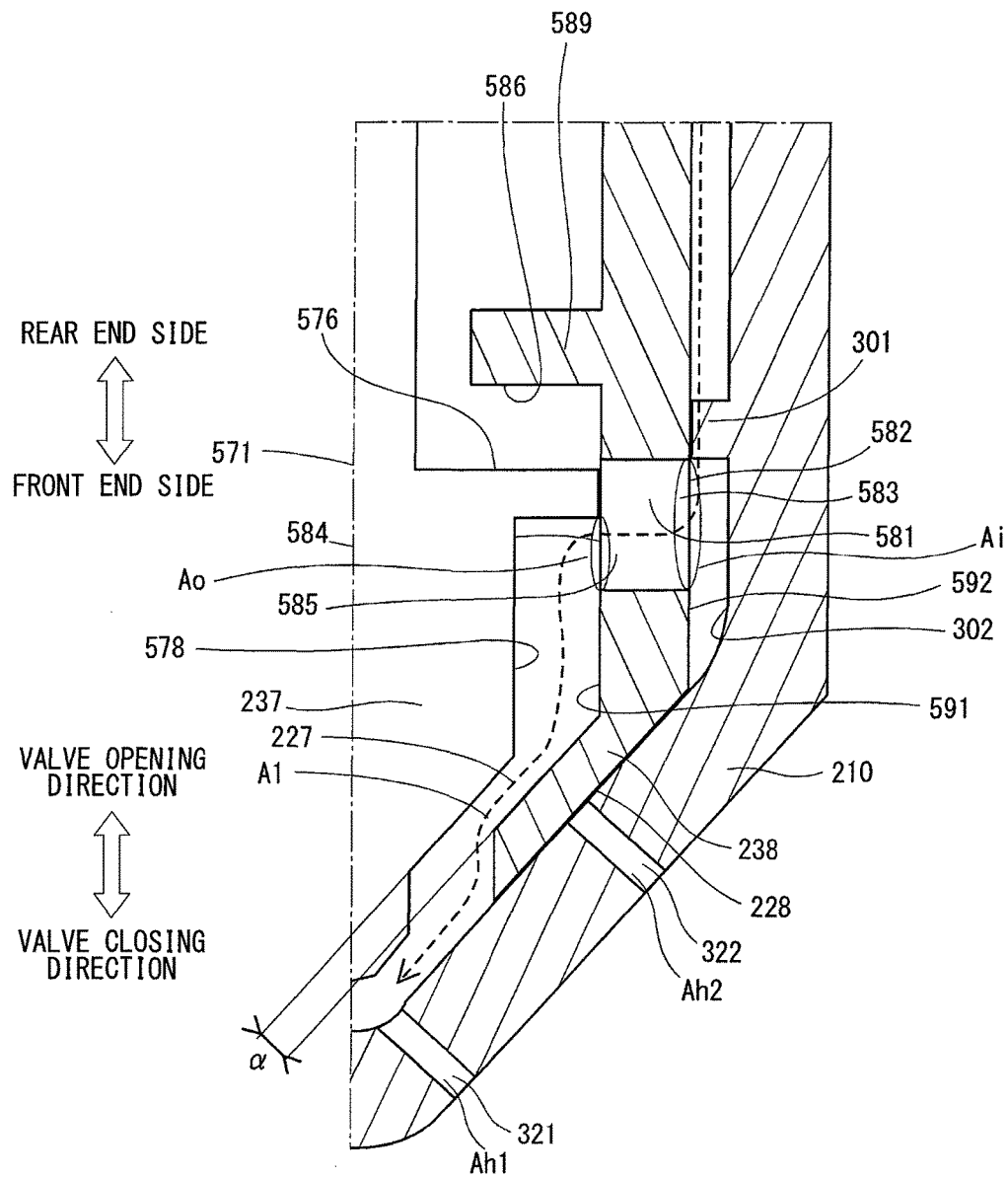
FIG. 34 is an enlarged view of a part IV in FIG. 32A when the injector valve is opened according to the third embodiment.

As illustrated in FIG. 34, the first flow channel 227 is a flow channel provided between the outer surface 578 of the inner needle 237 and the inner surface 591 of the outer needle 238. It is assumed that a flow channel area of the first flow channel is A1. The flow channel area A1 is an area of a side surface of a truncated cone with a shortest distance α between the outer surface 578 of the inner needle 237 and the inner surface 591 of the outer needle 238 as a hypotenuse.

Figure 35:
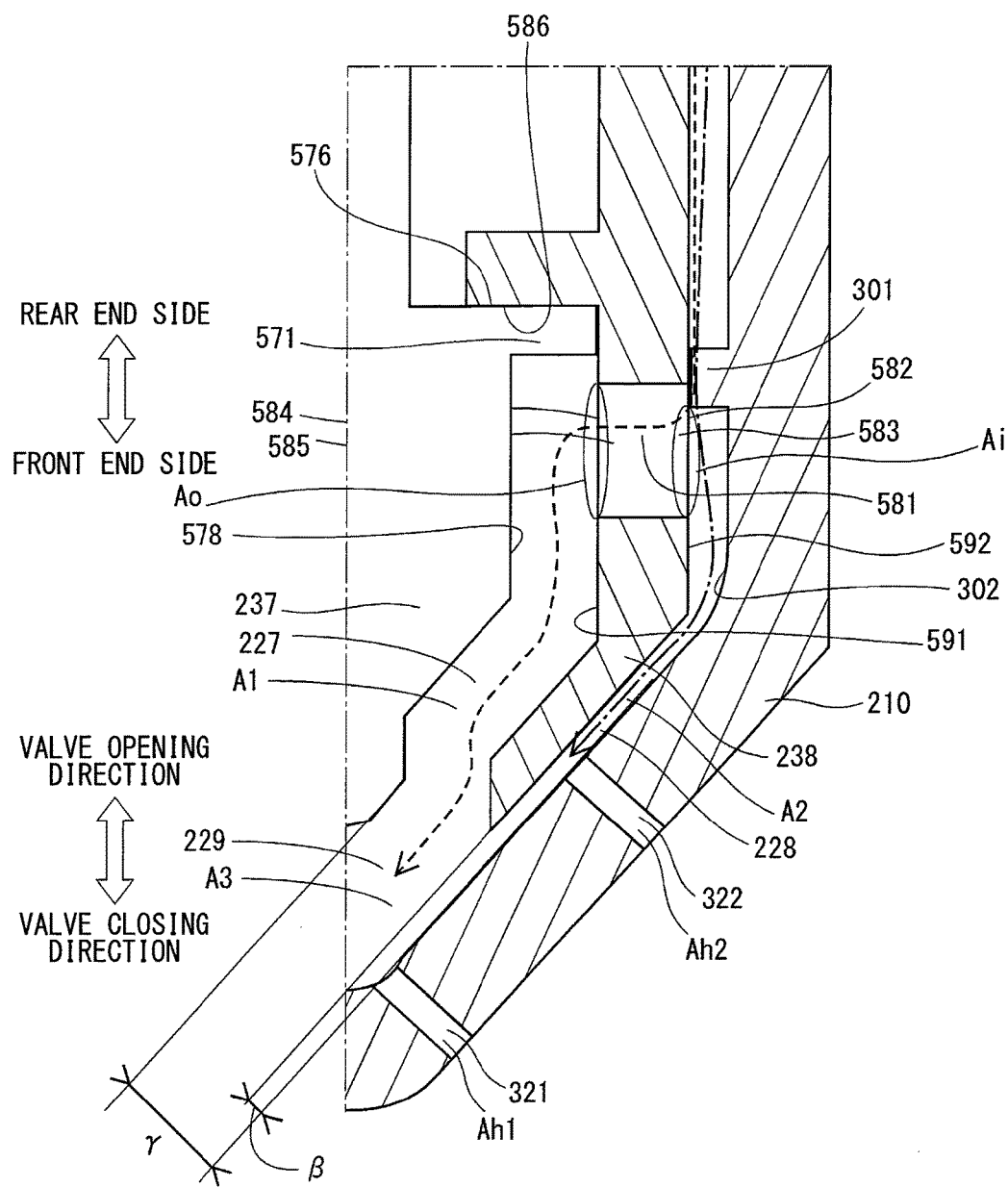
FIG. 35 is an enlarged view of a part V in FIG. 32A when the injector valve is closed according to the third embodiment.

As illustrated in FIG. 35, the second flow channel 228 is a flow channel provided between the outer surface 592 of the outer needle 238 and the inner surface 302 of the housing 210. It is assumed that a flow channel area of the second flow channel 228 is A2. The flow channel area A2 is an area of a side surface of a truncated cone with a shortest distance 13 between the outer surface 592 of the outer needle 238 and the inner surface 302 of the housing 210 as a hypotenuse.

The third flow channel 229 is a flow channel provided between the outer surface 578 of the inner needle 237 and the inner surface 302 of the housing 210. It is assumed that a flow channel area of the third flow channel 228 is A3. The flow channel area A3 is an area of a side surface of a truncated cone with a shortest distance γ between the outer surface 578 of the inner needle 237 and the inner surface 302 of the housing 210 as a hypotenuse.

Each of the inlet hole flow channels 583 is a flow channel provided between each housing flange 301 and the inlet surface 582 of the corresponding communication hole 581. It is assumed that a flow channel area of the inlet hole flow channel 583 is Ai. The flow channel area Ai is maximal when the outer needle 238 performs the valve closing operation. The housing flanges 301 are located on the rear end side of the communication holes 581 when the outer needle 238 performs the valve closing operation, and do not close the inlet surfaces 582 of the respective communication holes 581.

Each of the outlet hole flow channels 585 is a flow channel provided between each inner needle flange 571 and the outlet surface 584 of the corresponding communication hole 581. It is assumed that a flow channel area of the outlet hole flow channel 585 is Ao. It is assumed that the flow channel area Ao when the inner needle 237 performs the valve closing operation is Ao0. The first flow channel 227 communicates with the outlet hole flow channels 585, in other words, the flow channel area Ao0>0 is met.

As indicated by dashed lines in FIGS. 34 and 35, the high-pressure fuel supplied from the nozzle chamber 211 is injected from the first injection holes 321 through the outlet hole flow channels 585 and the first flow channel 227 when the inner needle 237 slides in the valve opening direction. As indicated by chain lines, the high-pressure fuel is injected from the second injection holes 322 through the second flow channel 228 when the outer needle 238 slides in the valve opening direction.

It is assumed that a change rate of the flow channel area A1 to a time when the inner needle 237 slides in the valve opening direction is $\Delta A1$, and a change rate of the flow channel area A2 to the time when the outer needle 238 slides in the valve opening direction is $\Delta A2$. It is assumed that a change rate of the flow channel area A3 to the time when the inner needle 237 slides in the valve opening direction is $\Delta A3$.

It is assumed that a change rate of the flow channel area Ai to the time when the respective housing flanges 301 pass through the inlet surfaces 582 of the communication holes 581 is $\Delta Ai$. It is assumed that a change rate of the flow channel area Ao to the time when the respective inner needle flanges 571 pass through the outlet surfaces 584 of the communication holes 581 is $\Delta Ao$. In the present specification, the change rate may be set as the amount of sliding of the inner needle 237 and the outer needle 238, in other words, a change rate of the flow channel area to the amount of lift.

The diameters of the housing 210, the housing flanges 301, the inner needle 237, the inner needle flanges 571, the outer needle 238, and the communication holes 581 are set to satisfy the following Relational Expressions (4.1) to (4.3).

$$Ao0>0 \quad (4.1)$$

$$\Delta A1>\Delta Ao \quad (4.2)$$

$$\Delta A2>|\Delta Ai| \quad (4.3)$$

Because the change rate $\Delta Ai$ has a negative value, Relational Expression (4.3) uses an absolute value. The respective housing flanges 301 are configured to close and open the inlet hole flow channels 583 when the outer needle 238 slides.

It is assumed that a flow channel area of the first injection holes 321 is Ah1, and a flow channel area of the second injection holes 322 is Ah2. It is assumed that a maximum value of the flow channel area Ao is Max(Ao). It is assumed that a maximum value of the flow channel area A2 is Max(A2), and the diameter of the first injection holes 321 and the diameter of the second injection holes 322 are set to satisfy the following Relational Expressions (5.1) and (5.2).

$$\text{Max}(Ao) \geq Ah1 > Ao0 \quad (5.1)$$

$$\text{Max}(A2) \geq Ah2 \quad (5.2)$$

Subsequently, the fuel injection amount of the injector 1 according to the third embodiment will be described.

The fuel injection amount is represented by the following Relational Expression (9) on the basis of an expression of an orifice under the law of Bernoulli.

$$Q=C \times A\min \times \sqrt{(2\Delta P/\rho)} \quad (9)$$

In this expression, Q is a fuel injection amount, C is a flow rate coefficient, Amin is a minimum flow channel area, $\Delta P$ is a pressure difference, and $\rho$ is a density. The flow rate coefficient C is a coefficient caused by a structure, which is a constant. The pressure difference $\Delta P$ is a constant because the supplied fuel pressure is kept constant. The fuel is incompressible, and the density $\rho$ is a constant. Therefore, the fuel injection amount is determined according to the minimum flow channel area Amin into which the fuel is injected. Hereinafter, the fuel injection amount will be described with the minimum flow channel area Amin.

It is assumed that a minimum flow channel area of the path into which the fuel is injected from the first injection holes 321 through the first flow channel 227 is Amin1. In the third embodiment, the third flow channel 229 is not used because the flow channel area A3 is large. It is assumed that a minimum flow channel area of the path into which the fuel is injected from the second injection holes 322 through the second flow channel 228 is Amin2. The minimum flow channel area Amin related to the fuel injection amount according to the third embodiment is a sum of Amin1 and Amin2.

In the present embodiment, the inner needle 237 has inner needle flanges 571 that are protruded outward in the radially inward direction, on the outer surface of the inner needle 237. The housing 210 has the housing flanges 301 that are protruded inward in the radially inward direction, on the inner surface of the housing 210. Further, the outer needle 238 has at least one communication holes 581.

The respective inner needle flanges 571 are formed to pass through the outlet surfaces 584 of the communication holes 581 of the outer needle 238 when the inner needle 237 slides in the valve opening direction. The respective housing flanges 301 are formed to pass through the inlet surfaces 582 of the communication holes 581 of the outer needle 238 when the outer needle 238 slides in the valve opening direction. As a result, the flow channel area of the flow channel to which the fuel is supplied can be changed, and the fuel injection amount can be controlled with high precision.

The action of changing the flow channel area by the aid of the inner needle flanges 571, the housing flanges 301, and the communication holes 581 of the outer needle 238 according to the third embodiment will be described with reference to FIGS. 36 to 42.

Figure 36:
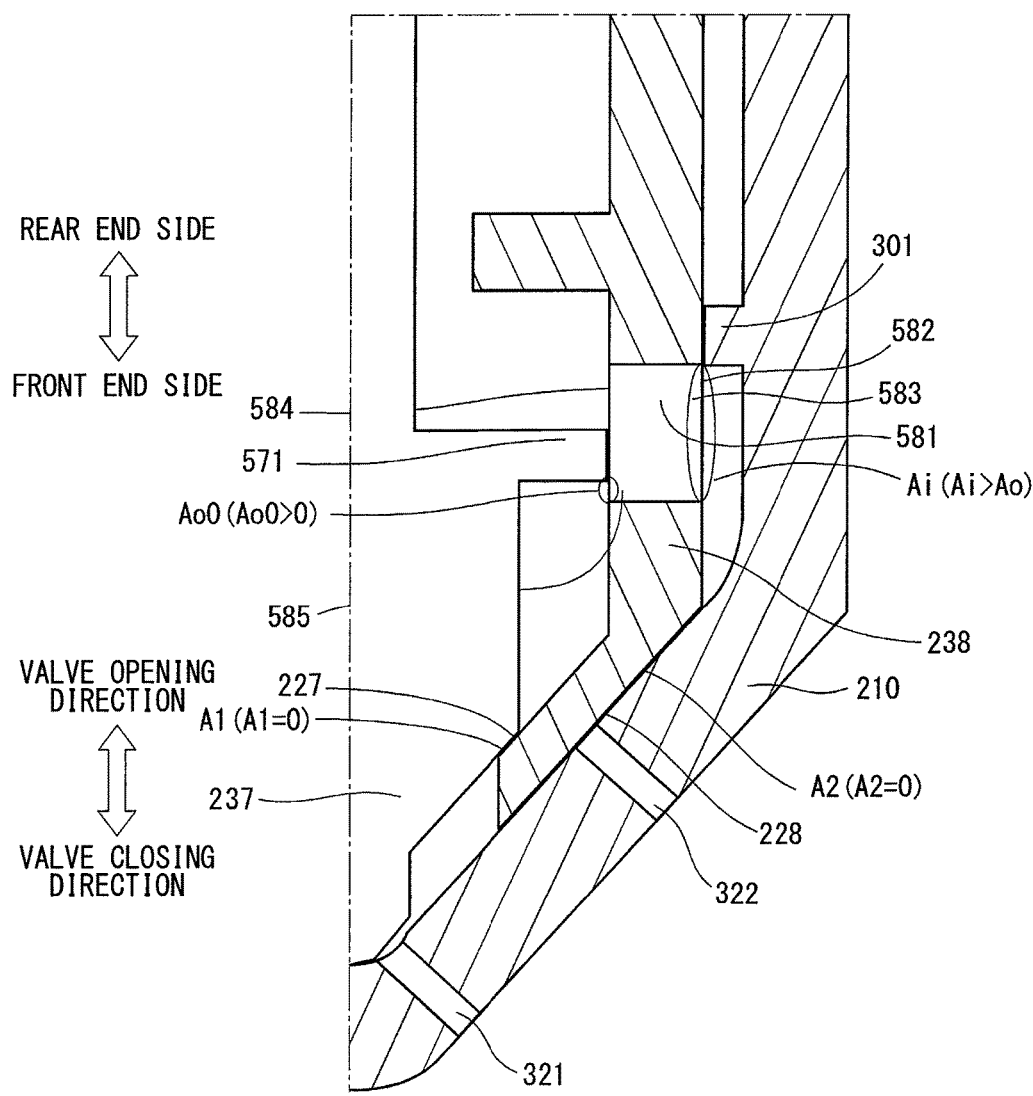
FIG. 36 is an enlarged view of a part VI in FIG. 32A when an inner needle flange starts to pass through an outlet surface of a communication hole in the injector according to the third embodiment.

As illustrated in FIG. 36, when the solenoidal coil is deenergized, the respective inner needle flanges 571 overlap with the outlet surfaces 584 of the communication holes 581. The outlet hole flow channels 585 are opened, and communicate with the first flow channel 227, in other words, Ao0>0 is met. The flow channel area Ao is smaller than the flow channel area Ai, in other words, a relationship of Ai>Ao is met. Because the inner needle 237 and the outer needle 238 close the valve, the flow channel area A1 is zero, and the flow channel area A2 is zero. Therefore, the minimum flow channel area Amin1 at that time is zero, and the minimum flow channel area Amin2 is zero.

Figure 37:
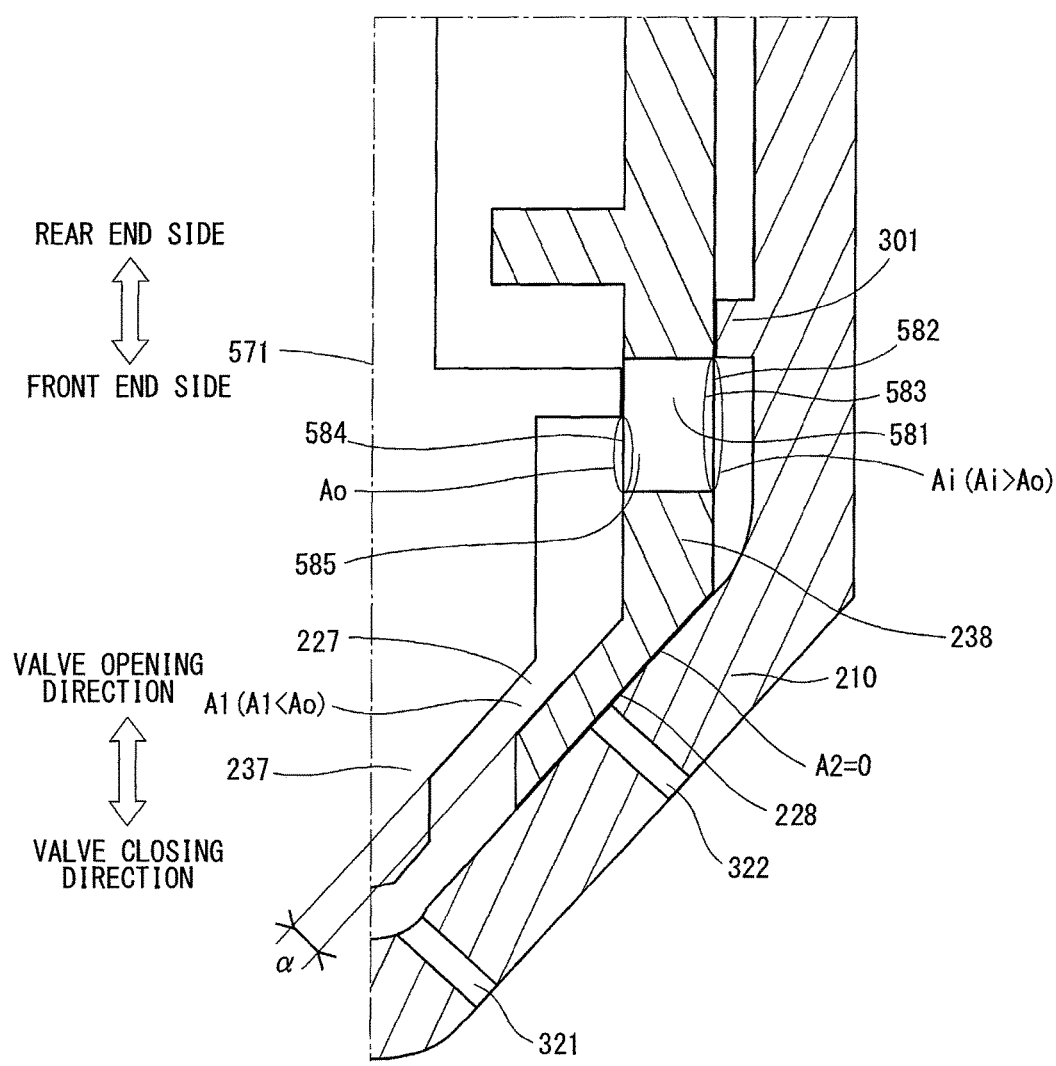
FIG. 37 is an enlarged view of a part VII in FIG. 32A when the inner needle flange passes through the outlet surface of the communication hole in the injector according to the third embodiment.

As illustrated in FIG. 37, when the solenoidal coil is energized according to an instruction from the ECU, the inner needle 237 slides in the valve opening direction. The inner needle 237 opens the first flow channel 227, and the respective inner needle flanges 571 open the outlet hole flow channels 585. In this situation, the following Relational Expressions (7.1) to (7.4) are satisfied through Relational Expression (4.1).

$$Ao > A1 \tag{7.1}$$

$$Amin1 = A1 \tag{7.2}$$

$$Amin2 = 0 \tag{7.3}$$

$$Amin = A1 \tag{7.4}$$

Therefore, the fuel injection amount at that time is determined according to the flow channel area A1.

With the sliding of the inner needle 237 in the valve opening direction, the first flow channel 227 is opened, the distance α increases, and the flow channel area A1 increases. Because the respective inner needle flanges 571 open the outlet hole flow channels 585, the flow channel area Ao increases.

Figure 38:
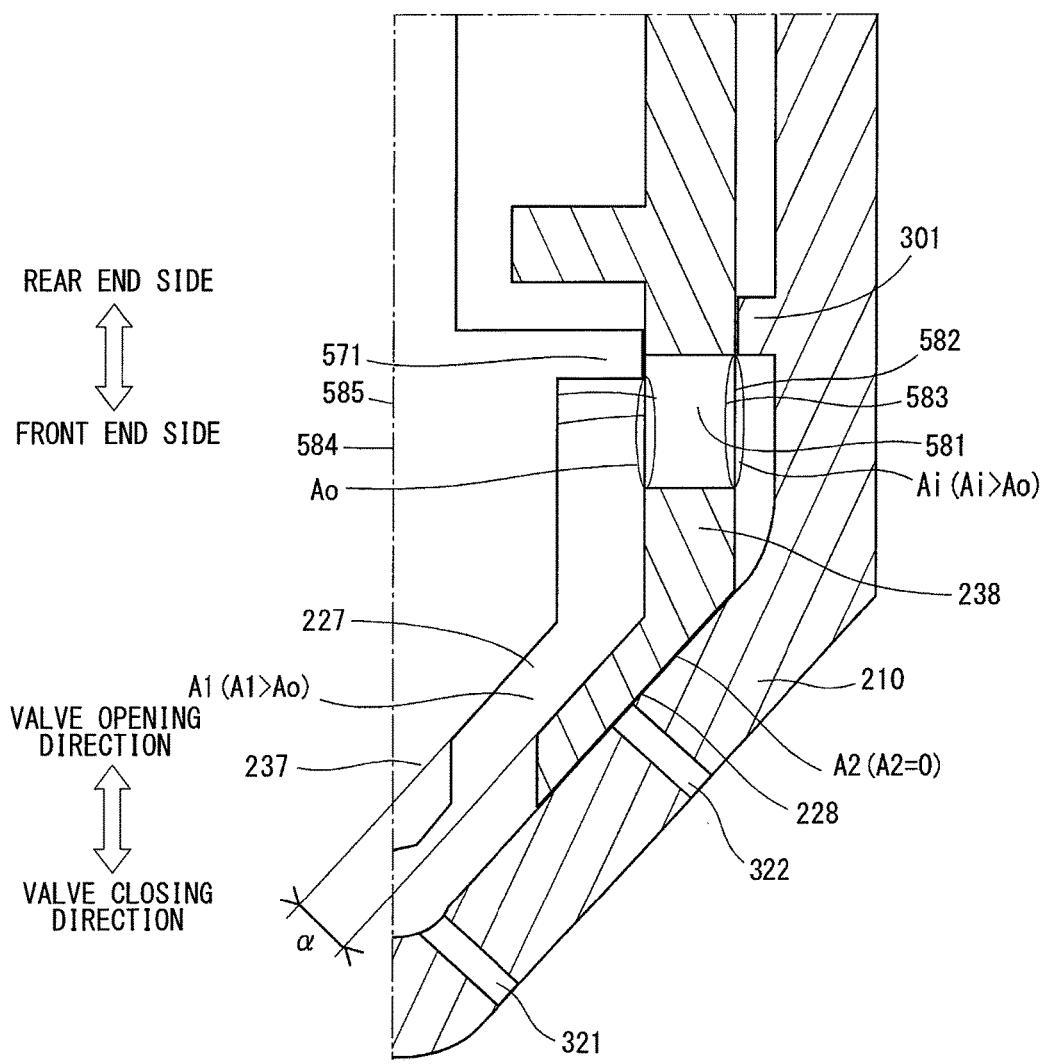
FIG. 38 is an enlarged view of a part VIII in FIG. 32A when the inner needle flange passes through the outlet surface of the communication hole in the injector according to the third embodiment.

As illustrated in FIG. 38, when the respective inner needle flanges 571 pass through the outlet surfaces 584 of the communication holes 581, the following Relational Expressions (8.1) to (8.4) are satisfied through Relational Expression (4.2).

$$A1 > Ao \tag{8.1}$$

$$Amin1 = Ao \tag{8.2}$$

$$Amin2 = 0 \tag{8.3}$$

$$Amin = Ao \tag{8.4}$$

Therefore, the fuel injection amount at that time is determined according to the flow channel area Ao.

Figure 39:
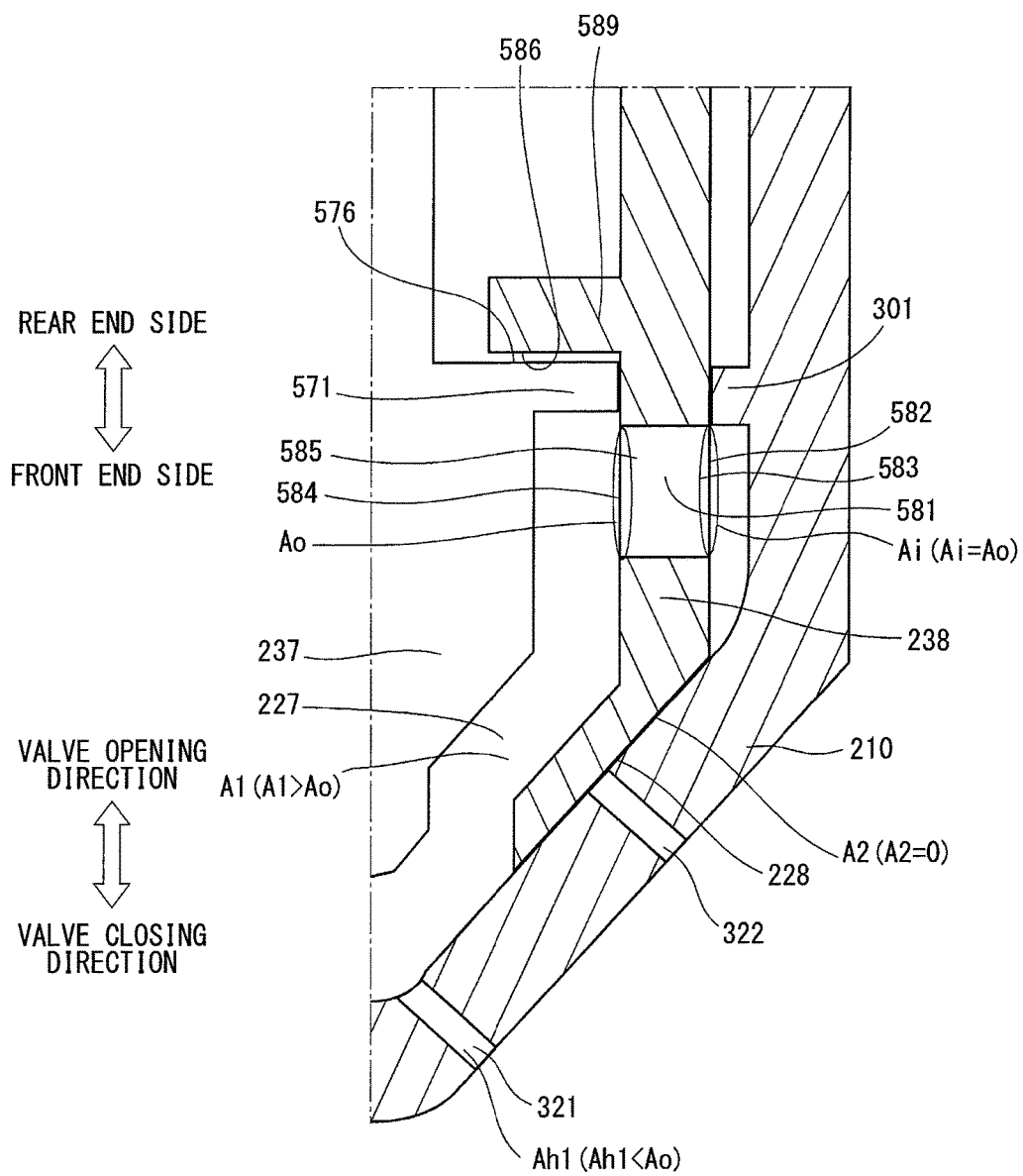
FIG. 39 is an enlarged view of a part IX in FIG. 32A after the inner needle flange has passed through the outlet surface of the communication hole in the injector according to the third embodiment.

As illustrated in FIG. 39, the respective inner needle flanges 571 open the closed outlet hole flow channels 585, and the flow channel area Ao is maximal. In other words, the flow channel area Ao at that time is Max (Ao). The flow channel area Ao is equal to the flow channel area Ai, in other words, Ao=Ai is met. The following Relational Expressions (9.1) to (9.3) are satisfied through Relational Expression (5.1).

$$Amin1 = Ah1 \tag{9.1}$$

$$Amin2 = 0 \tag{9.2}$$

$$Amin = Ah1 \tag{9.3}$$

Therefore, the fuel injection amount at that time is determined according to the flow channel area Ah1.

Further, when the inner needle 237 slides in the valve opening direction, the upper end surfaces 576 of the inner needle flanges 571 are abutted against the lower end surface 586 of the protruding portion 589 of the outer needle 238. In other words, both of the inner needle 237 and the outer needle 238 slide in the valve opening direction.

Figure 40:
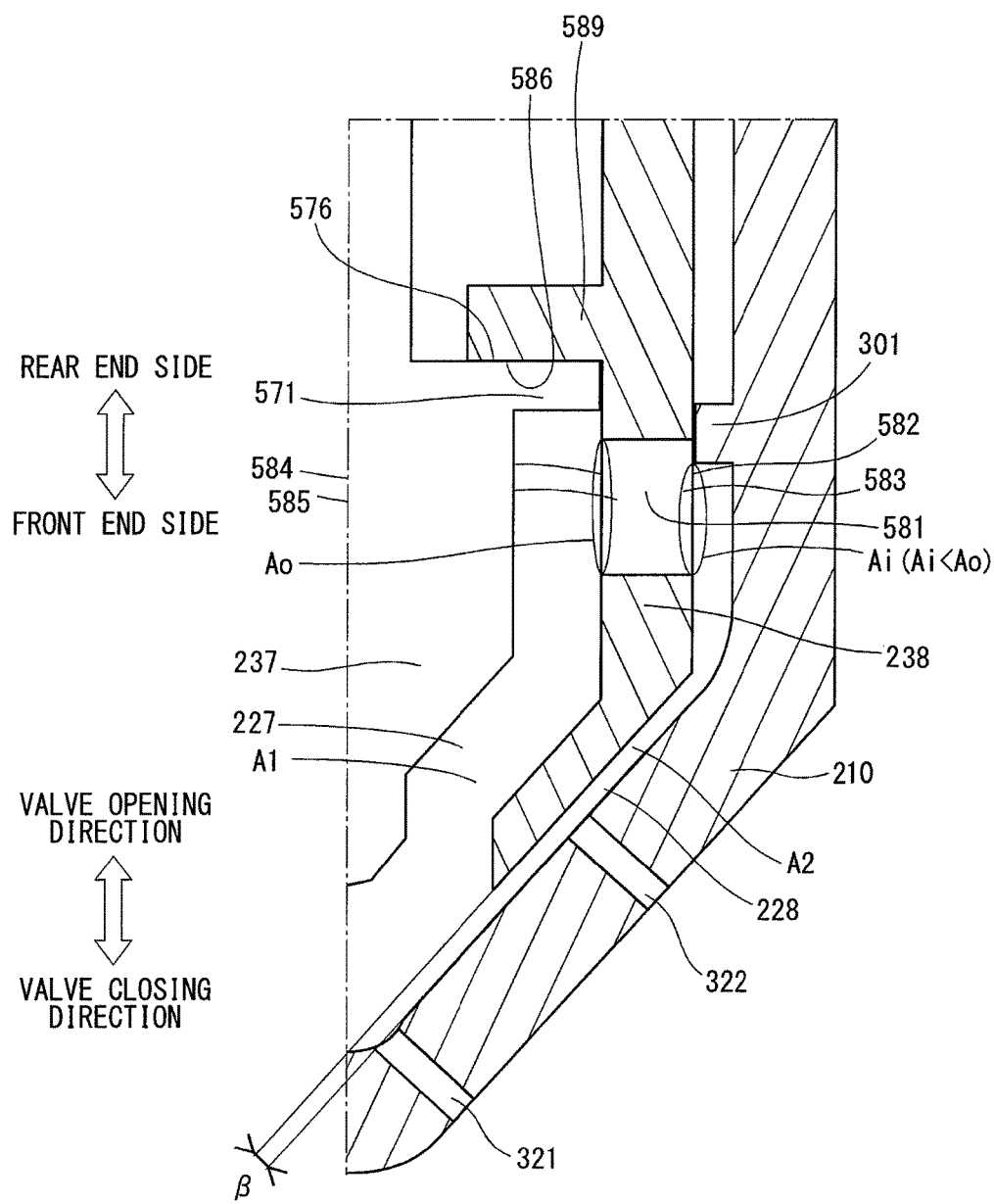
FIG. 40 is an enlarged view of a part X in FIG. 32A when a housing flange passes through an inlet surface of the communication hole in the injector according to the third embodiment.

As illustrated in FIG. 40, the outer needle 238 opens the second flow channel 228, and the respective housing flanges 301 close the inlet hole flow channels 583. In this situation, the following Relational Expressions (10.1) to (10.4) are satisfied.

$$Ao > Ai \tag{10.1}$$

$$Amin1 = Ai \tag{10.2}$$

$$Amin2 = A2 \tag{10.3}$$

$$Amin = Ai + A2 \tag{10.4}$$

Therefore, the fuel injection amount at that time is determined according to a sum of the flow channel areas Ai and A2.

With the sliding of the outer needle 238, the second flow channel 228 is opened, the distance β increases, and the flow channel area A2 increases.

Figure 41:
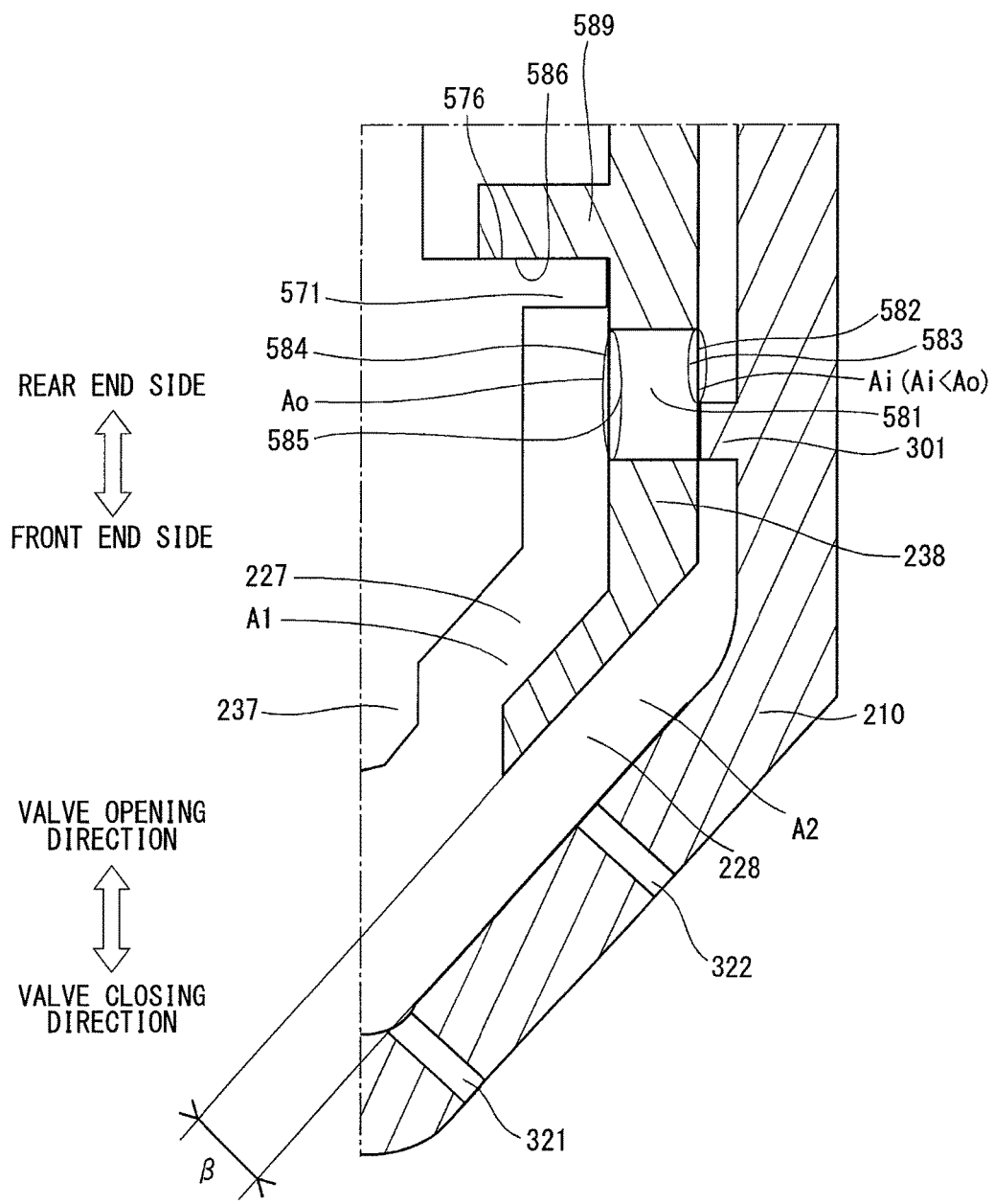
FIG. 41 is an enlarged view of a part XI in FIG. 32A when the housing flange passes through the inlet surface of the communication hole in the injector according to the third embodiment.

As illustrated in FIG. 41, when the respective end surfaces of the housing flanges 301 are included in the inlet surfaces 582 of the communication holes 581, the areas of the inlet hole flow channels 583 are not changed. Therefore, the change rate ΔAi becomes zero, the flow channel area Ai is kept constant. The flow channel area in this situation satisfies the following Relational Expressions (11.1) to (11.4) as with the Relational Expressions (10.1) to (10.4).

$$Ao > Ai \tag{11.1}$$

$$Amin1 = Ai \tag{11.2}$$

$$Amin2 = A2 \tag{11.3}$$

$$Amin = Ai + A2 \tag{11.4}$$

Therefore, the fuel injection amount at that time is determined according to a sum of the flow channel areas Ai and A2.

Further, when the respective housing flanges 301 pass through the inlet surfaces 582, the housing flanges 301 open the inlet hole flow channels 583. In this situation, the change rate ΔAi is a positive value, and the flow channel area Ai increases.

Figure 42:
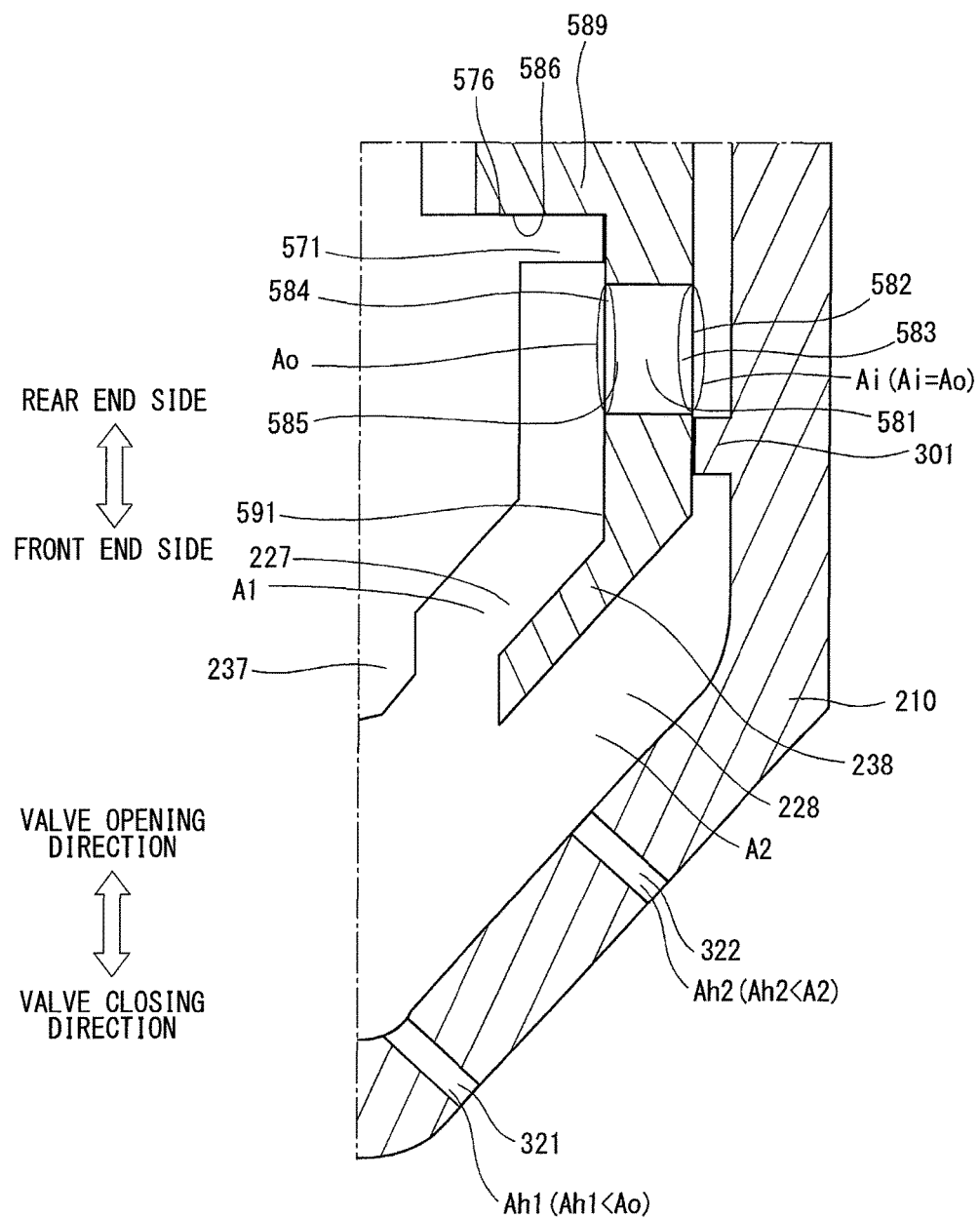
FIG. 42 is an enlarged view of a part XII in FIG. 32A after the housing flange has passed through the inlet surface of the communication hole in the injector according to the third embodiment.

As illustrated in FIG. 42, the respective housing flanges 301 fully open the inlet hole flow channels 583. The following Relational Expressions (12.1) to (12.4) are satisfied through Relational Expressions (5.1) and (5.2).

$$Ao = Ai \tag{12.1}$$

$$Amin1 = Ah1 \tag{12.2}$$

$$Amin2 = Ah2 \tag{12.3}$$

$$Amin = Ah1 + Ah2 \tag{12.4}$$

Therefore, the fuel injection amount at that time is determined according to a sum of the flow channel areas Ah1 and Ah2.

Figure 43:
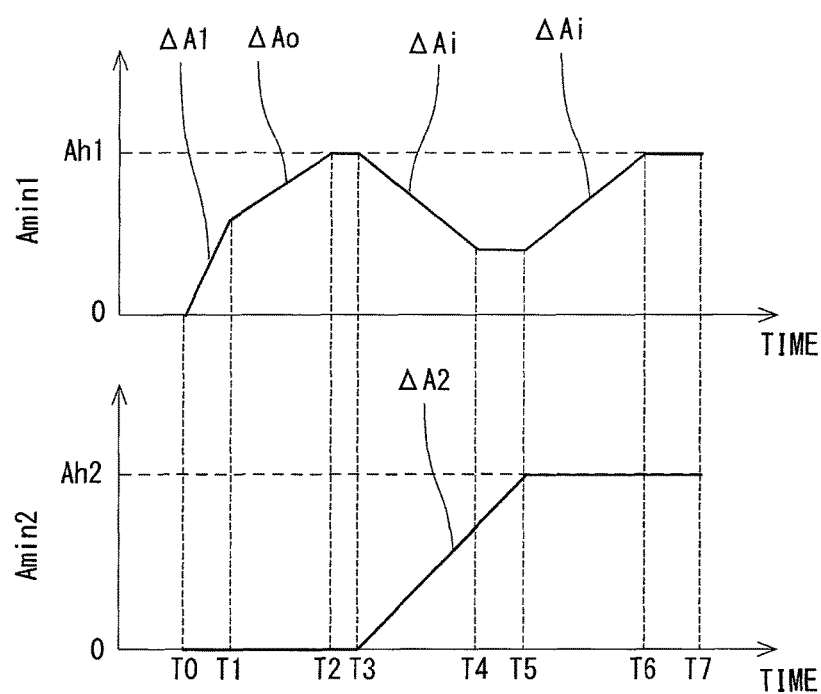
FIG. 43 is a characteristic view illustrating a change in a flow channel area in the injector according to the third embodiment.

A change in the minimum flow channel area Amin1 and the minimum flow channel area Amin2 to the time according to the third embodiment will be described with reference to FIG. 43. In this example, it is assumed that the change rate of the minimum flow channel area Amin1 to the time is ΔAmin1, and the change rate of the minimum flow channel area Amin2 to the time is ΔAmin2.

Times T0 to T1 correspond to FIGS. 36 and 37, and are times since the respective inner needle flanges 571 start to pass through the outlet surfaces 584 until passing through the outlet surfaces 584. The time T0 is a time when the solenoidal coil is energized according to the instruction from the ECU. The time T1 is a time when the flow channel area A1 becomes equal to the flow channel area Ao. The change rates ΔAmin1 and ΔAmin2 of the times T0 to T1 are represented by the following Expressions (7.5) and (7.6) on the basis of the Relational Expressions (7.2) and (7.3).

$$\Delta Amin1 = \Delta A1 \tag{7.5}$$

$$\Delta Amin2 = 0 \tag{7.6}$$

Likewise, the times T1 to T2 are times corresponding to FIG. 38. The change rates ΔAmin1 and ΔAmin2 of the times T1 to T2 are represented by the following Expressions (8.5) and (8.6) on the basis of the Relational Expressions (8.2) and (8.3).

$$\Delta Amin1 = \Delta Ao \tag{8.5}$$

$$\Delta Amin2 = 0 \tag{8.6}$$

The change rate ΔAmin1, in other words, an inclination of the minimum flow channel area Amin1 from the time T1 is decreased on the basis of Relational Expression (5.2). The time T2 is a time when the respective inner needle flanges 571 fully open the outlet hole flow channels 585.

The times T2 to T3 are times corresponding to FIG. 39. The change rates ΔAmin1 and ΔAmin2 of the times T2 to T3 are represented by the following Expressions (9.4) and (9.5) on the basis of the Relational Expressions (9.1) and (9.2).

$$\Delta Amin1 = 0 \tag{9.4}$$

$$\Delta Amin2 = 0 \tag{9.5}$$

The change rate ΔAmin1 of the times T2 to T3 is zero because the minimum flow channel area Amin1 is the flow channel area Ah1. The change rate ΔAmin2 of the times T0 to T3 is zero because the outer needle valve is closed.

The time T3 is a time when the upper end surfaces 576 of the inner needle flanges 571 are abutted against the lower end surface 586 of the protruding portion 589 of the outer needle 238.

The times T3 to T4 are times corresponding to FIG. 40. The change rates ΔAmin1 and ΔAmin2 of the times T3 to T4 are represented by the following Expressions (10.5) and (10.6) on the basis of the Relational Expressions (10.2) and (10.3).

$$\Delta Amin1 = \Delta Ai \tag{10.5}$$

$$\Delta Amin2 = \Delta A2 \tag{10.6}$$

At the times T3 to T4, because the respective housing flanges 301 close the inlet hole flow channels 583, the change rate ΔAi has a negative value. For that reason, the minimum flow channel area Amin1 decreases. A sum of the change rates ΔAmin1 and ΔAmin2 increases on the basis of the Relational Expression (4.3). Therefore, even at the times T3 to T4, the fuel injection amount increases.

The time T4 is a time when the respective end surfaces of the housing flanges 301 are included in the inlet surfaces 582 of the communication holes 581.

The times T4 to T5 are times corresponding to FIG. 41. The change rates ΔAmin1 and ΔAmin2 of the times T4 to T5 are represented by the following Expressions (11.5) and (11.6) on the basis of the Relational Expressions (11.2) and (11.3).

$$\Delta Amin1 = 0 \tag{11.5}$$

$$\Delta Amin2 = 0 A2 \tag{11.6}$$

The time T5 is a time when the flow channel area A2 exceeds the flow channel area Ah2, and also a time when the respective housing flanges 301 open the inlet hole flow channels 583.

The times T5 to T6 are times corresponding to FIG. 42. The change rates ΔAmin1 and ΔAmin2 of the times T5 to T6 are represented by the following Relational Expressions (12.5) and (12.6) on the basis of the Relational Expressions (12.2) and (12.3).

$$\Delta Amin1 = \Delta Ai \tag{12.5}$$

$$\Delta Amin2 = 0 \tag{12.6}$$

A time T6 is a time when the respective housing flanges 301 open the inlet hole flow channels 583. Therefore, at the times T6 to T7, the minimum flow channel area Amin1 is the flow channel area Ah1, and the minimum flow channel area Amin2 is the flow channel area Ah2. Both of the change rates ΔAmin1 and ΔAmin2 of the times T6 to T7 are zero because the flow channel area AM and the flow channel area Ah2 do not change.

As described above, the flow channel area can be changed by the inner needle flanges 571, the housing flanges 301, and the communication holes 581 of the outer needle 238. Therefore, the fuel injection amount can be changed according to the change in the flow channel area.

(Advantages)

Figure 44:
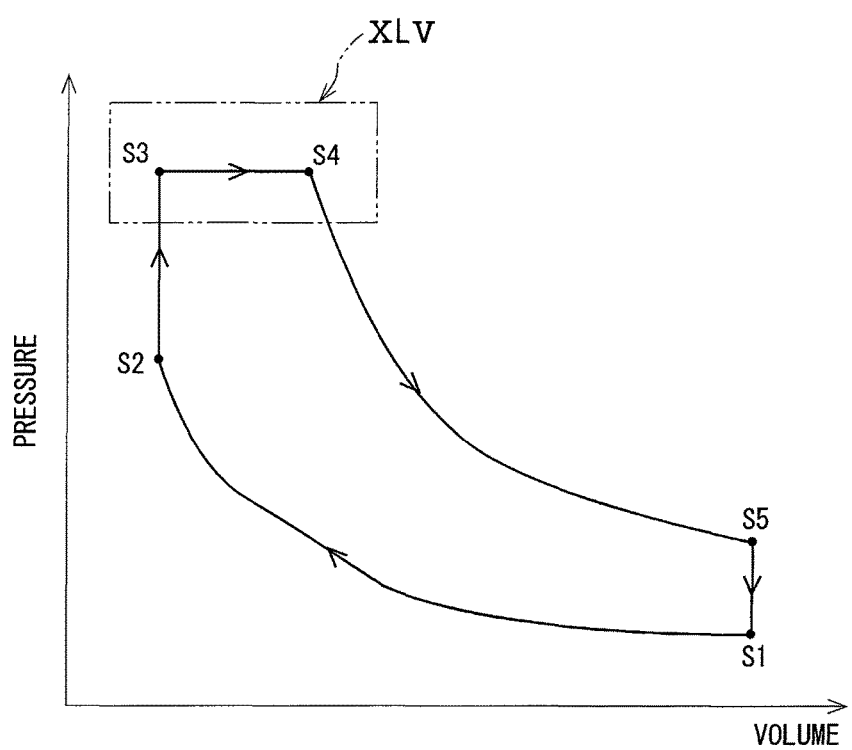
FIG. 44 is a characteristic view illustrating a thermal cycle of a Sabathe cycle having a constant pressure heating process.

First, the Sabathe cycle having a constant pressure heating process will be described with reference to FIG. 44.

The Sabathe cycle includes five processes including an adiabatic compression process of S1 to S2, a constant volume heating process of S2 to S3, a constant pressure heating process of S3 to S4, an adiabatic expansion process of S4 to S5, and a constant volume cooling process of S5 to S1. A process for the fuel injection is the constant pressure heating process of S3 to S4. In the constant pressure heating process, when the fuel is injected directly into a compressed air of high temperature and high pressure from the injector 1 at a high pressure, the fuel is naturally ignited and combusted, and the thermal energy is given into the combustion chamber under a constant pressure.

Referring to FIG. 45, as a comparative example, a relationship of the fuel injection amount to a time in a fuel injection device having no equivalents of the inner needle flange, the housing flange, and the communication hole of the outer needle, for example, disclosed in Patent Literature 2, is indicated by a dashed line. The fuel injection amount in the comparative example is converged on constant amounts of two stages. This is because the flow channel configuration is only flow channels corresponding to the first flow channel, the second flow channel, the first injection hole, and the second injection hole. The constant amount of a first stage is determined according to the minimum flow channel area of the first injection hole. Further, because the constant amount of a second stage is determined according to the minimum flow channel area of the first injection hole and the minimum flow channel area of the second injection hole, the fuel injection amount is converged on the constant amounts of the two stages.

On the contrary, in the present embodiment, the fuel injection device includes the inner needle flanges 571, the housing flanges 301, and the communication holes 581 of the outer needle. The inner needle flange 571 and the housing flange 301 change the flow channel areas of the inlet hole flow channel 583 and the outlet hole flow channel 585 of the communication hole 581 of the outer needle 238 by sliding between the inner needle 237 and the outer needle 238. As a result, a flow channel configuration is increased, and the controllability of the flow channel area is enhanced.

Figure 45A:
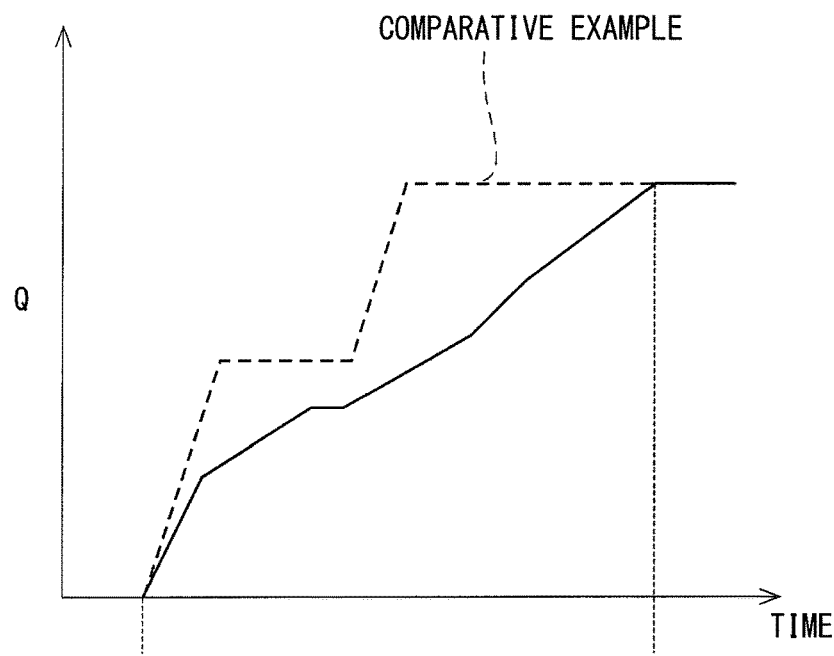
FIG. 45A is a characteristic view illustrating a fuel injection amount in the injector according to the third embodiment.

As illustrated in FIG. 45A, the fuel injection amount is changed according to the flow channel area, the fuel injection amount can be changed so as to be continuously increased.

Figure 45B:
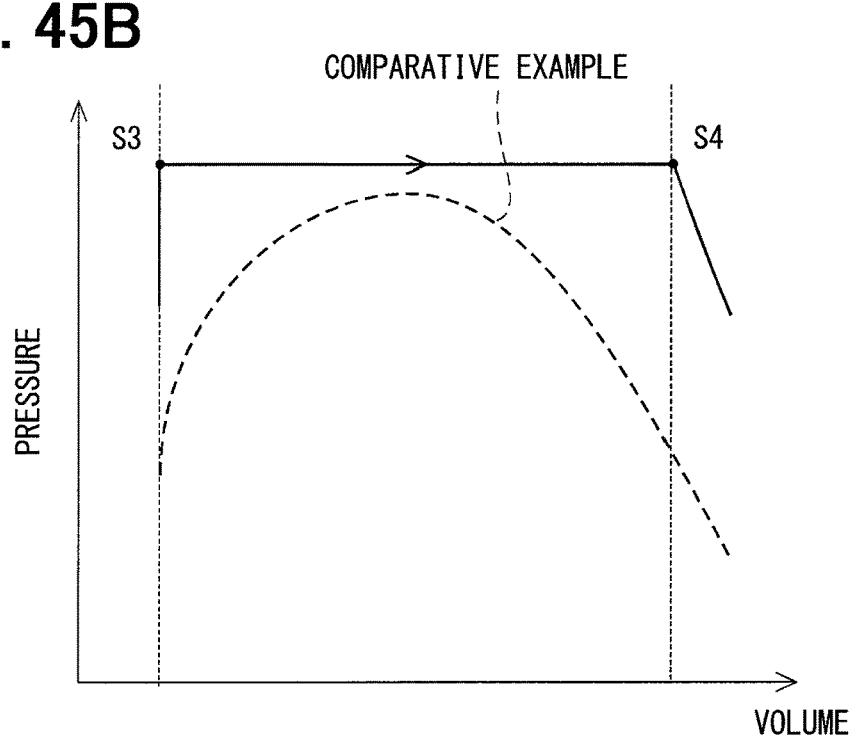
FIG. 45B is a characteristic view illustrating a constant pressure heating process of an enlarged view of a part XV in FIG. 44 in the injector according to the third embodiment.

As illustrated in FIG. 45B, in the Sabathe cycle of the comparative example, the pressure in the constant pressure heating process is decreased. On the other hand, in the present embodiment, the pressure in the constant pressure heating process is kept constant. In the comparative example, in the constant pressure heating process of the Sabathe cycle, because the fuel injection amount is kept constant, when the volume is increased, the in-cylinder pressure cannot be maintained, and the pressure is decreased.

In the present embodiment, the fuel injection amount is continuously increased to promote the combustion. In other words, an explosive force is continuously increased with the results that when the volume is increased, the in-cylinder pressure can be maintained, and the pressure is held constant. Therefore, the fuel injection amount can be maintained with high precision, the pressure drop in the constant pressure heating process of the Sabathe cycle can be suppressed, and the excellent combustion state can be maintained.

Fourth Embodiment

An injector 2 according to a fourth embodiment will be described with reference to FIGS. 46 to 54. In the fourth embodiment, in the same configuration as that of the third embodiment, the outer needle 238 performs the valve opening operation preceding the inner needle 237. Hereinafter, changes in the configurations of the housing 210, the outer needle 238, the inner needle 237, and the drive unit 290 will be described.

A housing 210 further includes a sealing valve 305 and a fuel passage 431 instead of the fuel passage 223.

The sealing valve 305 is formed on a rear end side of housing flanges 301. The sealing valve 305 comes in close contact with an outer surface 592 of an outer needle 238, and seals a high-pressure fuel supplied from a nozzle chamber 211. For that reason, no high-pressure fuel is supplied to the nozzle chamber 211 on a front end side of the sealing valve 305.

The fuel passage 431 communicates with a second back pressure chamber 222, and is connected to a drive unit 290.

The outer needle 238 is recessed on the front end side of a fuel passage 217, and includes an inter-needle flow channel 226, a pressure receiving surface 593, and a fuel passage hole 594. An arrangement of a protruding portion 589 of the outer needle 238 is changed.

The inter-needle flow channel 226 is a flow channel that is provided between an outer surface 578 of the inner needle 237 and an inner surface 591 of the outer needle 238, and located on a rear end side of the communication holes 581. The inter-needle flow channel 226 communicates with the second flow channel 228 through an outlet hole flow channel 585 and an inlet hole flow channel 583 when the outer needle 238 performs the valve closing operation.

The pressure receiving surface 593 is formed between the fuel passage 217 and the nozzle chamber 211, and recessed to receive a pressure of the high-pressure fuel supplied from the common rail 208 through the fuel passage 217.

The fuel passage hole 594 is disposed on the rear end side of the sealing valve 305, and passes through the inner surface 591 and the outer surface 592 of the outer needle 238. The fuel passage hole 594 supplies the high-pressure fuel supplied from a common rail through the fuel passage 217 and the nozzle chamber 211 to the inter-needle flow channel 226.

The protruding portion 589 is disposed on the front end side of the communication holes 581. When the outer needle 238 slides in a valve opening direction, an upper end surface 590 of the protruding portion 589 is abutted against lower end surfaces 577 of the inner needle flanges 571.

The inner needle 237 is abutted against the housing 210 when the inner needle 237 performs the valve closing operation, and has a third flow channel. The third flow channel is provided between the inner needle 237 and the housing 210.

The drive unit 290 is a valve body that opens and closes the fuel passage 431 of the second back pressure chamber 222, and includes a solenoidal coil as in the third embodiment.

The operation of the fourth embodiment will be described.

The high-pressure fuel supplied through the fuel passage 217 acts on the pressure receiving surface 593 of the outer needle 238. The high-pressure fuel in the nozzle chamber 211 is supplied to the third flow channel 229 through the fuel passage hole 594 of the outer needle 238 and the inter-needle flow channel 226.

It is assumed that an urging force when the fuel pressure acts on the pressure receiving surface 593 of the outer needle 238 is Fo. The urging force Fo urges the outer needle 238 in the valve opening direction.

When the solenoidal coil of the drive unit 290 is deenergized, the following Relational Expression (13) is satisfied.

$$F2+Fs2>Fo \tag{13}$$

The seat part 219 of the outer needle 238 is seated on the valve seat 213, and closes the second injection holes 322. In the fourth embodiment, the urging force Fi is zero, and the inner needle 237 is urged by the urging forces F1 and Fs1. For that reason, the seat part 218 of the inner needle 237 is seated on the valve seat 213, and closes the first injection holes 321.

When the solenoidal coil of the drive unit 290 is energized according to an instruction from the ECU, the fuel flows out of the second back pressure chamber 222, and the fuel pressure in the second back pressure chamber 222 is decreased. In this situation, the following Relational Expression (14) is satisfied.

$$F2+Fs2<Fo \tag{14}$$

For that reason, the outer needle 238 slides in the valve opening direction. When the seat part 219 of the outer needle 238 is unseated from the valve seat 213, the inter-needle flow channel 226, the second flow channel 228, and the second injection holes 322 communicate with each other, and the fuel is injected from the second injection holes 322.

When the solenoidal coil is continuously energized, the upper end surface 590 of the protruding portion 589 of the outer needle 238 is abutted against the lower end surface 577 of the inner needle flanges 571 of the inner needle 237. It is assumed that an urging force when the outer needle 238 acts on the inner needle 237 is Foi. The urging force Foi urges the inner needle 237 in the valve opening direction. In this situation, the following Relational Expression (15) is satisfied.

$$F1+Fs1<Foi \tag{15}$$

For that reason, the inner needle 237 slides in the valve opening direction together with the outer needle 238. When the seat part 218 of the inner needle 237 is unseated from the valve seat 213, the fuel is injected from the first injection holes 321 and the second injection holes 322.

When the energization of the solenoidal coil stops according to an instruction of the ECU, the fuel flows into the second back pressure chamber 222 through the fuel passage 451, and the fuel pressure in the second back pressure chamber increases. As a result, the Relational Expression (13) is satisfied. For that reason, as in the third embodiment, both of the outer needle 238 and the inner needle slide in the valve closing direction, and the fuel injection from the first injection holes 321 and the second injection holes 322 stop.

The configuration of the flow channels according to the fourth embodiment will be described. As in the third embodiment, in the configuration of the fuel channels, the first flow channel 227 is replaced with the third flow channel 229.

Figure 47:
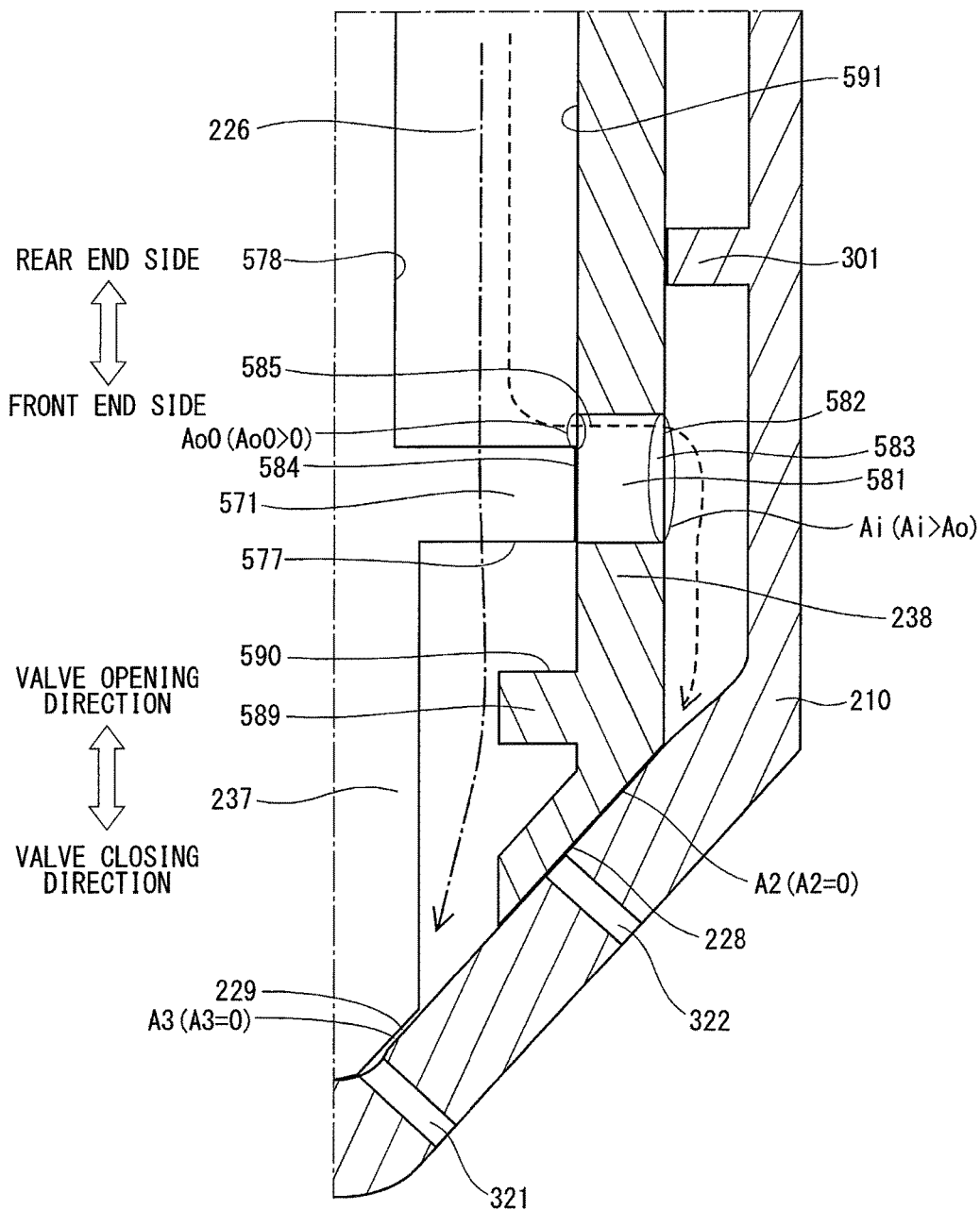
FIG. 47 is an enlarged view of a part XVII in FIG. 46 when an inner needle flange starts to pass through an outlet surface of a communication hole in an injector according to the fourth embodiment.

As indicated by dashed lines in FIG. 47, the high-pressure fuel supplied from the nozzle chamber 211 is injected from the second injection holes 322 through the inter-needle flow channel 226, the outlet hole flow channels 585 and the second flow channel 228 when the outer needle 238 slides in the valve opening direction. As indicated by chain lines, the high-pressure fuel is injected from the first injection holes 321 through the inter-needle flow channel 226 and the third flow channel 229 when the inner needle 237 slides in the valve opening direction.

The diameters of the housing 210, the housing flanges 301, the inner needle 237, the inner needle flanges 571, the outer needle 238, and the communication holes 581 are set to satisfy Relational Expression (4.1) and the following Relational Expressions (16.1) and (16.2).

$$\Delta A2 > \Delta Ao \tag{16.1}$$

$$\Delta A3 > |\Delta Ai| \tag{16.2}$$

As in the third embodiment, an absolute value is used.

The diameter of the first injection holes 321 and the diameter of the second injection holes 322 are set to satisfy the following Relational Expressions (17.1) and (17.2).

$$\mathrm{Max}(Ao) \geq Ah2 > Ao0 \tag{17.1}$$

$$\mathrm{Max}(A3) \geq Ah1 \tag{17.2}$$

It is assumed that a minimum flow channel area of the path into which the fuel is injected from the first injection holes 321 through the third flow channel 229 is Amin3. The minimum flow channel area Amin related to the fuel injection amount according to the fourth embodiment is a sum of Amin2 and Amin3.

The action of changing the flow channel area by the aid of the inner needle flanges 571, the housing flanges 301, and the communication holes 581 of the outer needle 238 according to the fourth embodiment will be described with reference to FIGS. 47 to 54.

As illustrated in FIG. 47, when the solenoidal coil is deenergized, the respective inner needle flanges 571 overlap with the outlet surfaces 584 of the communication holes 581 as in the third embodiment. The outlet hole flow channels 585 are opened, and communicate with the second flow channel 228. The flow channel area Ao is smaller than the flow channel area Ai, in other words, a relationship of Ai>Ao is met.

Figure 48:
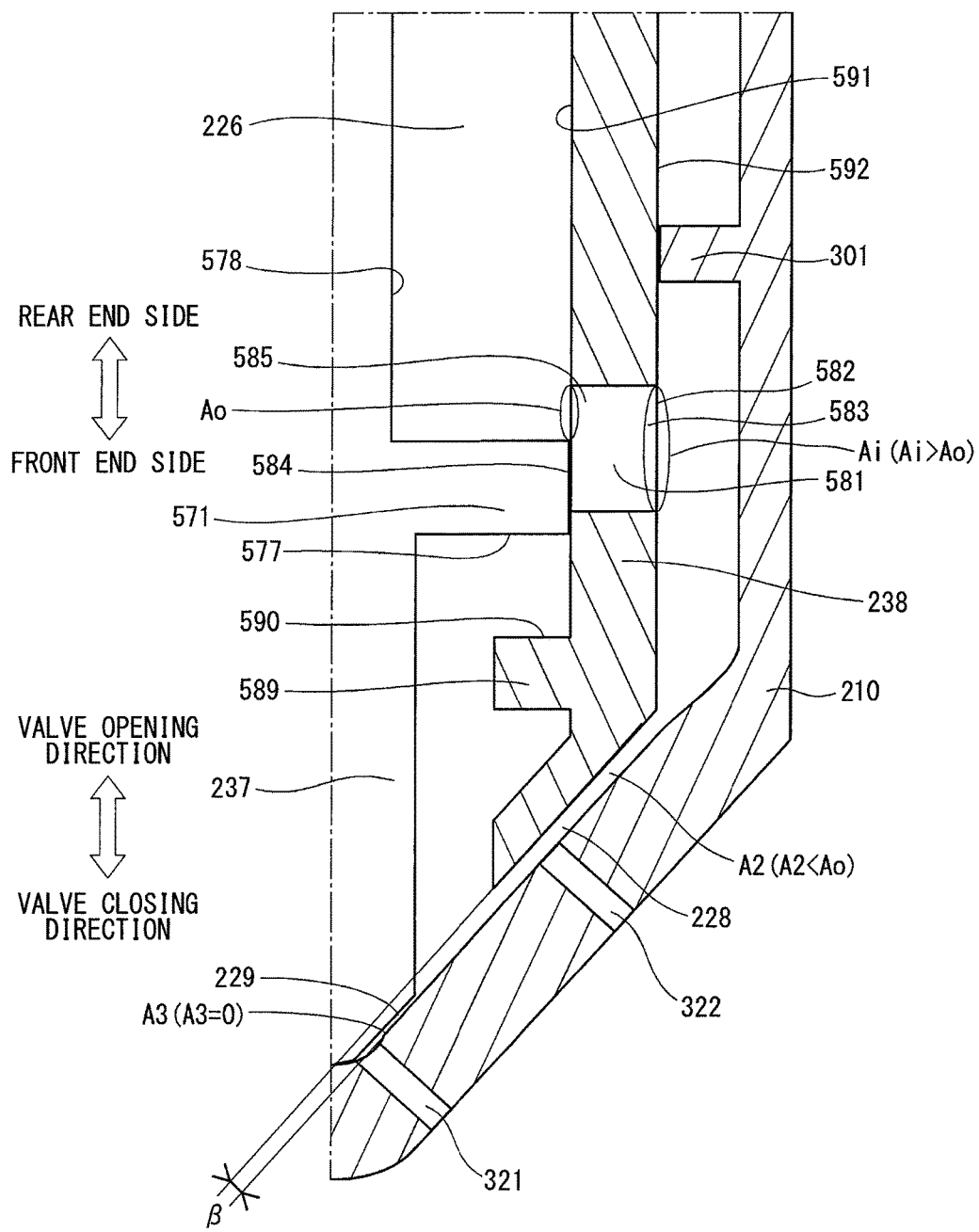
FIG. 48 is an enlarged view of a part XVIII in FIG. 46 when the inner needle flange passes through the outlet surface of the communication hole in the injector according to the fourth embodiment.

As illustrated in FIG. 48, when the solenoidal coil is energized according to an instruction from the ECU, the outer needle 238 slides in the valve opening direction. The outer needle 238 opens the second flow channel 228, and the respective inner needle flanges 571 open the outlet hole flow channels 585. In this situation, the following Relational Expressions (18.1) to (18.4) are satisfied through Relational Expression (4.1).

$$Ao > A2 \tag{18.1}$$

$$A\mathrm{min}2 = A2 \tag{18.2}$$

$$A\mathrm{min}3 = 0 \tag{18.3}$$

$$A\mathrm{min} = A2 \tag{18.4}$$

Therefore, the fuel injection amount at that time is determined according to the flow channel area A2.

With the sliding of the outer needle 238 in the valve opening direction, the second flow channel 228 is opened, the distance 13 increases, and the flow channel area A2 increases. Because the respective inner needle flanges 571 open the outlet hole flow channels 585, the flow channel area Ao increases.

Figure 49:
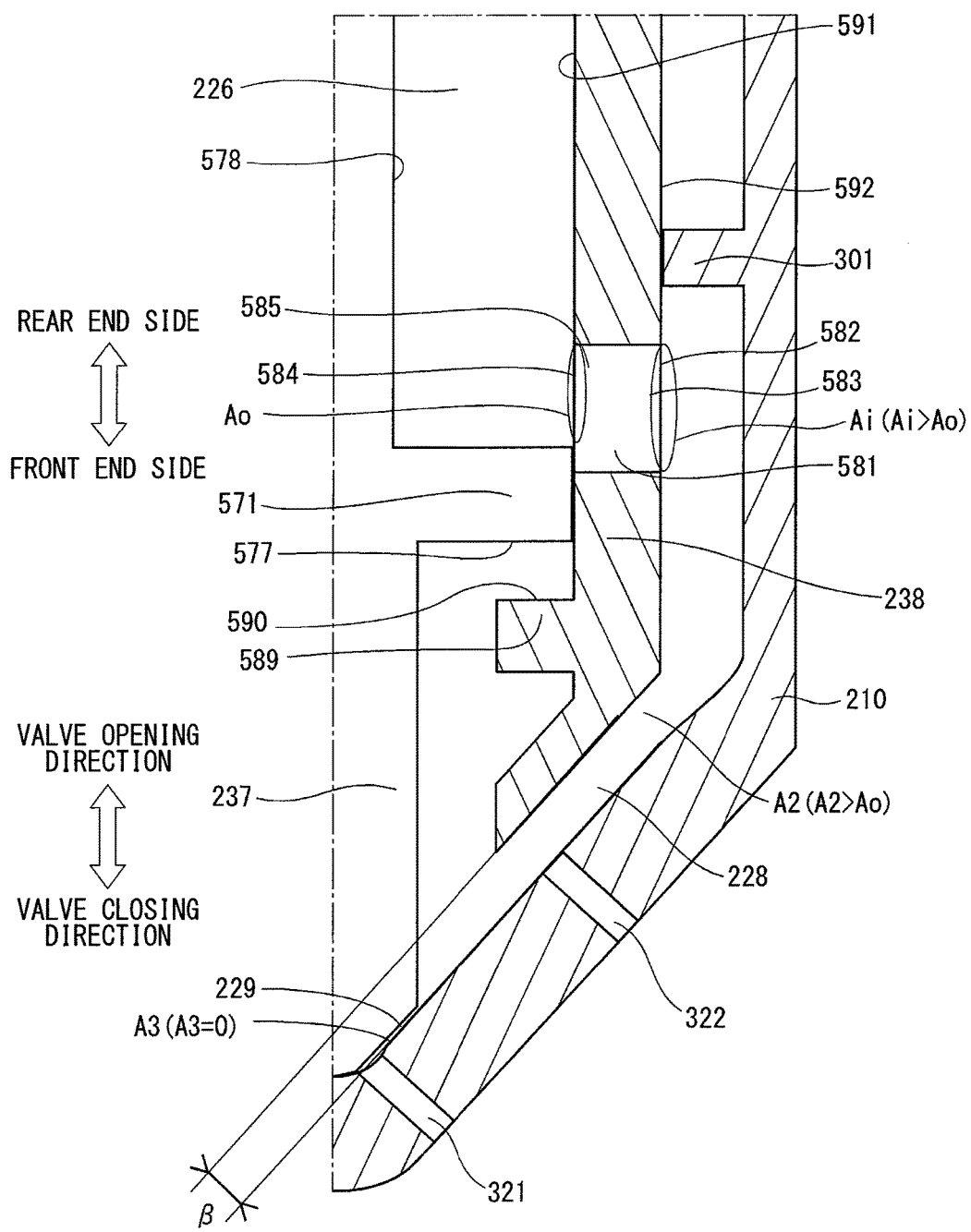
FIG. 49 is an enlarged view of a part XIX in FIG. 46 after the inner needle flange has passed through the outlet surface of the communication hole in the injector according to the fourth embodiment.

As illustrated in FIG. 49, when the respective inner needle flanges 571 pass through the outlet surfaces 584 of the communication holes 581, the following Relational Expressions (19.1) to (19.4) are satisfied through Relational Expression (16.1).

$$A2 > Ao \tag{19.1}$$

$$A\mathrm{min}2 = Ao \tag{19.2}$$

$$A\mathrm{min}3 = 0 \tag{19.3}$$

$$A\mathrm{min} = Ao \tag{19.4}$$

Therefore, the fuel injection amount at that time is determined according to Ao.

Figure 50:
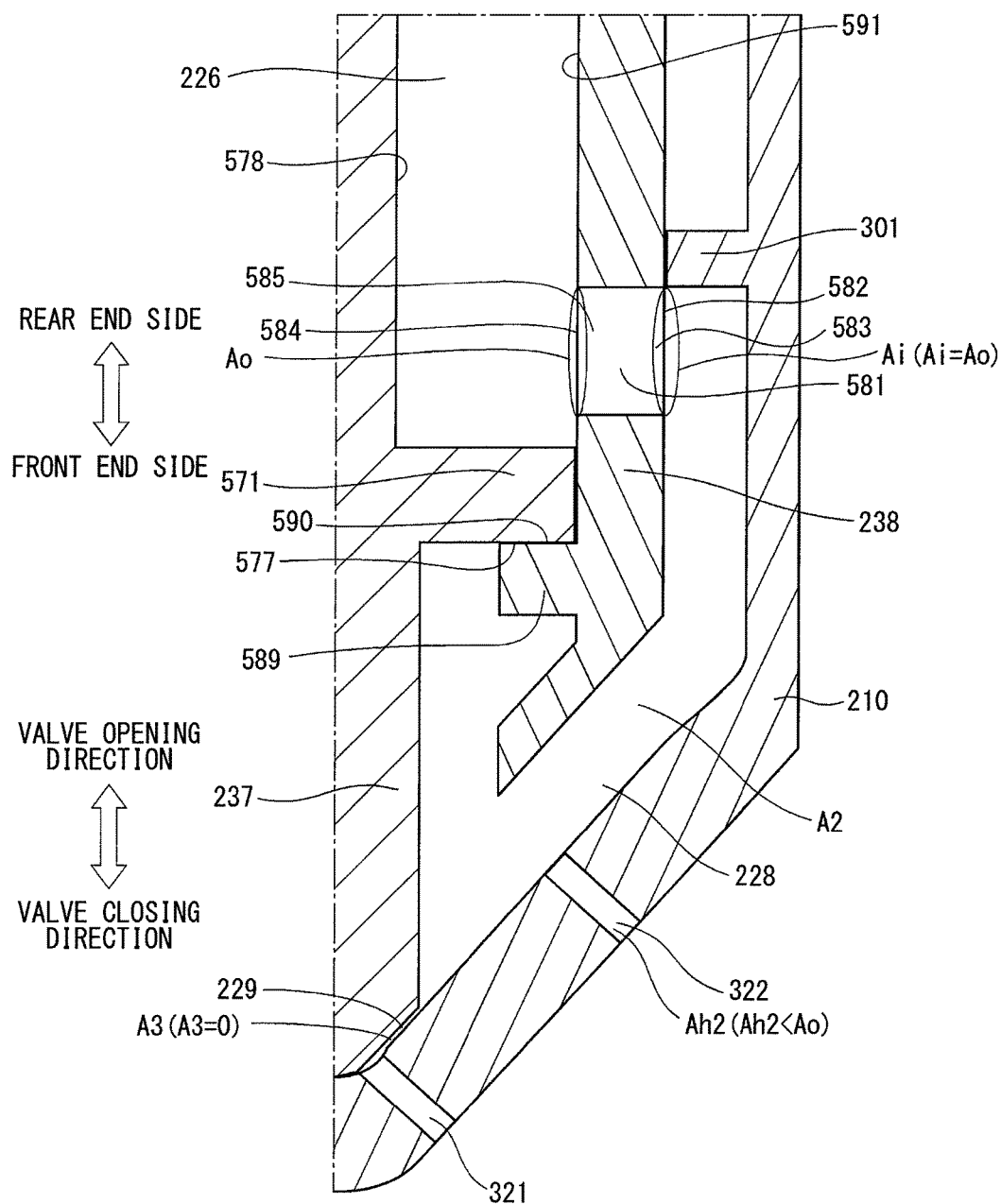
FIG. 50 is an enlarged view of a part XX in FIG. 46 when a housing flange starts to pass through an inlet surface of the communication hole in the injector according to the fourth embodiment.

As illustrated in FIG. 50, the inner needle flanges 571 open the closed outlet hole flow channels 585, and the flow channel area Ao becomes maximal. The following Relational Expressions (20.1) to (20.3) are satisfied through Relational Expression (16.1).

$$A\mathrm{min}2 = Ah2 \tag{20.1}$$

$$A\mathrm{min}3 = 0 \tag{20.2}$$

$$A\mathrm{min} = Ah2 \tag{20.3}$$

Therefore, the fuel injection amount at that time is determined according to Ah2.

Further, when the outer needle 238 slides in the valve opening direction, the upper end surfaces 590 of the protruding portion 589 of the outer needle 238 are abutted against the lower end surfaces 577 of the inner needle flanges 571. In other words, both of the outer needle 238 and the inner needle 237 slide in the valve opening direction.

Figure 51:
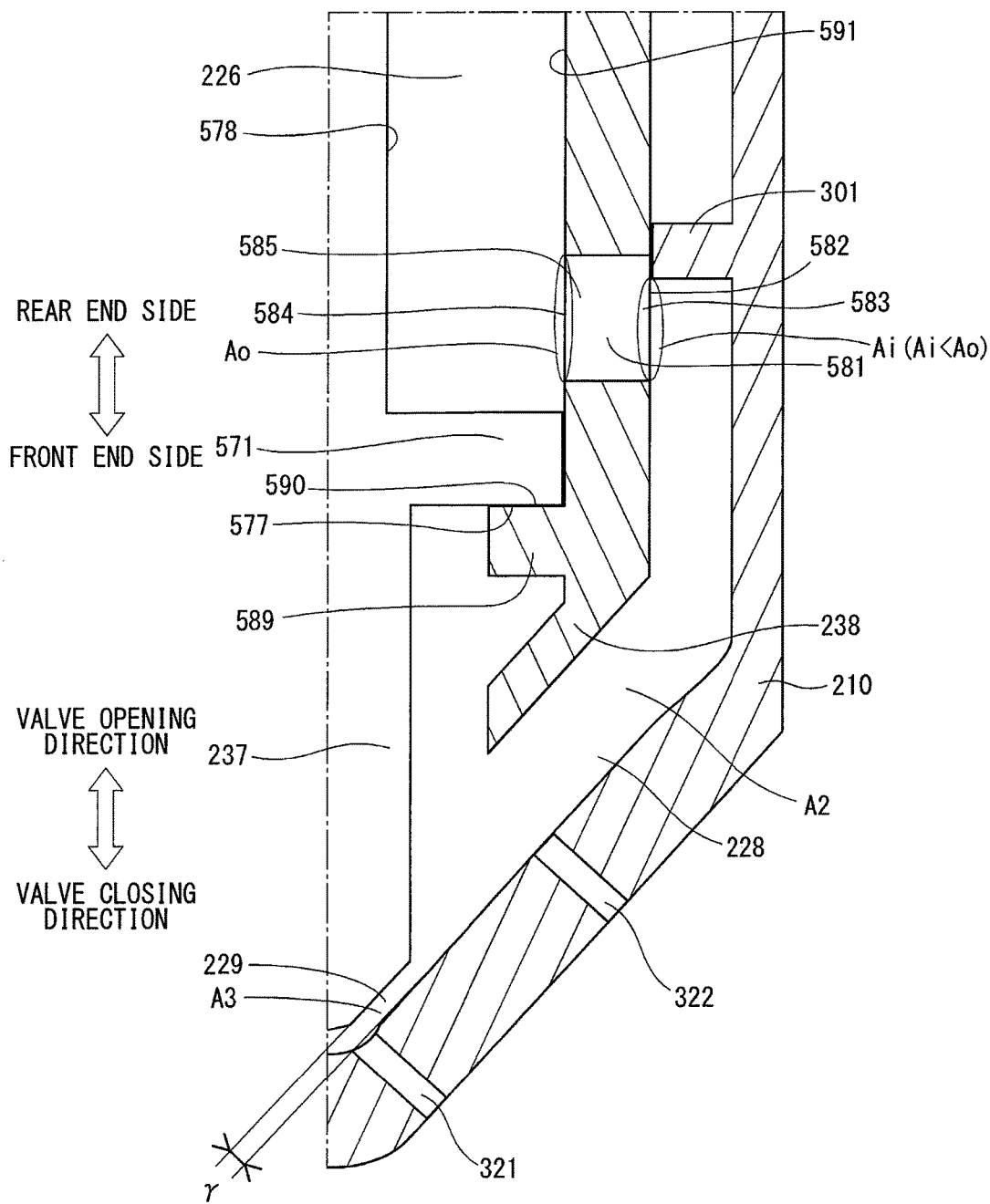
FIG. 51 is an enlarged view of a part XXI in FIG. 46 when the housing flange passes through the inlet surface of the communication hole in the injector according to the fourth embodiment.

As illustrated in FIG. 51, the inner needle 237 opens the third flow channel 229, and the respective housing flanges 301 close the inlet hole flow channels 583. In this situation, the following Relational Expressions (21.1) to (21.4) are satisfied.

$$Ao > Ai \tag{21.1}$$

$$A\mathrm{min}2 = Ai \tag{21.2}$$

$$A\mathrm{min}3 = A3 \tag{21.3}$$

$$A\mathrm{min} = Ai + A3 \tag{21.4}$$

Therefore, the fuel injection amount at that time is determined according to a sum of the flow channel areas Ai and A3.

With the sliding of the inner needle 237, the third flow channel 229 is opened, the distance γ increases, and the flow channel area A3 increases.

Figure 52:
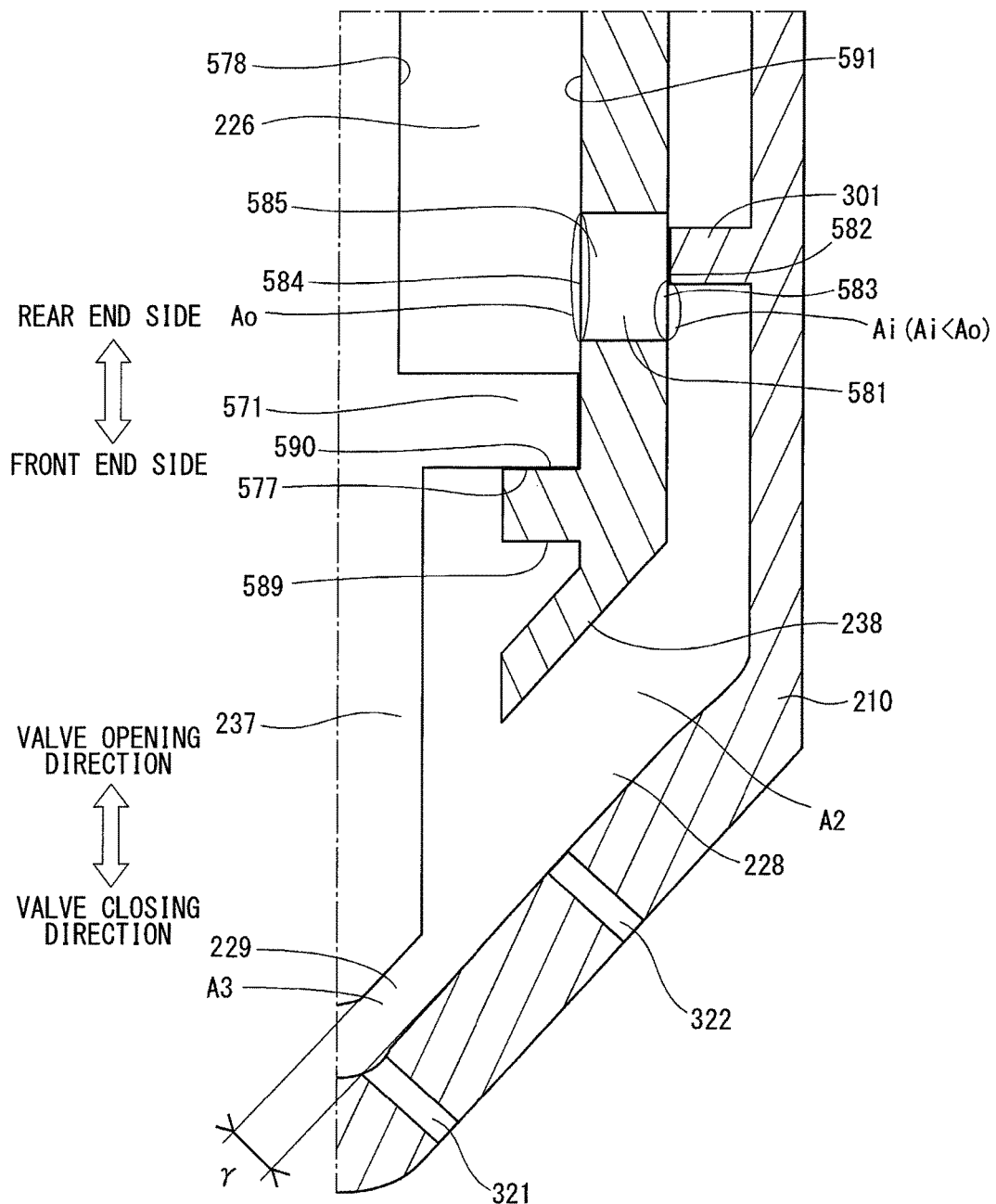
FIG. 52 is an enlarged view of a part XXII in FIG. 46 when the housing flange passes through the inlet surface of the communication hole in the injector according to the fourth embodiment.

As illustrated in FIG. 52, when the respective end surfaces of the housing flanges 301 are included in the inlet surfaces 582 of the communication holes 581, the areas of the inlet hole flow channels 583 are not changed. Therefore, the change rate ΔAi becomes zero, the flow channel area Ai is kept constant. The flow channel area in this situation satisfies the following Relational Expressions (22.1) to (22.4) as with the Relational Expressions (21.1) to (21.4).

$$Ao > Ai \quad (22.1)$$

$$Amin2 = Ai \quad (22.2)$$

$$Amin3 = A3 \quad (22.3)$$

$$Amin = Ai + A3 \quad (22.4)$$

Therefore, the fuel injection amount at that time is determined according to a sum of the flow channel areas Ai and A3.

Figure 53:
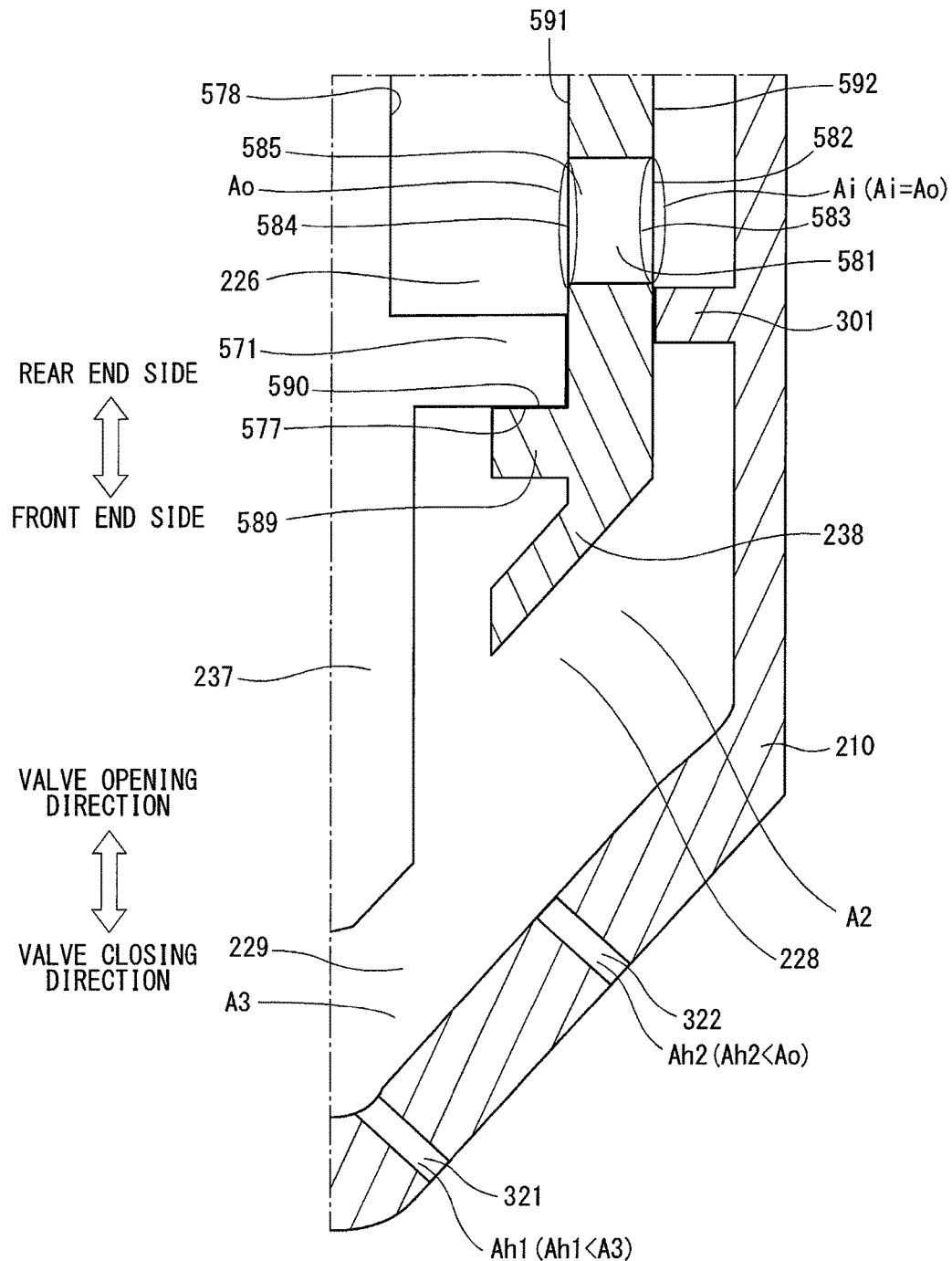
FIG. 53 is an enlarged view of a part XXIII in FIG. 46 after the housing flange has passed through the inlet surface of the communication hole in the injector according to the fourth embodiment.

As illustrated in FIG. 53, the respective housing flanges 301 fully open the inlet hole flow channels 583. The following Relational Expressions (23.1) to (23.4) are satisfied through Relational Expressions (17.1) and (17.2).

$$Ao = Ai \quad (23.1)$$

$$Amin2 = Ah2 \quad (23.2)$$

$$Amin3 = Ah1 \quad (23.3)$$

$$Amin = Ah2 + Ah1 \quad (23.4)$$

Therefore, the fuel injection amount at that time is determined according to a sum of the flow channel areas Ah2 and Ah1.

Figure 54:
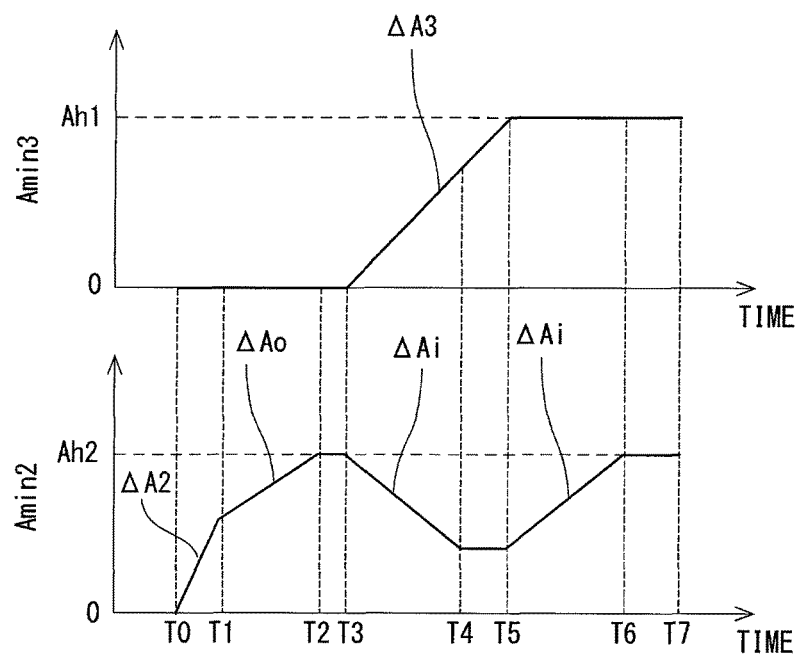
FIG. 54 is a characteristic view illustrating a change in a flow channel area in the injector according to the fourth embodiment.

A change in the minimum flow channel areas Amin2 and Amin3 to the time according to the fourth embodiment will be described with reference to FIG. 54. In this example, it is assumed that the change rate of the minimum flow channel area Amin3 to the time is ΔAmin3.

Times T0 to T1 correspond to FIGS. 47 and 48, and are times since the respective inner needle flanges 571 start to pass through the outlet surfaces 584 until passing through the outlet surfaces 584. The time T0 is a time when the solenoidal coil is energized according to the instruction from the ECU. The time T1 is a time when the flow channel area A2 becomes equal to the flow channel area Ao. The change rates ΔAmin2 and ΔAmin3 of the times T0 to T1 are represented by the following Expressions (18.5) and (18.6) on the basis of the Relational Expressions (18.2) and (18.3).

$$\Delta Amin2 = \Delta A2 \quad (18.5)$$

$$\Delta Amin3 = 0 \quad (18.6)$$

Likewise, the times T1 to T2 are times corresponding to FIG. 49. The change rates ΔAmin2 and ΔAmin3 of the times T1 to T2 are represented by the following Expressions (19.5) and (19.6) on the basis of the Relational Expressions (19.2) and (19.3).

$$\Delta Amin2 = \Delta Ao \quad (19.5)$$

$$\Delta Amin3 = 0 \quad (19.6)$$

The change rate ΔAmin2, in other words, an inclination of the minimum flow channel area Amin2 from the time T1 is decreased on the basis of Relational Expression (16.1). The time T2 is the same as that in the third embodiment.

The times T2 to T3 are times corresponding to FIG. 50. The change rates ΔAmin2 and ΔAmin3 of the times T2 to T3 are represented by the following Expressions (20.4) and (20.5) on the basis of the Relational Expressions (20.1) and (20.2).

$$\Delta Amin2 = 0 \quad (20.4)$$

$$\Delta Amin3 = 0 \quad (20.5)$$

The change rate ΔAmin2 of the times T2 to T3 is zero because the minimum flow channel area Amin2 is the flow channel area Ah2. The change rate ΔAmin3 of the times T0 to T3 is zero because the inner needle 237 performs the valve closing operation.

The time T3 is a time when the upper end surface 590 of the protruding portion 589 of the outer needle 238 is abutted against the lower end surfaces 577 of the inner needle flanges 571.

The times T3 to T4 are times corresponding to FIG. 51. The change rates ΔAmin2 and ΔAmin3 of the times T3 to T4 are represented by the following Relational Expressions (21.5) and (21.6) on the basis of the Relational Expressions (21.2) and (21.3).

$$\Delta Amin2 = \Delta Ai \quad (21.5)$$

$$\Delta Amin3 = \Delta A3 \quad (21.6)$$

At the times T3 to T4, as in the third embodiment, the respective housing flanges 301 close the inlet hole flow channels 583. A sum of the change rates ΔAmin2 and ΔAmin3 increases on the basis of the Relational Expression (16.2). Therefore, even at the times T3 to T4, the fuel injection amount increases as in the third embodiment.

The time T4 is a time when the respective end surfaces of the housing flanges 301 are included in the inlet surfaces 582 of the communication holes 581.

The times T4 to T5 are times corresponding to FIG. 52. The change rates ΔAmin2 and ΔAmin3 of the times T4 to T5 are represented by the following Relational Expressions (22.5) and (22.6) on the basis of the Relational Expressions (22.2) and (22.3).

$$\Delta Amin2 = 0 \quad (22.5)$$

$$\Delta Amin3 = \Delta A3 \quad (22.6)$$

The time T5 is a time when the flow channel area A3 exceeds the flow channel area Ah1, and also a time when the respective housing flanges 301 open the inlet hole flow channels 583.

The times T5 to T6 are times corresponding to FIG. 53. The change rates ΔAmin2 and ΔAmin3 of the times T5 to T6 are represented by the following Relational Expressions (23.5) and (23.6) on the basis of the Relational Expressions (23.2) and (23.3).

$$\Delta Amin2 = \Delta A2 \quad (23.5)$$

$$\Delta Amin3 = 0 \quad (23.6)$$

A time T6 is a time when the respective housing flanges 301 open the inlet hole flow channels 583. Therefore, at the times T6 to T7, the minimum flow channel area Amin2 is the flow channel area Ah2, and the minimum flow channel area Amin3 is the flow channel area Ah1. Both of the change rates ΔAmin2 and ΔAmin3 of the times T6 to T7 are zero because the flow channel area Ah1 and the flow channel area Ah2 do not change. (Advantages)

As described above, according to the fourth embodiment, as in the third embodiment, the flow channel area can be changed, and the fuel injection amount can be changed according to a change in the flow channel area. Therefore, even in the configuration where the outer needle 238 performs the valve opening operation preceding the inner needle 237, the fuel injection amount can be continuously increased, and the same advantages as those in the third embodiment can be obtained.

Fifth Embodiment

An injector 3 according to a fifth embodiment will be described with reference to FIGS. 55 and 56. The injector 3 has the same configuration as that in the third embodiment, and a drive unit 290 includes a variable speed mechanism that makes sliding speeds of an inner needle 237 and an outer needle 238 variable. The variable speed mechanism includes, for example, a piezoelectric actuator that is a piezoelectric element, and a pressure adjusting chamber that changes a volume by the expansion and contraction of the piezoelectric actuator.

The operation of the injector 3 according to the fifth embodiment will be described.

The piezoelectric actuator is expanded and contracted upon receiving a voltage Vs from an ECU. When the piezoelectric actuator is expanded, the volume in the pressure adjusting chamber is contracted, and a fuel pressure in a first back pressure chamber 221 increases. The voltage Vs is adjusted to satisfy Relational Expression (6), and an inner needle 237 performs the valve closing operation.

The ECU drops the voltage, and the piezoelectric actuator is contracted. In this situation, the volume of the pressure adjusting chamber is enlarged, and the fuel pressure of the first back pressure chamber 221 is decreased. As a result, as in the third embodiment, because Relational Expression (7) is satisfied, the inner needle 237 slides in a valve opening direction.

Further, when the ECU drops the voltage, and the piezoelectric actuator is contracted, the outer needle 238 slides in the valve opening direction together with the inner needle 237.

The ECU increases the voltage up to the voltage Vs, the piezoelectric actuator is expanded, and likewise the fuel pressure of the first back pressure chamber 221 increases. As a result, because Relational Expression (6) is satisfied, the inner needle 237 and the outer needle 238 slide in a valve closing direction. As a result, the fuel injection of the first injection holes 321 and the second injection holes 322 stops.

The ECU controls the applied voltage of the piezoelectric actuator. With a change in a voltage step-down speed, the fuel pressure in the first back pressure chamber 221 can be controlled with precision. Therefore, a sliding speed of the inner needle 237 in the valve opening direction can be changed. In other words, the sliding speeds of the inner needle 237 and the outer needle 238 can be changed. As a result, a change in the flow channel area by the inner needle flanges 571 and the housing flanges 301 can be performed with precision, and the fuel injection amount can be controlled with higher precision.

With a change in the sliding speed of the inner needle 237, the change rates $\Delta A1$, $\Delta Ao$, $\Delta A2$, and $\Delta Ai$ can be changed. A time T2 at which the inner needle flanges 571 fully open the outlet hole flow channels 585, and a time T3 at which upper end surfaces 576 of the inner needle flanges 571 are abutted against lower end surfaces 586 of the protruding portion 589 of the outer needle 238 can be adjusted. For example, the sliding speed is adjusted to satisfy the following Relational Expressions (24.1) to (24.3).

$$\Delta Ao = |\Delta Ai| \quad (24.1)$$

$$\Delta A2 = 2|\Delta Ai| \quad (24.2)$$

$$T2 = T3 \quad (24.3)$$

The change rate $\Delta Ai$ has a negative value, and therefore absolute values are used.

Figure 55:
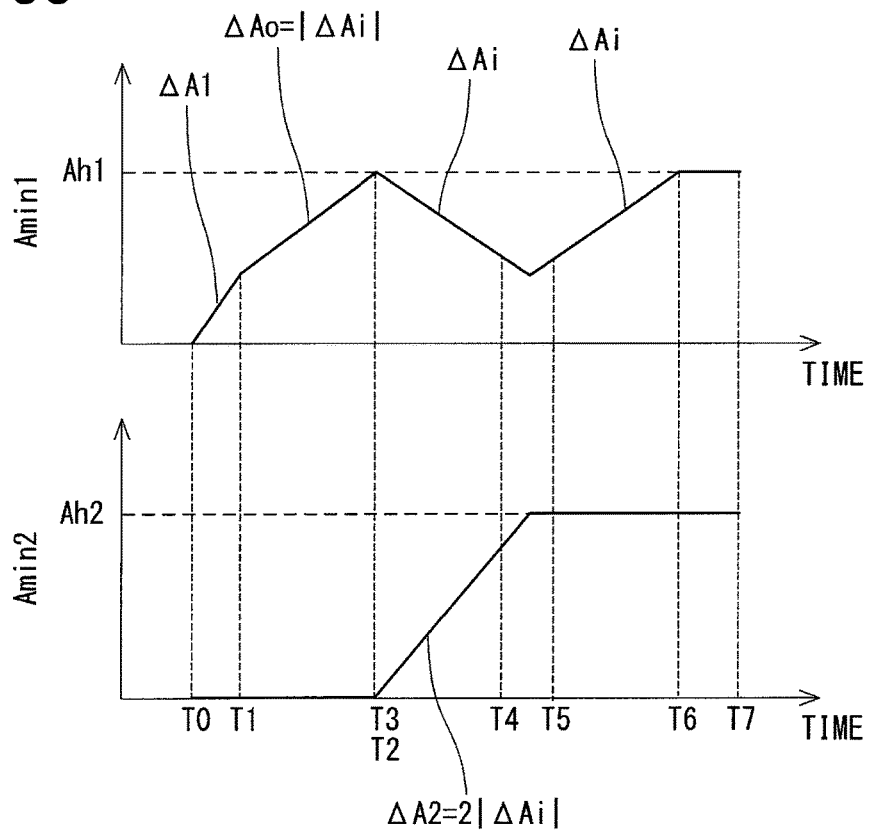
FIG. 55 is a characteristic view illustrating a change in a flow channel area in an injector according to a fifth embodiment.
Figure 56:
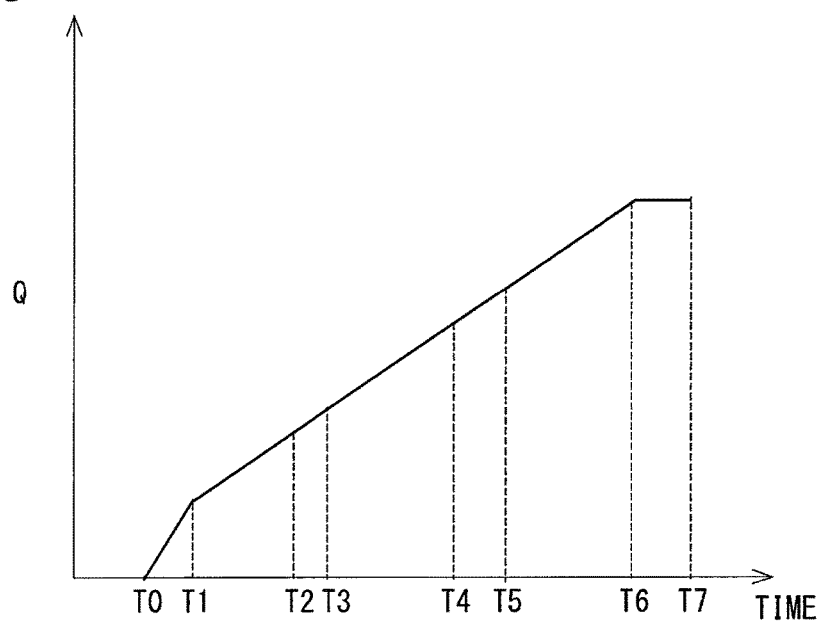
FIG. 56 is a characteristic view illustrating a change in a fuel injection amount in the injector according to the fifth embodiment.

Referring to FIG. 55, the change rates $\Delta Amin1$ and $\Delta Amin2$ according to the fifth embodiment will be described.

The change rates $\Delta Amin1$ and $\Delta Amin2$ of times T0 to T7 are identical with those in the third embodiment. However, in the fifth embodiment, the change rate $\Delta Amin1$ of the times T1 to T5 and the change rate $\Delta Amin2$ of the times T3 to T5 are changed.

In the change rate $\Delta Amin1$ of the times T1 to T3, the change rate $\Delta Ao$ can be expressed by $\Delta Ai$ on the basis of Relational Expression (24.1). At the times T2 to T3, the change rate $\Delta Amin1$ can be set so as not to be zero on the basis of Relational Expression (24.3). Further, at the times T4 to T5, the sliding speed is adjusted so that the end surfaces of the housing flanges 301 are not included in the inlet surfaces 582 of the communication holes 581.

In the change rate $\Delta Amin2$ of the times T3 to T5, the change rate $\Delta A2$ can be expressed by $\Delta Ai$. Further, at the times T4 to T5, a time at which the respective housing flanges 301 open the inlet hole flow channels 583, and a time at which the flow channel area A2 exceeds the flow channel area Ah2 can be adjusted to coincide with each other.

As described above, in the fifth embodiment, the change rates $\Delta Amin1$ and $\Delta Amin2$ can be expressed by the change rates $\Delta Ai$. Further, a sum of the change rates $\Delta Amin1$ and $\Delta Amin2$ is an absolute value of the change rate $\Delta Ai$ from the time T1, and kept constant. The sum of the change rates $\Delta Amin1$ and $\Delta Amin2$ is change rates of the minimum flow channel area Amin related to the fuel injection amount. Therefore, the change rate of the minimum flow channel area Amin according to the fifth embodiment is kept constant.

(Advantages)

The fuel injection amount Q according to the fifth embodiment will be described with reference to FIG. 56. The fuel injection amount Q is calculated according to Amin that is a sum of the minimum flow channel areas Amin1 and Amin2 with reference to FIG. 55 as in the third embodiment, and the fifth embodiment obtains the same advantages as those in the third embodiment. In the fifth embodiment, the sliding speeds of the inner needle 237 and the outer needle 238 in the valve opening direction are controlled so that an inclination of the fuel injection amount Q to the time, in other words, the change rate of the fuel injection amount can be kept constant. This means that the fuel injection amount can be controlled with higher precision.

In the engine system, exhaust gas regulations are increased, and in order to realize an excellent combustion state of the combustion chamber, particularly, an advanced control is required. Hence, according to the present embodiment, it is particularly effective to increase the precision of the fuel injection amount.

Other Embodiments

In the third embodiment, only an inner needle 237 may perform the valve opening operation, and a fuel may be injected from only first injection holes 321. Likewise, in the fourth embodiment, only an outer needle 238 may perform the valve opening operation, and the fuel may be injected from only second injection holes 322. The same advantages as those in the above embodiments are obtained.

When the inner needle 237 and the outer needle 238 slide, inner needle flanges 571 friction with the outer needle 238. Likewise, housing flanges 301 friction with the outer needle 238. The inner needle flanges 571 and the housing flanges 301 are worn by friction. The inlet hole flow channels 583 and the outlet hole flow channels 585 which are opened and closed by the inner needle flanges 571 and the housing flanges 301 are changed by friction, and the flow channel areas Ao and Ai are changed. As described above, the fuel injection amount is seriously affected by the flow channel area.

The inner needle 237 and the outer needle 238 are housed coaxially, and have an auxiliary function for holding the shaft in cooperation with each other. For that reason, a sliding position precision in a radial direction is high. Therefore, the inner needle flanges 571, the housing flanges 301, and the communication holes 581 of the outer needle 238 are not decentered, and come out of biased contact with each other, and an influence of friction due to the sliding is reduced. Therefore, the auxiliary function of the inner needle 237 and the outer needle 238 for holding the shaft in cooperation with each other is significant.

Figure 57A:
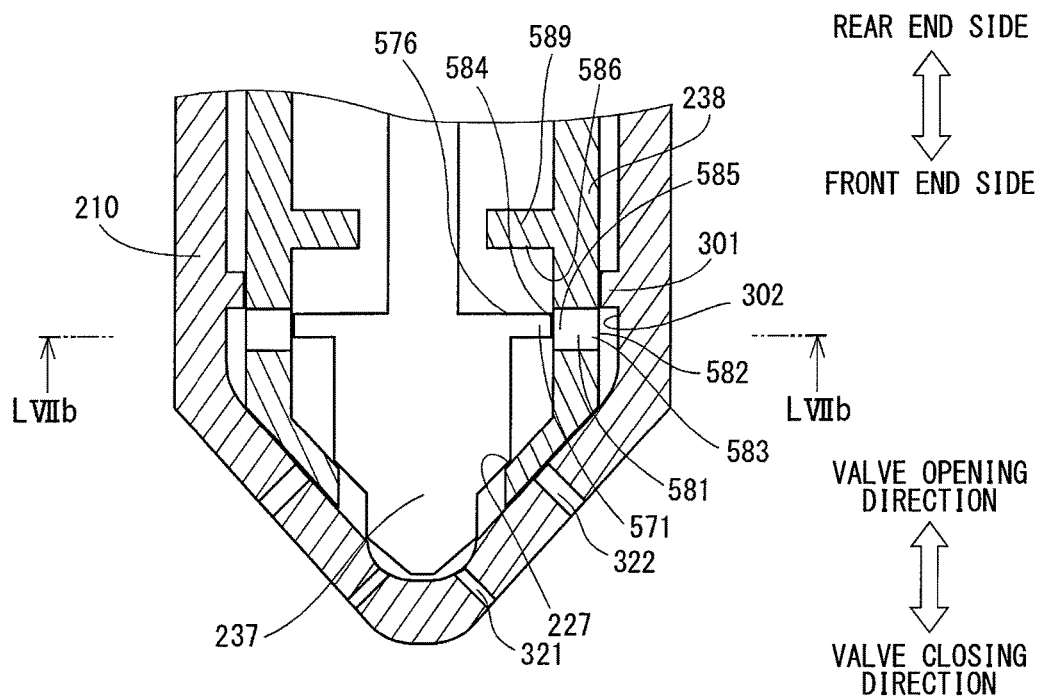
FIG. 57A is an enlarged view illustrating a distal side of an injector according to another embodiment.
Figure 57B:
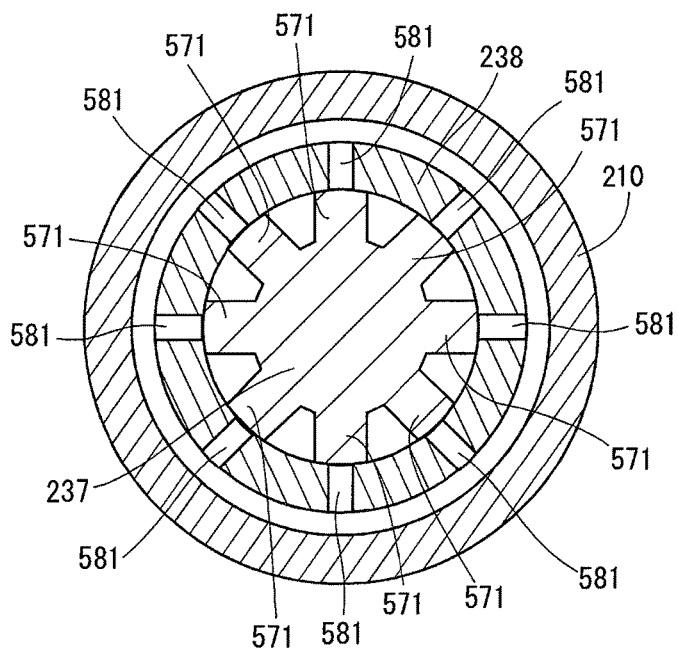
FIG. 57B is a cross-sectional view taken along a line XXVIIb-XXVIIb in FIG. 57A.

As in a configuration illustrated in FIGS. 57A and 57B, the number of communication holes 581 may be set to eight at regular intervals.

Figure 58A:
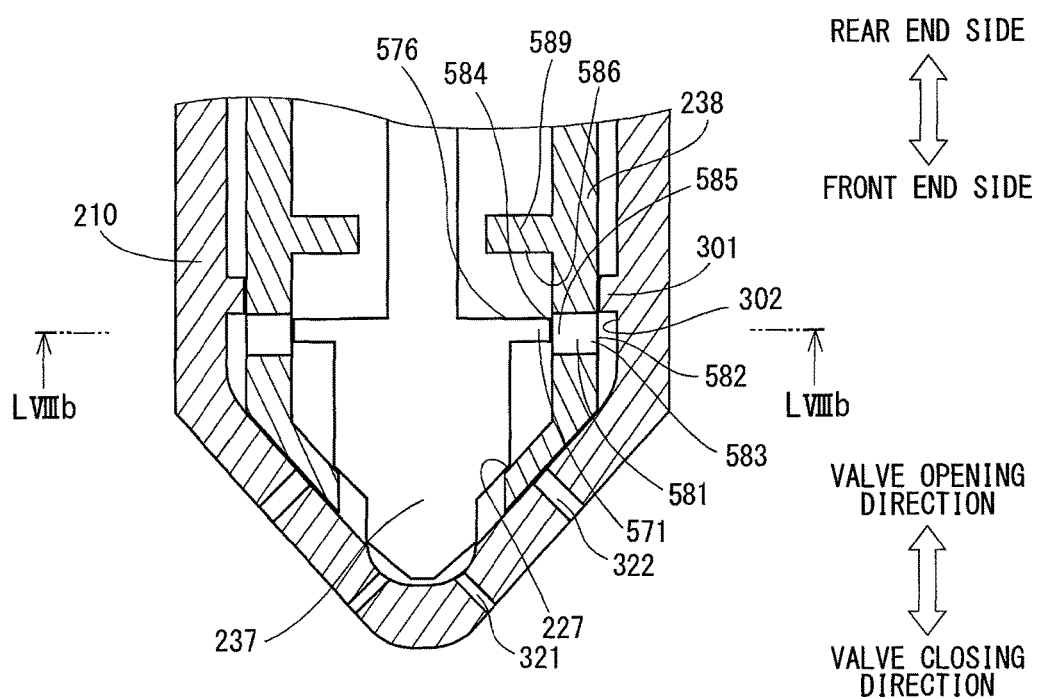
FIG. 58A is an enlarged view illustrating a distal side of an injector according to another embodiment.
Figure 58B:
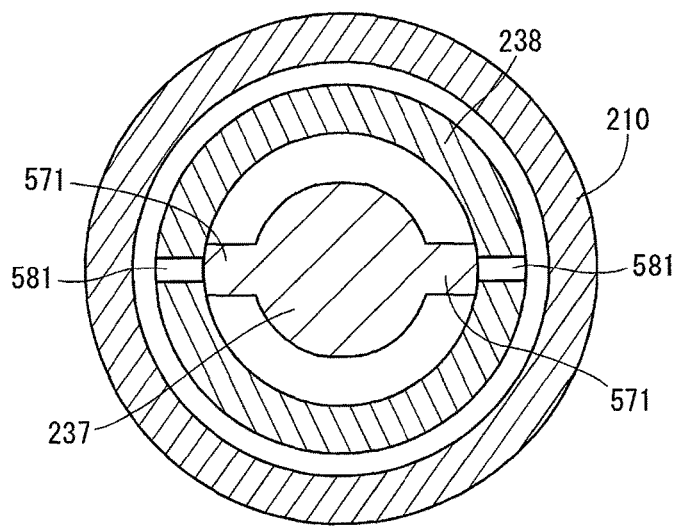
FIG. 58B is a cross-sectional view taken along a line XXVIIIb-XXVIIIb in FIG. 58A.

As in a configuration illustrated in FIGS. 58A and 58B, the number of communication holes 581 may be set to two.

Figure 59A:
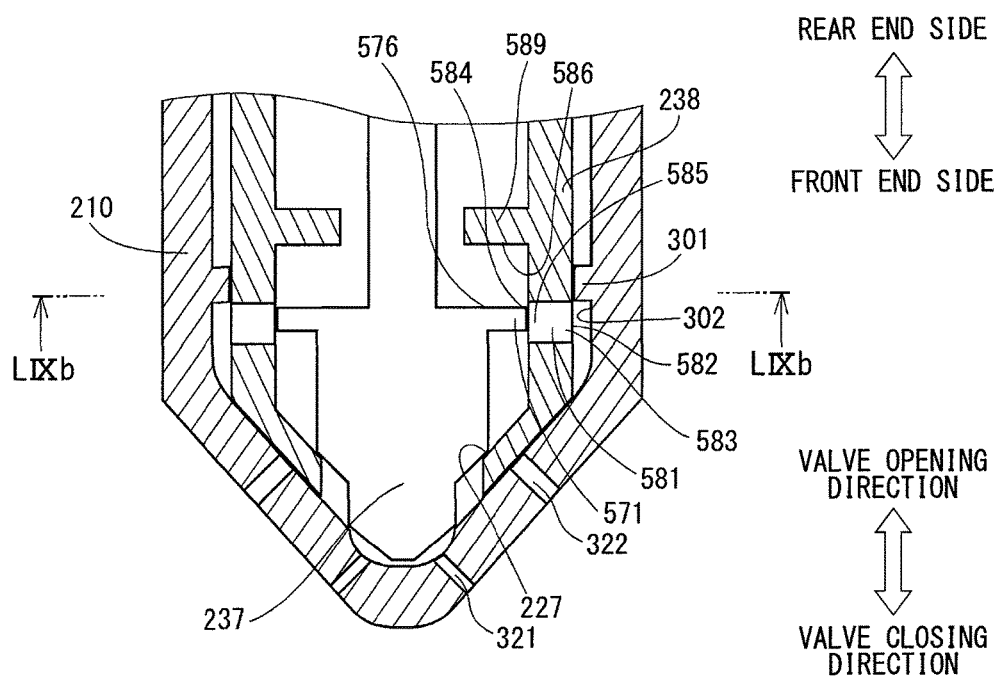
FIG. 59A is an enlarged view illustrating a distal side of an injector according to another embodiment.
Figure 59B:
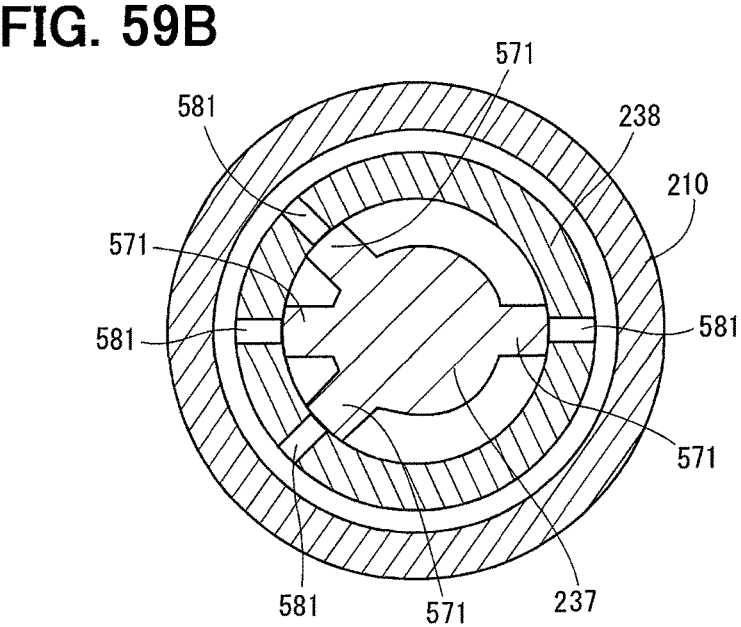
FIG. 59B is a cross-sectional view taken along a line XXIXb-XXIXb in FIG. 59A.
Figure 60A:
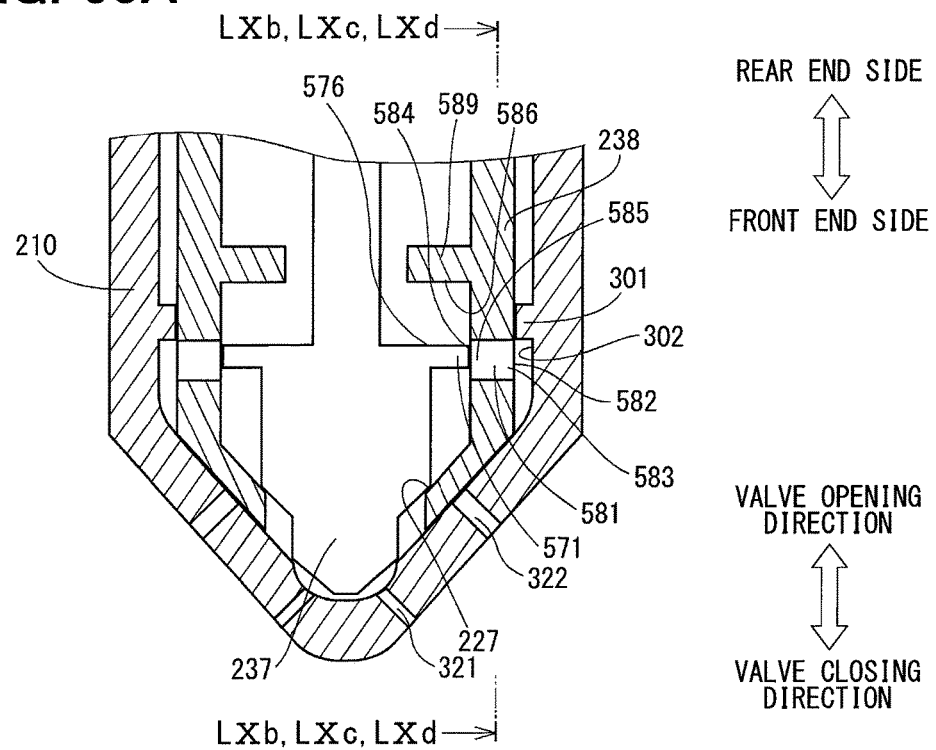
FIG. 60A is an enlarged view illustrating a distal side of an injector according to another embodiment.
Figure 60B:
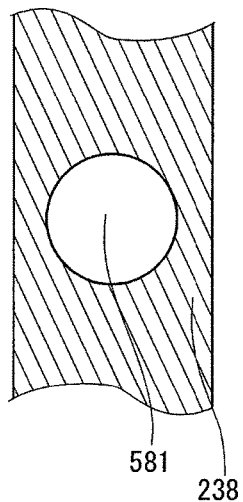
FIG. 60B is a cross-sectional view taken along a line XXXb-XXXb in FIG. 60A.
Figure 60C:
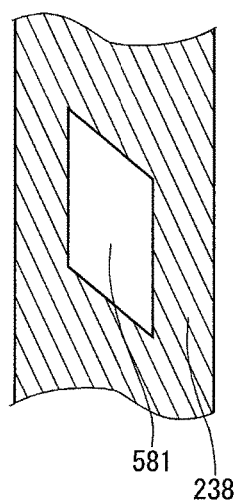
FIG. 60C is a cross-sectional view taken along a line XXXc-XXXc in FIG. 60A.
Figure 60D:
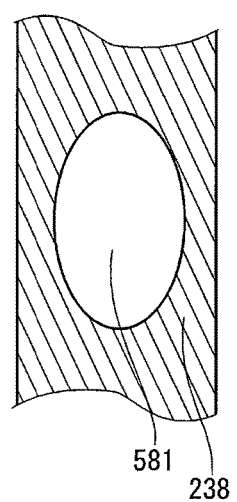
FIG. 60D is a cross-sectional view taken along a line XXXd-XXXd in FIG. 60A.

As in a configuration illustrated in FIGS. 59A and 59B, four communication holes 581 may not be arranged at regular intervals.

As in a configuration illustrated in FIGS. 60A, 60B, 60C, and 60D, a radial cross-section of the communication holes 581 may be shaped into a circle, a parallelogram, or an ellipse. Further, the radial cross-section of the communication holes 581 may be shaped into a diamond or a square.

As described above, the same advantages as those of the above embodiments can be obtained regardless of the number, the arrangement, or the shape of communication holes.

The thermal cycle to which the present embodiment is applied is not limited to the Sabathe cycle. For example, in the thermal cycle having a constant pressure heating process such as a diesel cycle, an Ericsson cycle, or a gas turbine cycle, the same advantages are obtained.

As in the fifth embodiment, the variable speed mechanism of the drive unit 290 for providing the variable speeds of the inner needle and the outer needle may use the solenoidal coil. For example, an applied voltage control of a solenoid may be performed, a magnetic attraction force may be adjusted, and the fuel pressure of the first back pressure chamber 221 may be controlled. Further, the drive unit 290 may be configured by a linear actuator that connects the inner needle 237 and the outer needle 238 directly to the drive unit 290, and operates the inner needle 237 and the outer needle 238.

Figure 61:
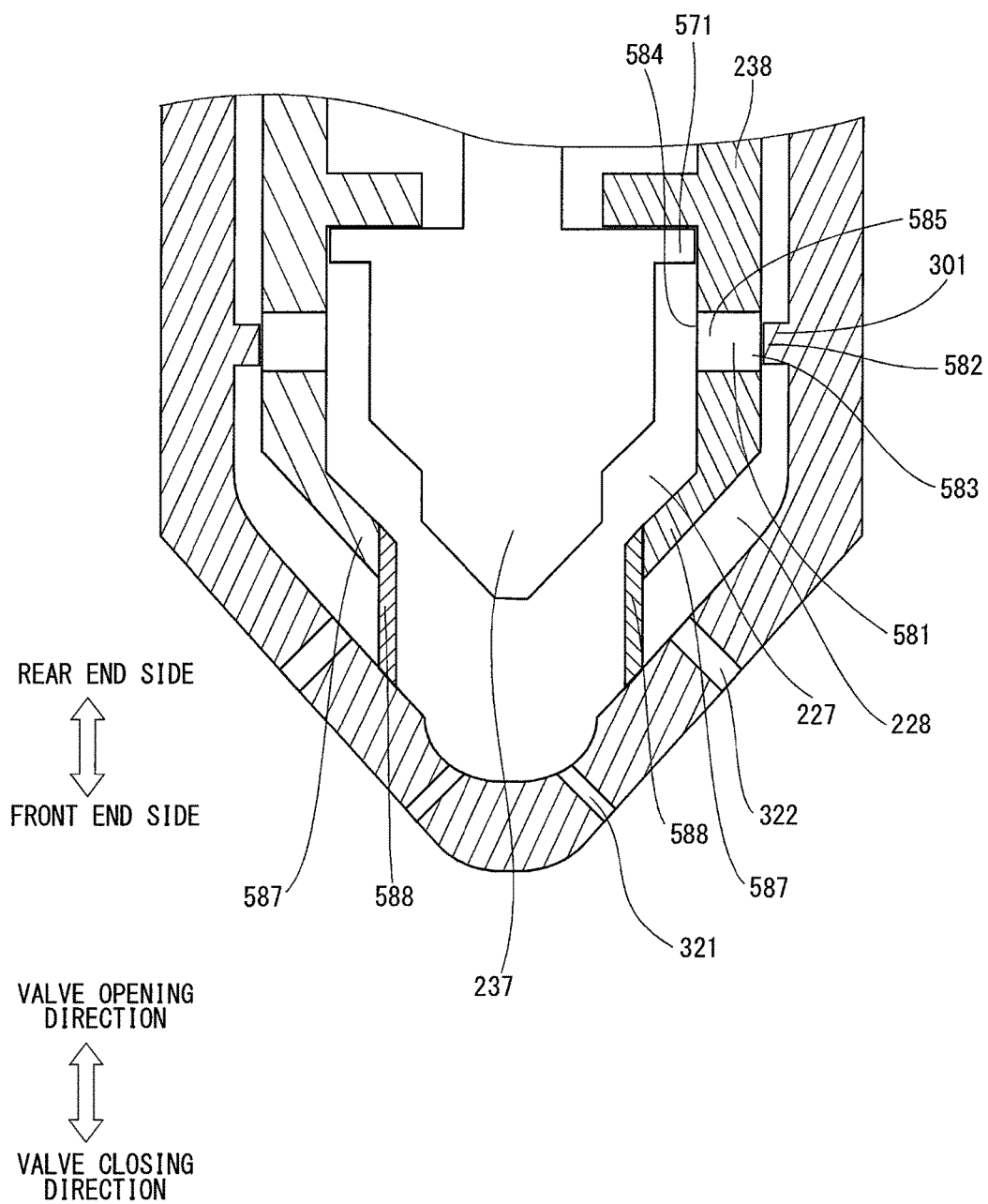
FIG. 61 is an enlarged view illustrating a distal side of an injector according to another embodiment.

As illustrated in FIG. 61, a check valve 588 made of an elastic member may be further provided onto a distal part 587 of the outer needle 238 installed on a rear end side of the first injection holes 321 and on a front end side of the second injection holes 322. The elastic member is, for example, a stainless steel spring plate or rubber. The check valve 588 is expanded and contracted with the use of an elastic force of the elastic member during the opening and closing operation of the outer needle 238. The check valve 588 is abutted against the housing 210 between the first injection holes 321 and the second injection holes 322 during the valve closing operation of the outer needle 238, and closes the second flow channel.

With the additional provision of the check valve 588, when the inner needle 237 and the outer needle 238 perform the valve opening operation, the flow rate flowing through the first flow channel 227 can be prevented from flowing back to the second flow channel. As a result, a precision in the respective injection amounts from the first injection holes 321 and the second injection holes 322 is improved.

Figure 62:
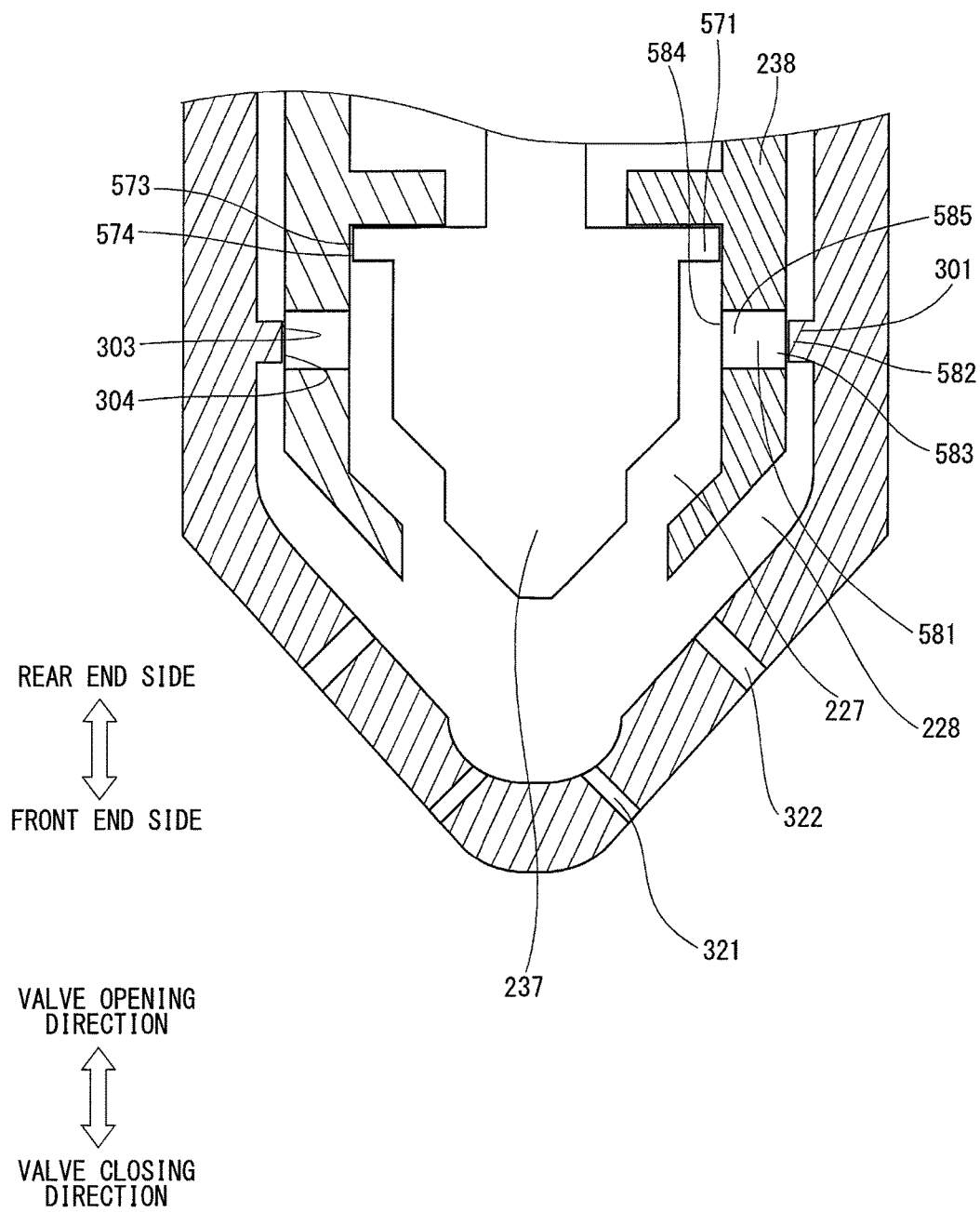
FIG. 62 is an enlarged view illustrating a distal side of an injector according to another embodiment.

As illustrated in FIG. 62, respective end surfaces 573 of the inner needle flanges 571 which come into contact with outlet surfaces 584 of the communication holes 581 may be subjected to wear-resistant coating 574. Respective end surfaces 303 of the housing flanges 301 which come into contact with inlet surfaces 582 of the communication holes 581 may be subjected to wear-resistant coating 304. The wear-resistant coating is made of, for example, DLC (diamond-like carbon) or CNx (carbon nitride). Those materials have been known as coating excellent in wear resistance. The coating may be performed by a PVD method such as a sputtering method or an ion beam deposition method, or a plasma CVD method such as an RF plasma or a surface wave excitation plasma (SWP). Further, the wear-resistant coatings 574 and 104 may be coated together with the inner surface 302 of the housing 210.

When the inner needle 237 and the outer needle 238 repetitively slide, the flow channel areas Ao and Ai are changed by the friction of the inner needle flanges 571 and the housing flanges 301. The friction of the inner needle flanges 571 and the housing flanges 301 caused by repetitive sliding is suppressed by the wear-resistant coatings 574 and 104. Therefore, the control of the fuel injection amount with high precision can be maintained.

Figure 63:
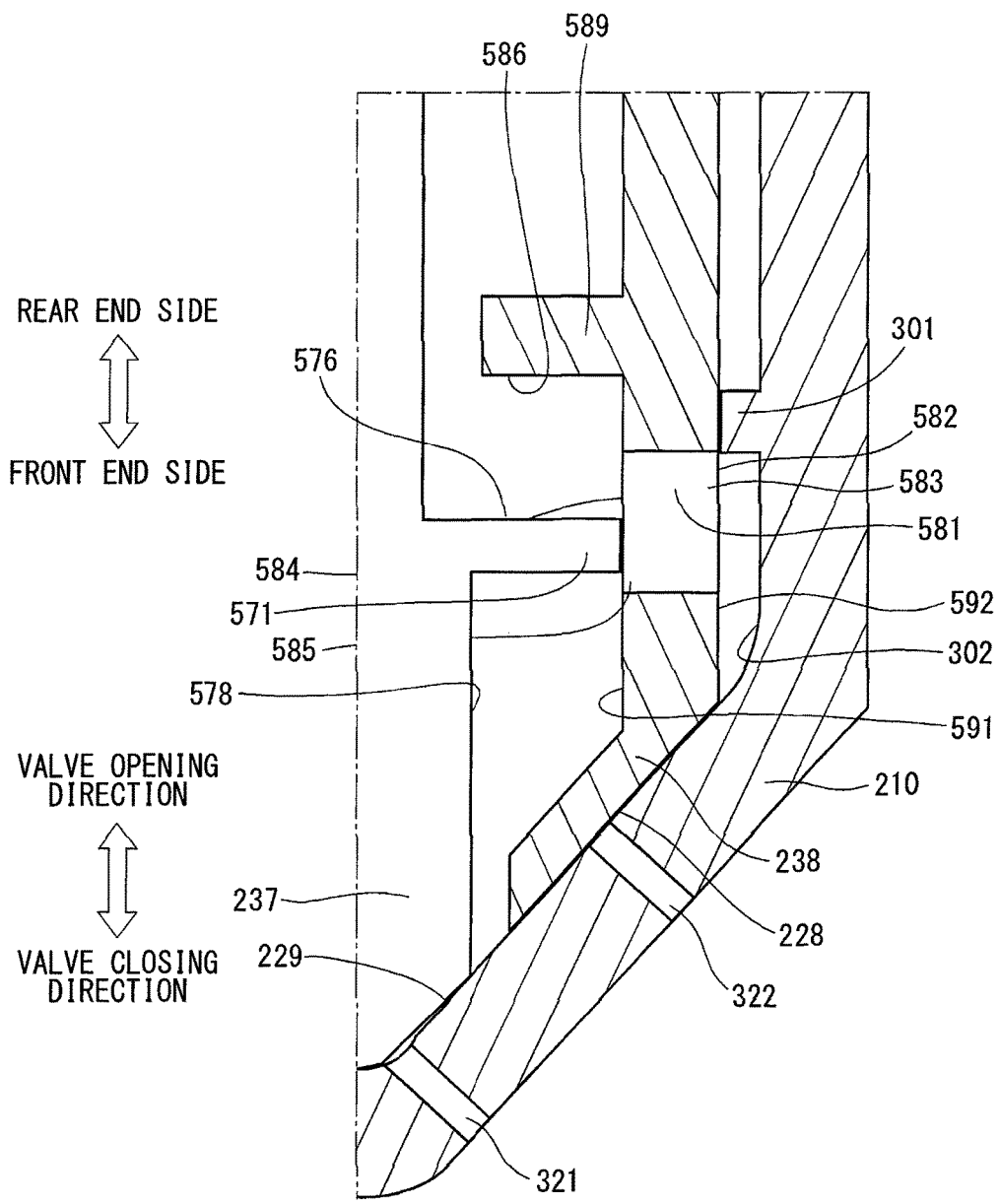
FIG. 63 is an enlarged view illustrating a distal side of an injector according to another embodiment.

As illustrated in FIG. 63, in the third embodiment, the first flow channel 227 may be replaced with the third flow channel 229 that is abutted against the housing 210 when the inner needle 237 performs the valve closing operation. The same advantages are obtained.

An embodiment in which the fuel injection device is applied to a multi-cylinder diesel engine equipped with a common rail fuel injection device will be described with reference to the drawings.

Figure 64:
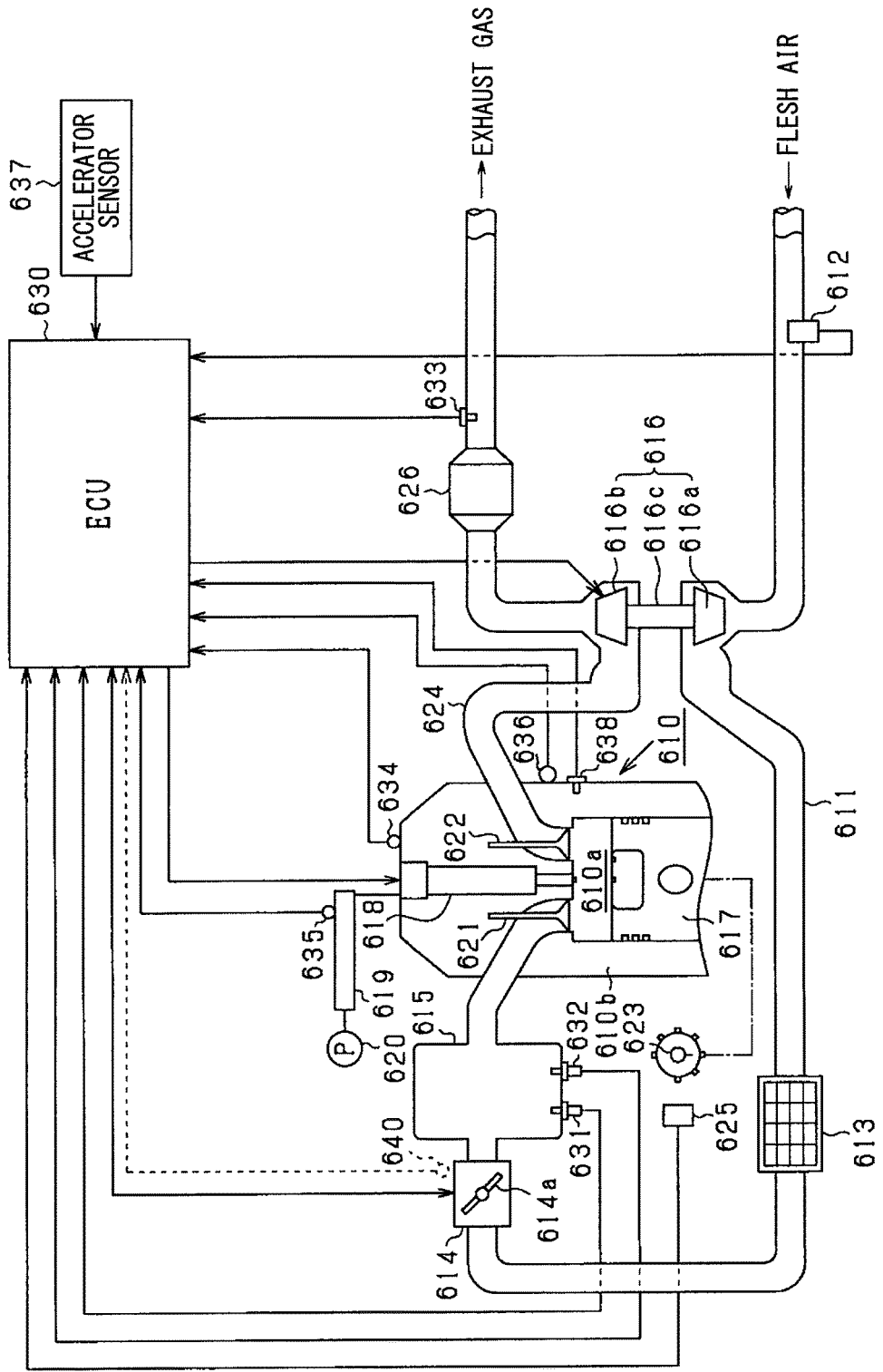
FIG. 64 is a schematic configuration view of a diesel engine.

In the present embodiment, an engine 610 illustrated in FIG. 64 is installed in a vehicle as a vehicle main engine. An air flow meter 612 for detecting the amount of intake air, an intercooler 613 for cooling the intake air supercharged by a turbocharger 616 to be described later, and a throttle valve device 614 are installed in an intake passage 611 of the engine 610, in order from an upstream side. The throttle valve device 614 adjusts the opening of a throttle valve 614a by an actuator such as a DC motor.

A combustion chamber 610a in each cylinder of the engine 610 is connected through a surge tank 615 to a downstream side of the throttle valve device 614 in the intake passage 611. The combustion chamber 610a is partitioned by a cylinder block 610b of the engine 610 and a piston 617. The cylinder block 610b is equipped with a vibration detection sensor 638 for detecting the degree of vibration "VB" (acceleration vibration) of the engine 610. In the present embodiment, the vibration detection sensor 638 corresponds to a vibration detection unit and an acceleration sensor.

The engine 610 is equipped with a fuel injector 618 whose distal part is protruded into the combustion chamber 610a. A fuel of high pressure (specifically, light oil) is supplied to the fuel injector 618 from a common rail 619 as an accumulator vessel. The fuel is pumped into the common rail 619 from a fuel pump 620. In FIG. 64, only one cylinder is illustrated.

The fuel injector 618 is installed in each cylinder of the engine 610, and injects the fuel accumulated in the common rail 619 into the cylinder from an injection hole. The fuel injector 618 performs a multistage injection including a pilot injection and an after-injection before and after a main injection in one combustion cycle, on the basis of an operating state of the engine 610. The fuel injector 618 includes a needle and a body having multiple injection holes from which the fuel is injected, formed at a distal part of the fuel injector 618, and needles housed in the respective injection holes. An annular fuel passage is provided between an inner surface of the body and an outer surface of the needle. The annular fuel passage extends in an axial direction of the body, and the fuel supplied from the common rail 619 passes through the annular fuel passage. A seating surface on which a distal part of the needle is seated is formed on an inner surface of the body distal part. A suction chamber is provided on a front end side of the seating surface in the body. The suction chamber congregates the fuel annularly distributed in the fuel passage, and communicates with the injection hole. In the configuration, the needle is seated on the seating surface, to thereby block a communication between the fuel passage and the injection hole, and the fuel injection is stopped. On the other hand, the needle is unseated from the seating surface by energization operation, to thereby communicate between the fuel passage and the injection hole. As a result, the fuel in the fuel passage is injected and supplied directly into the combustion chamber 610a from the injection hole through the suction chamber.

Returning to the foregoing description of FIG. 64, an intake port and an exhaust port of each cylinder in the engine 610 are opened and closed by an intake valve 621 and an exhaust valve 622, respectively. In this example, the intake air cooled by the intercooler 613 is introduced into the combustion chamber 610a by opening the intake valve 621. When the fuel is injected into the combustion chamber 610a from the fuel injector 618 in a state where the intake air has been introduced, the fuel is self-ignited by compression of the combustion chamber 610a, and an energy is generated by the combustion. The energy is taken out as a rotational energy of a crankshaft 623 of the engine 610 through the piston 617. A gas, which has been subjected to the combustion, is discharge as an exhaust gas into an exhaust passage 624 by opening the exhaust valve 622. A crank angle sensor 625 for detecting a rotation angle of the crankshaft 623 is installed in the vicinity of the crankshaft 623.

The vehicle is equipped with a turbocharger 616. The turbocharger 616 includes an intake compressor 616a installed in the intake passage 611, an exhaust turbine 616b installed in an exhaust passage 624, and a rotating shaft 616c that couples the intake compressor 616a and the exhaust turbine 616b. In detail, the exhaust turbine 616b rotates due to an energy of the exhaust gas flowing in the exhaust passage 624, and the rotational energy is transmitted to the intake compressor 616a through the rotating shaft 616c, and the intake air is compressed by the intake compressor 616a. In other words, the intake air is supercharged by the turbocharger 616.

An exhaust gas purification device 626 such as three-way catalyst or NOx catalyst for purifying CO, HC, and NOx in the exhaust gas is placed on a downstream side of the turbocharger 616 in the exhaust passage 624. An exhaust gas temperature detection sensor (corresponding to a temperature detection unit) 633 for detecting a temperature of the exhaust gas flowing out of the exhaust gas purification device 626 is located on a downstream side of the exhaust gas purification device 626.

An ECU 630 that is an electronic control device intended to control an engine system is mainly configured by a known microcomputer including a CPU, a ROM, and a RAM. The ECU 630 receives detection values from an intake air pressure sensor 631, an intake air temperature sensor 632, an exhaust gas temperature detection sensor 633, an in-cylinder pressure sensor 634, a fuel pressure sensor 635, a water temperature sensor 636, an accelerator sensor 637, the vibration detection sensor 638, the air flow meter 612, and the crank angle sensor 625. The intake air pressure sensor 631 detects a pressure in the surge tank 615, the intake air temperature sensor 632 detects an intake air temperature in the surge tank 615, and the in-cylinder pressure sensor 634 detects a pressure (hereinafter referred to as "cylinder pressure") in the combustion chamber 610a. The fuel pressure sensor 635 detects a fuel pressure in the common rail 619, and the water temperature sensor 636 detects a coolant temperature of the engine 610. The accelerator sensor 637 detects an accelerator operation amount (in more detail, the amount of depression of an accelerator pedal) of an accelerator operating member by a driver. The exhaust gas temperature detection sensor 633, the in-cylinder pressure sensor 634, and the vibration detection sensor 638 correspond to a state detection unit.

The ECU 630 performs a combustion control of the engine 610 including a fuel injection control of the fuel injector 618, a drive control of the fuel pump 620, and a supercharging pressure control by the turbocharger 616, on the basis of the detection values of the various sensors described above. The ECU 630 corresponds to a first injection unit, a second injection unit, and a control unit.

In the engine 610 configured as described above, it is assumed that an operating zone is in a high load zone. In that case, because a required fuel injection amount is increased, the fuel injection amount of a main injection which is maximal in the fuel injection amount in one combustion cycle is also increased. Therefore, when the operating zone is in the high load zone, there is a risk that a peak (maximum in-cylinder pressure Pmax) of the in-cylinder pressure rising due to the combustion of the fuel injected by the main injection is increased beyond an allowable upper limit pressure "Pulim" withstood by the engine 610.

As a countermeasure, conventionally, a control for lowering the maximum in-cylinder pressure Pmax so as not to exceed the allowable upper limit pressure "Pulim" is executed. For example, a rising injection pattern in which the fuel injection rate "Rinj" gradually increases is executed, and the in-cylinder pressure is gradually increased with the enlargement of the combustion chamber volume during an expansion stroke, to thereby execute the control for lowering the maximum in-cylinder pressure Pmax. However, in this control, it takes a long time for the in-cylinder pressure to reach the maximum in-cylinder pressure Pmax, and the thermal efficiency of the engine 610 is lowered as much. As a result, the power of the engine 610 is also lowered.

Hence, in the ECU 630 according to the present embodiment, when the present operating zone of the engine 610 is in the high load zone, the injection amount during the main injection is divided, and the fuel is injected twice, divisionally. Specifically, as illustrated in an upper diagram of FIG. 65, a first injection is executed to complete the first injection (hereinafter referred to as "first injection") when the piston 617 reaches a compression top dead center (compression TDC), and a second injection (hereinafter referred to as "second injection") is executed when the piston 617 reaches the TDC. Therefore, the second injection is executed immediately after the first injection has been completed. Hence, the fuel injected by the second injection (hereinafter referred to as "second combustion") is combusted by a flame generated by combusting the fuel injected by the first injection (hereinafter referred to as "first combustion"). The injection of the fuel and the combustion of the fuel by the second injection are sustained in the expansion stroke.

The injection rate "Rinj" of the first injection is larger than the maximum injection rate "Rmax" of the second injection, and the maximum in-cylinder pressure Pmax caused by the first combustion is controlled to substantially coincide with the allowable upper limit pressure "Pulim" (refer to a lower diagram of FIG. 65). The injection rate "Rinj" of the second injection is gradually increased with the enlargement of the combustion chamber volume in the expansion stroke, so as to maintain the in-cylinder pressure at the allowable upper limit pressure "Pulim". In the case, the allowable upper limit pressure "Pulim" is set as an upper limit value of the in-cylinder pressure which can maintain the reliability of the engine 610.

In execution of the present control, attention is paid to a combustion state of the injected fuel. With the execution of the processing to be described later, both injection states of the first injection and the second injection (corresponding to an injection rate "Rinj", a spread angle of spray, and a spray period) are controlled so that the combustion state of the injected fuel (for example, an increase rate "Rinc" of the in-cylinder pressure rising due to the first combustion, the vibration of the engine 610 caused by the first combustion, a temperature of the exhaust gas caused by the second combustion, or the like) is maintained in a predetermined allowable state.

Under the control, the in-cylinder pressure can be restrained from increasing beyond the allowable upper limit pressure "Pulim". Because the first combustion allows the in-cylinder pressure to increase up to the allowable upper limit pressure "Pulim", the power of the engine 610 can be early increased. Further, with the execution of the second injection, the in-cylinder pressure increased up to the allowable upper limit pressure "Pulim" is maintained whereby the thermal efficiency can be restrained from being lowered.

Figure 66:
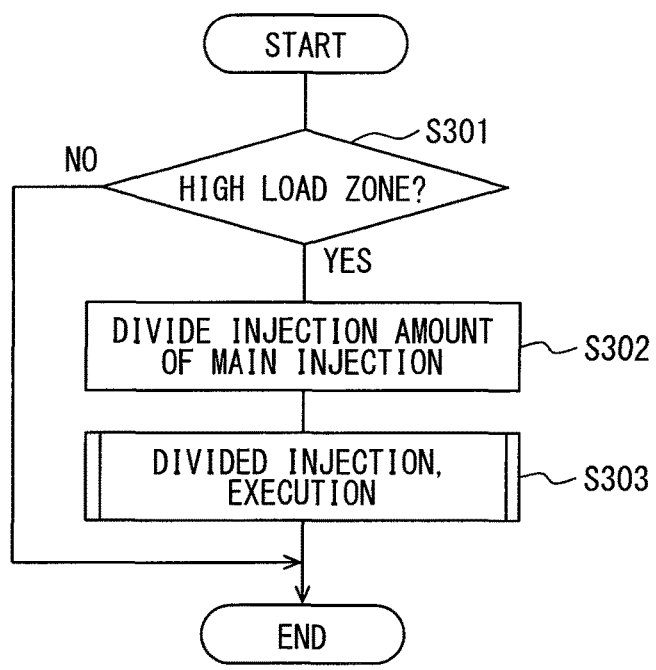
FIG. 66 is a flowchart of processing executed by an ECU.

In the present embodiment, divided injection processing illustrated in FIG. 66 to be described later is executed by the ECU 630. The divided injection processing illustrated in FIG. 66 is repetitively executed by the ECU 630 in a predetermined cycle during a period where the ECU 630 is powered.

First, in S301, it is determined whether a present operating zone of the engine 610 is in a high load zone, or not. Specifically, when an engine load (for example, the intake air pressure or the accelerator operation amount) is higher than a predetermined load, it is determined that the present operating zone of the engine 610 is in the high load zone. When it is determined that the present operating zone of the engine 610 is not in the high load zone (NO in S301), the control is completed. When it is determined that the present operating zone of the engine 610 is in the high load zone (YES in S301), the processing proceeds to S302.

In S302, the injection amount of the main injection is divided. In the present embodiment, equal division is assumed. However, there is no need to limit the division method of the injection amount to the equal division. In S303, the divided injection is executed by the fuel injector 618, and the control is completed.

Then, injection processing of the divided injection executed by the ECU 630 will be described with reference to FIG. 67. The processing is sub-routine processing corresponding to S303 in FIG. 66.

First, in S200, it is determined whether the present time is a timing at which the fuel injector 618 is allowed to execute the first injection, or not. In the present embodiment, when a rotation angle detected by the crank angle sensor 625 substantially coincides with a predetermined angle (for example, BTDC 30° C.A) set before the compression TDC, it is determined that the present time is the timing at which the fuel injector 618 is allowed to execute the first injection. When it is determined that the present time is the timing at which the fuel injector 618 is allowed to execute the first injection (YES in S200), the processing proceeds to S210, and the fuel injector 618 is allowed to execute the first injection. The injection state of the first injection is put into an injection state corrected after a previous first injection. As a result, the first combustion is generated in the combustion chamber 610*a*.

The in-cylinder pressure sensor 634 is allowed to detect the in-cylinder pressure in S220, and it is determined whether a peak of the detected in-cylinder pressure substantially coincides with an allowable upper limit pressure "Pulim", or not, in S230. When it is determined that the peak of the detected in-cylinder pressure does not substantially coincide with the allowable upper limit pressure "Pulim" (NO in S230), the processing proceeds to S280, and it is determined whether the peak of the detected in-cylinder pressure is smaller than the allowable upper limit pressure "Pulim", or not. When it is determined that the peak of the detected in-cylinder pressure is smaller than the allowable upper limit pressure "Pulim" (YES in S280), the processing proceeds to S310 which will be described later. When it is determined that the peak of the detected in-cylinder pressure is larger than the allowable upper limit pressure "Pulim" (NO in S280), the processing proceeds to S320 which will be described later.

When it is determined that the peak of the detected in-cylinder pressure substantially coincides with the allowable upper limit pressure "Pulim" (YES in S230), the processing proceeds to S240, and the increase rate "Rinc" of the in-cylinder pressure rising due to the first combustion is calculated. Specifically, the increase rate "Rinc" of the in-cylinder pressure rising up to the allowable upper limit pressure "Pulim" in a period (isovolumetric combustion period) where a volume of the combustion chamber 610*a* illustrated in the lower diagram of FIG. 65 is kept constant is calculated. It is determined whether the calculated increase rate "Rinc" of the in-cylinder pressure substantially coincides with an allowable maximum increase rate "Ram", or not, in S250. For example, vibration or noise is generated in the engine 610 due to the first combustion, and the degree of vibration "VB" or noise has a tendency to increase with an increase in the increase rate "Rinc" of the in-cylinder pressure. Therefore, the allowable maximum increase rate "Ram" is set taking the vibration or noise generated with the combustion of the fuel into account. When it is determined that the increase rate "Rinc" of the in-cylinder pressure does not substantially coincide the allowable maximum increase rate "Ram" (NO in S250), the processing proceeds to S290, and it is determined whether the increase rate "Rinc" of the in-cylinder pressure is smaller than the allowable maximum increase rate "Ram", or not. When it is determined that the increase rate of the in-cylinder pressure is smaller than the allowable maximum increase rate "Ram" (YES in S290), the processing proceeds to S310 which will be described later.

When it is determined that the increase rate of the in-cylinder pressure is larger than the allowable maximum increase rate "Ram" (NO in S290), the processing proceeds to S320 which will be described later.

When it is determined that the increase rate of the in-cylinder pressure substantially coincides with a predetermined allowable maximum increase rate "Ram" (YES in S250), the processing proceeds to S260, and the vibration detection sensor 638 is allowed to detect the degree of vibration "VB" of the engine 610. In S270, it is determined whether the peak of the degree of detected vibration substantially coincides with an allowable maximum degree "VBam", or not. When it is determined that the peak of the degree of vibration "VB" substantially coincides with the allowable maximum degree "VBam" (YES in S270), the control is completed. When it is determined that the peak of the degree of vibration "VB" does not substantially coincide with the allowable maximum degree "VBam" (NO in S270), the processing proceeds to S300, and it is determined whether the peak of the degree of vibration "VB" is smaller than the allowable maximum degree "VBam", or not. When it is determined that the peak of the degree of vibration "VB" is smaller than the allowable maximum degree "VBam" (YES in S300), the processing proceeds to S310, the injection rate "Rinj" of the first injection in a next combustion cycle is adjusted to increase, and the control is completed. When it is determined that the peak of the degree of vibration "VB" is larger than the allowable maximum degree "VBam" (NO in S300), the processing proceeds to S320, the injection rate "Rinj" of the first injection in a next combustion cycle is adjusted to decrease, and the control is completed.

When it is determined that the present time is not the timing at which the fuel injector 618 is allowed to execute the first injection (NO in S200), the processing proceeds to S330, and it is determined whether the present time is the timing at which the fuel injector 618 is allowed to execute the second injection, or not. In the present embodiment, when a rotation angle detected by the crank angle sensor 625 reaches the compression TDC, it is determined that the present time is the timing at which the fuel injector 618 is allowed to execute the second injection. When it is determined that the present time is not the timing at which the fuel injector 618 is allowed to execute the second injection (NO in S330), the control is completed. When it is determined that the present time is the timing at which the fuel injector 618 is allowed to execute the second injection (YES in S330), the control proceeds to S340.

In S340, the fuel injector 618 is allowed to execute the second injection. The second injection is executed in the expansion stroke. In the expansion stroke, because the volume in the combustion chamber 610a is increased with time, the in-cylinder pressure is generally decreased with an increase in the volume in the combustion chamber 610a. In the present embodiment, in order to suppress a decrease in the in-cylinder pressure in the expansion stroke, the injection rate "Rinj" of the second injection is controlled to gradually increase with the increase in the volume in the combustion chamber 610a in S350 (refer to the upper diagram of FIG. 65).

The exhaust gas temperature detection sensor 633 is allowed to detect the exhaust gas temperature "Tex" in S360, and it is determined whether the detected exhaust gas temperature "Tex" substantially coincides with an allowable maximum temperature "Tam", or not, in S370. The allowable maximum temperature "Tam" is set as an upper limit of the temperature of the exhaust gas having no risk to thermally damage three-way catalyst or NOx catalyst configuring the exhaust gas purification device 626. When it is determined that the exhaust gas temperature "Tex" substantially coincides with the allowable maximum temperature "Tam" (YES in S370), the control is completed. When it is determined that the exhaust gas temperature "Tex" does not substantially coincide with the allowable maximum temperature "Tam" (NO in S370), the processing proceeds to S380, and it is determined whether the exhaust gas temperature "Tex" is smaller than the allowable maximum temperature "Tam", or not. When it is determined that the exhaust gas temperature "Tex" is smaller than the allowable maximum temperature "Tam" (YES in S380), the processing proceeds to S390, the injection period Δt of the second injection in a next combustion cycle is adjusted to be extended, and the control is completed. When it is determined that the exhaust gas temperature "Tex" is larger than the allowable maximum temperature "Tam" (NO in S380), the processing proceeds to S400, the injection period Δt of the second injection in the next combustion cycle is adjusted to be shortened, and the control is completed.

With the above configuration, the present embodiment obtains the following advantages.

The injection rate "Rinj" of the first injection is set to be higher than the injection rate "Rinj" of the second injection, and the first injection is executed at the higher injection rate to increase the pressure in the combustion chamber 610a up to the allowable upper limit pressure "Pulim". As a result, the engine 610 can early increase the in-cylinder pressure up to the allowable upper limit pressure "Pulim" without damaging the cylinder. After the execution of the first injection, the second injection is executed. The injection rate "Rinj" of the second injection is controlled to increase with the time with the results that even if the volume in the combustion chamber 610a increases with the time in an expansion stroke, the pressure in the combustion chamber 610a can be maintained at the allowable upper limit pressure "Pulim". In other words, the thermal efficiency and power of the engine 610 can be restrained from being decreased.

The injection period Δt of the second injection is controlled so that the temperature of the exhaust gas detected by the exhaust gas temperature detection sensor 633 is maintained at the allowable maximum temperature "Tam". As a result, the period during which the pressure in the combustion chamber 610a is maintained at the allowable upper limit pressure "Pulim" can be extended as much as possible in a state to restrain the catalyst from being thermally damaged, and further a state in which the thermal efficiency of the engine 610 is high can be sustained at a maximum.

The injection rate "Rinj" of the first injection is controlled so that the increase rate of the pressure in the combustion chamber 610a caused by the first combustion is maintained at the allowable maximum increase rate "Ram". As a result, the engine 610 can early obtain high power without excessively increasing the vibration or noise generated with the combustion of the fuel.

The injection rate "Rinj" of the first injection is controlled so that the degree of vibration "VB" detected by the vibration detection sensor 638 is maintained at the allowable maximum degree "VBam". As a result, the magnitude of vibration generated with the combustion of the fuel can be grasped with higher precision, and the engine 610 can early obtain the high power without excessively increasing the vibration.

The above-described embodiment can be changed and carried out as follows.

In the above embodiment, the allowable upper limit pressure "Pulim" is set as the upper limit value of the in-cylinder pressure capable of maintaining the reliability of the engine 610. The allowable upper limit pressure "Pulim" may be set, for example, as the upper limit value of the in-cylinder pressure withstood by the engine 610, or may be set to the upper limit value of the in-cylinder pressure limited by the power upper limit of the engine 610.

In the above embodiment, when the present operating zone of the engine 610 is in the high load zone, the injection amount of the main injection is divided into two, and the fuel injector 618 is allowed to execute the divided injection. The injection amount of the main injection is not always divided into two, but the injection amount of the main injection may be divided into three. In this case, in two injections of larger injection amount in the three divided injections, it is assumed that a fuel injection previously executed is a first injection, and a fuel injection subsequently executed is a second injection. Alternatively, the main injection (corresponding to the first injection) is executed without dividing the injection amount of the main injection, and when the rotation angle detected by the crank angle sensor 625 reaches the TDC, an auxiliary injection (corresponding to the second injection) different from the main injection may be executed.

In the above embodiment, the degree of vibration "VB" of the engine 610 is detected by the vibration detection sensor 638. The degree of vibration "VB" of the engine 610 does not always need to be detected by the vibration detection sensor 638. The vibration of the engine 610 is increased more as a fluctuation of the rotational speed of the engine 610 becomes larger. The rotational speed of the engine 610 may be detected by the crank angle sensor 625, the fluctuation of the detected rotational speed may be calculated, and the degree of the vibration of the engine 610 may be calculated. In that case, because there is no need to install the vibration detection sensor 638 in the cylinder block 610b, the configuration of the engine 610 can be simplified. The crank angle sensor 625 according to another example corresponds to a state detection unit, a vibration detection unit, and a rotation angle sensor.

In the above embodiment, in any case of when the in-cylinder pressure does not substantially coincide with the allowable upper limit pressure "Pulim", when the increase rate of the in-cylinder pressure does not substantially coincide with the allowable maximum increase rate "Ram", and when the maximum peak of the degree of vibration "VB" of the engine 610 does not substantially coincide with the allowable maximum degree "VBam", the injection rate "Rinj" of the first injection is appropriately adjusted. The injection rate "Rinj" does not always need to be adjusted. For example, instead of the injection rate "Rinj" of the first injection adjusted to increase, the injection period Δt of the first injection may be adjusted to be extended. Alternatively, instead of the injection rate "Rinj" of the first injection adjusted to decrease, the injection period Δt of the first injection may be adjusted to be shortened. Thus, the injection period Δt of the first injection may be adjusted.

In the above embodiment, the injection period Δt of the second injection is controlled so that the temperature of the exhaust gas caused by the second combustion substantially coincides with the allowable maximum temperature "Tam". This control does not always need to be executed. Specifically, S360 to S400 may be omitted in a flowchart of FIG. 67. In other words, only the injection state of the first injection may be corrected.

In the above embodiment, the injection rate "Rinj" of the first injection is corrected taking the in-cylinder pressure, the increase rate of the in-cylinder pressure, or the degree of vibration "VB" of the engine 610 into consideration. The injection rate "Rinj" of the first injection may be fixed at a maximum injection rate "Rmax", and only the injection state of the second injection may be corrected.

In the above embodiment, the injection rate "Rinj" of the first injection is corrected taking the in-cylinder pressure, the increase rate of the in-cylinder pressure, or the degree of vibration "VB" of the engine 610 into consideration. The injection rate "Rinj" of the first injection may be corrected taking the magnitude of sound (hereinafter referred to as "combustion sound") generated when the fuel is combusted in the combustion chamber 610a instead of the degree of vibration "VB" of the engine 610 into account. There is a concern that an increase in the combustion sound causes an excessive noise of the engine 610. Therefore, the injection rate "Rinj" of the first injection is controlled so that the combustion sound substantially coincides with an allowable maximum volume. Specifically, when the combustion sound is smaller than the allowable maximum volume, the injection rate "Rinj" of the first injection is adjusted to increase, and when the combustion sound is larger than the allowable maximum volume, the injection rate "Rinj" of the first injection is adjusted to decrease. As a result, the diesel engine can obtain high power without excessively increasing the combustion sound caused by the combustion of the fuel. In another example, the combustion sound is inferred from the degree of vibration "VB" of the engine 610 which is detected by the vibration detection sensor 638. For that reason, the vibration detection sensor 638 corresponds to a combustion sound detection unit. Naturally, the method of inferring the combustion sound is not limited to the above configuration, but the combustion sound may be inferred from the level of the exhaust gas temperature "Tex" detected by the exhaust gas temperature detection sensor 633, or may be inferred from the level of the in-cylinder pressure detected by the in-cylinder pressure sensor 634. Alternatively, a pressure sensor for detecting the pressure of the exhaust gas may be provided, and the combustion sound may be inferred from the pressure of the detected exhaust gas, or a microphone is placed in the vicinity of the engine 610, and a sound issued from the engine 610 may be directly detected.

Figure 67:
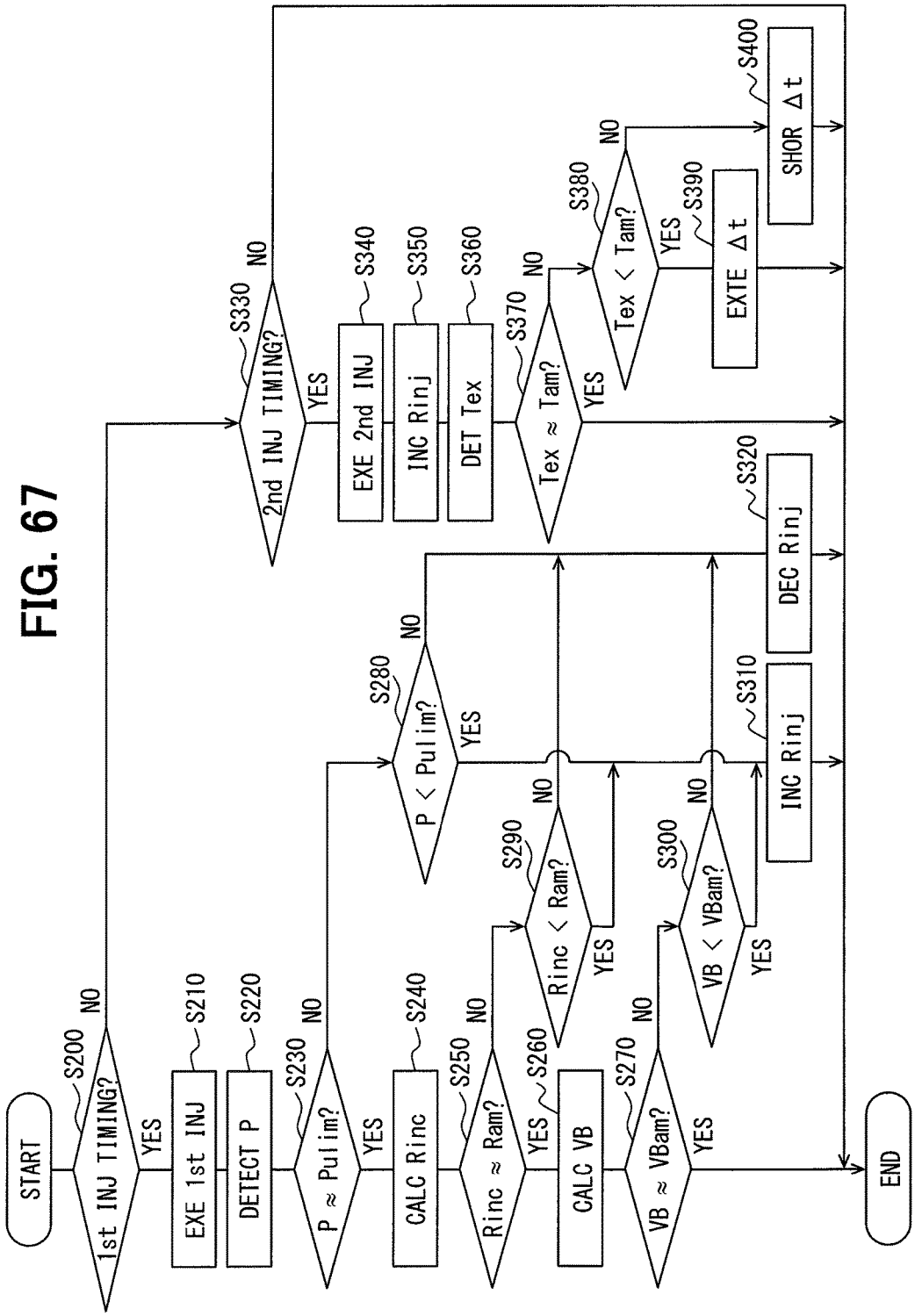
FIG. 67 is a flowchart of sub-routine processing in S303 shown in FIG. 66.

In the above embodiment, the injection rate "Rinj" of the first injection is controlled so that the increase rate of the in-cylinder pressure caused by the first combustion substantially coincides with the allowable maximum increase rate "Ram" (corresponding to S240, S250, and S290 in FIG. 67). In addition, the injection rate "Rinj" of the first injection is controlled so that the degree of vibration "VB" of the engine 610 caused by the first combustion substantially coincides with the allowable maximum degree "VBam" (corresponding to S260, S270, and S300 in FIG. 67). Those two controls do not always need to be executed together, but none of the two controls may be executed, or only one of the two controls may be executed.

When the engine 610 is equipped with a PM sensor for detecting the amount of PM (particulate matter) contained in the exhaust gas, an injection rate control of the first injection taking the amount of PM generated by the first combustion into account may be implemented. When the injection rate "Rinj" of the fuel is low, a mixture high in the concentration of the fuel is produced in the center of the combustion chamber 610a, and the mixture causes incomplete combustion to increase the PM. Hence, the injection rate "Rinj" of the fuel is adjusted to increase so that a penetration of the injection fuel is increased, and the mixture high in the concentration of the fuel is restrained from being produced in the center of the combustion chamber 610a. However, on the other hand, when the injection rate "Rinj" of the fuel is excessively high, combustion occurs in the vicinity of a wall surface of the combustion chamber 610a. In that case, a thermal energy generated during combustion is transmitted to a wall surface, and a loss (cooling loss) that the thermal energy is given to the coolant circulated in the engine 610 is increased. For that reason, the injection rate "Rinj" of the first injection is controlled so that the amount of PM generated by the first combustion is maintained at an allowable upper limit amount to suppress both of an excessive generation of the PM and an increase in the cooling loss.

Figure 68:
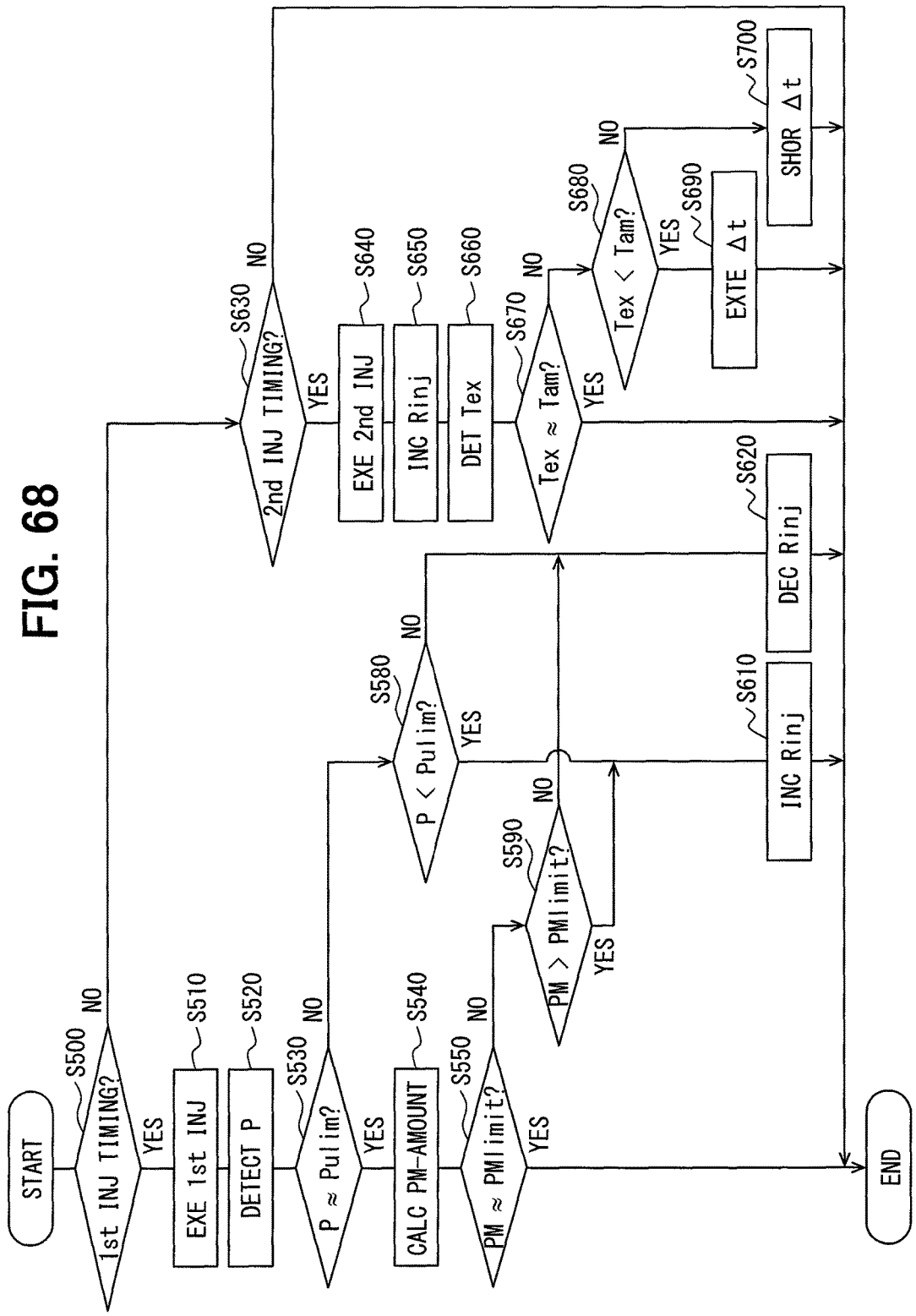
FIG. 68 is another flowchart different from that shown in FIG. 67.

An example of the control according to another example will be described with reference to FIG. 68. FIG. 68 transforms a part of the flowchart in FIG. 67. In other words, S260, S270, and S300 in FIG. 67 are deleted. Instead of a process of calculating the increase rate of the in-cylinder pressure corresponding to S240, the amount of PM contained in the exhaust gas in S540 is detected by a PM sensor. It is assumed that the PM sensor is a conventional PM sensor disposed on a downstream side of the exhaust passage 624 with respect to the exhaust gas purification device 626. Instead of the determination of whether the increase rate of the in-cylinder pressure substantially coincides with the allowable maximum increase rate "Ram", or not, in correspondence with S250, it is determined whether the amount of PM detected by the PM sensor substantially coincides with the allowable upper limit amount "PMlimit", or not, in S550. Instead of the determination of whether the increase rate of the in-cylinder pressure is smaller than the allowable maximum increase rate "Ram", or not, in correspondence with S290, it is determined whether the amount of PM detected by the PM sensor is larger than the allowable upper limit amount "PMlimit", or not, in S590.

A specific processing content of the changed portions will be described.

The PM sensor is allowed to detect the amount of PM in S540, and the processing proceeds to S550. In S550, it is determined whether the amount of PM detected by the PM sensor substantially coincides with the allowable upper limit amount, or not. When the detected amount of PM substantially coincides with the allowable upper limit amount (YES in S550), the control is completed. When the detected amount of PM does not substantially coincide with the allowable upper limit amount (NO in S550), the processing proceeds to S590. In S590, it is determined whether the detected amount of PM is larger than the allowable upper limit amount, or not. When it is determined that the detected amount of PM is larger than the allowable upper limit amount (YES in S590), the processing proceeds to S610. When it is determined that the detected amount of PM is smaller than the allowable upper limit amount (NO in S590), the processing proceeds to S620.

The processing of S200, S210, S220, S230, S280, S310, S320, S330, S340, S350, S360, S370, S380, S390, and S400 in FIG. 67 is identical with the processing of S500, S510, S520, S530, S580, S610, S620, S630, S640, S650, S660, S670, S680, S690, and S700 in FIG. 68, respectively.

Under the above control, the injection rate "Rinj" of the first injection is controlled so that the amount of PM generated by the first combustion is maintained at a predetermined allowable upper limit amount. As a result, the cooling loss can be minimized while the generated amount of PM is reduced more than the allowable upper limit amount.

In this example, the injection rate "Rinj" of the first injection is controlled so that the amount of PM detected by the PM sensor substantially coincides with the allowable upper limit amount. However, the present invention is not limited to the injection rate "Rinj" of the first injection. For example, a spread angle of the fuel spray in the first injection or the injection period $\Delta t$ of the first injection may be controlled so that the amount of PM substantially coincides with the allowable upper limit amount.

It is assumed that the spread angle of the fuel spray in the first injection is controlled so that the amount of PM substantially coincides with the allowable upper limit amount. When the amount of PM is larger than the allowable upper limit amount, the spread angle of the fuel spray in the first injection in the next combustion cycle is adjusted to increase. In other words, instead of the injection rate increase adjustment of the first injection corresponding to S610 of FIG. 68, the spread angle of the fuel spray in the first injection in the next combustion cycle is adjusted to increase. The spread angle of the fuel spray can be adjusted by switching an injection hole used for injection to another in the fuel injector 618 having multiple injection holes different in injection hole diameter. With this configuration, because the fuel is also injected in a direction other than a center of the combustion chamber 610a, an air-fuel mixture higher in concentration of the fuel can be restrained from being produced in the center of the combustion chamber 610a. On the other hand, when the spread angle of the fuel spray is excessively large, the fuel is also sprayed in a wall surface direction of the combustion chamber 610a, resulting in a risk that the combustion is generated in the vicinity of the wall surface. In that case, the cooling loss is increased. Hence, if the amount of PM is smaller than the allowable upper limit amount, the spread angle of the fuel spray of the first injection in the next combustion cycle is adjusted to decrease. In other words, instead of the injection rate decrease adjustment of the first injection corresponding to S620 of FIG. 68, the spread angle of the fuel spray of the first injection in the next combustion cycle is adjusted to decrease. With this configuration, the cooling loss can be minimized within a range in which the amount of PM falls within the allowable upper limit amount.

It is assumed that the injection period $\Delta t$ of the first injection is controlled so that the amount of PM substantially coincides with the allowable upper limit amount. When the amount of PM is larger than the allowable upper limit amount, the injection period $\Delta t$ of the first injection in the next combustion cycle is adjusted to decrease. In other words, instead of the injection rate increase adjustment of the first injection corresponding to S610 of FIG. 68, the injection period $\Delta t$ of the first injection in the next combustion cycle is adjusted to decrease. With this configuration, because the fuel injection amount injected by the first injection is decreased, the concentration of the air-fuel mixture produced in the center of the combustion chamber 610a can be lowered, and therefore the generation of the PM can be suppressed. On the other hand, the injection period $\Delta t$ of the first injection is excessively shortened, the maximum in-cylinder pressure Pmax generated by the first combustion does not reach the allowable upper limit pressure "Pulim", and the power of the engine 610 is decreased. In that case, the injection rate "Rinj" of the first injection in the next combustion cycle may be increased while the corrected injection period of the first injection is kept as it is. When the amount of PM is smaller than the allowable upper limit amount, the injection period Δt of the first injection in the next combustion cycle is adjusted to be extended. In other words, instead of the injection decrease adjustment of the first injection corresponding to S620 of FIG. 68, the injection period Δt of the first injection in the next combustion cycle is adjusted to be extended.

In the injection processing of the divided injection illustrated in FIG. 67, the injection rate "Rinj" of the first injection is adjusted in S310 and S320. In particular, S310 or S320 that is executed upon receiving the determination of whether the increase rate of the in-cylinder pressure is smaller than the allowable maximum increase rate "Ram", or not, in correspondence with S290, or the determination of whether the peak of the degree of the vibration is smaller than the allowable maximum degree "VBam", or not, in correspondence with S300 is assumed. In that case, because the injection rate "Rinj" of the first injection is adjusted in a state where the in-cylinder pressure substantially coincides with the allowable upper limit pressure "Pulim", there is a concern that it is determined that the in-cylinder pressure does not substantially coincide with the allowable upper limit pressure "Pulim" in S230, in again implementing the injection processing of the divided injection in the next combustion cycle. Therefore, in S310 or S320 that is executed upon receiving the determination processing of S290 or S300, the injection rate "Rinj" of the first injection is adjusted, and the allowable upper limit pressure "Pulim" may be changed.

Specifically, when the injection rate "Rinj" of the first injection is adjusted to increase in S310, the allowable upper limit pressure "Pulim" is corrected to increase by the amount of change of the in-cylinder pressure estimated to increase by incrementally adjusting the injection rate "Rinj". When the injection rate "Rinj" of the first injection is adjusted to decrease in S320, the allowable upper limit pressure "Pulim" is corrected to decrease by the amount of change of the in-cylinder pressure estimated to decrease by decrementally adjusting the injection rate "Rinj". This makes it possible to more surely achieve both of that the increase rate of the in-cylinder pressure substantially coincides with the allowable maximum increase rate "Ram" in the state where the in-cylinder pressure substantially coincides with the allowable upper limit pressure "Pulim", and that the maximum peak of the degree of vibration "VB" substantially coincides the allowable maximum degree "VBam". When the control according to this example is implemented, the allowable upper limit pressure "Pulim" is set to a value lower than an upper limit value of the in-cylinder pressure capable of maintaining the reliability of the engine 610. With this configuration, even if the injection rate "Rinj" of the first injection is adjusted to increase in S310, and the allowable upper limit pressure "Pulim" is corrected to increase with the adjustment, the allowable upper limit pressure "Pulim" can be restrained from being set to be higher than the upper limit value of the in-cylinder pressure capable of maintaining the reliability of the engine 610.

Figure 69:
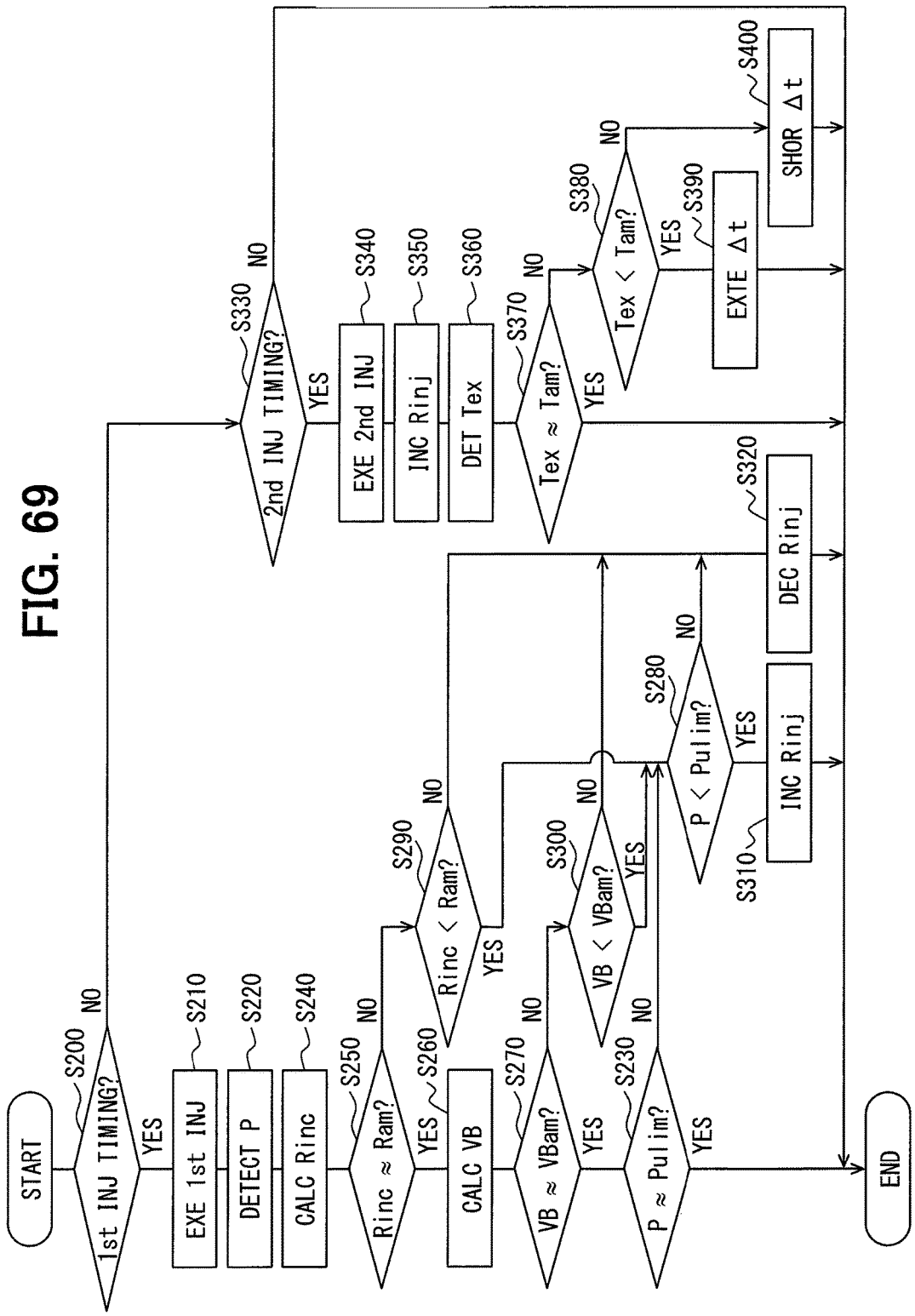
FIG. 69 is another flowchart different from that shown in FIG. 67.

In the injection processing of the divided injection illustrated in FIG. 67, after the first injection has been executed, it is first determined whether the in-cylinder pressure substantially coincides with the allowable upper limit pressure "Pulim", or not. However, there is no need to first determine whether the in-cylinder pressure substantially coincides with the allowable upper limit pressure "Pulim", or not. FIG. 69 illustrates an example of that case. In FIG. 69, in the determination of whether the maximum peak of the degree of vibration "VB" substantially coincides the allowable maximum degree "VBam", or not, in correspondence with S270, if the determination is positive, the determination of whether the in-cylinder pressure substantially coincides with the allowable upper limit pressure "Pulim", or not, in correspondence with S230, is implemented. The determination processing of whether the in-cylinder pressure is lower than the allowable upper limit pressure "Pulim", or not, in correspondence with S280, which is executed when it is determined that the in-cylinder pressure does not substantially coincide with the allowable upper limit pressure "Pulim" (NO in S230), is executed when the determination is positive in the determination processing in S290 or S300. As a result, even if the increase rate of the in-cylinder pressure is smaller than the allowable maximum increase rate "Ram", or even if the maximum peak of the degree of vibration "VB" is smaller than the allowable maximum degree "VBam", it is always determined whether the in-cylinder pressure is smaller than the allowable upper limit pressure "Pulim", or not, before implementing the increase adjustment processing of the injection rate "Rinj" of the first injection. Therefore, the increase adjustment processing of the injection rate "Rinj" of the first injection in correspondence with S310 can be implemented without increasing the in-cylinder pressure beyond the allowable upper limit pressure "Pulim".

In the above embodiment, when the present operating zone of the engine 610 is in the high load zone, the fuel injector 618 executes the divided injection. In this situation, the injection processing of the divided injection implements a control along a procedure of the flowchart illustrated in FIG. 67 uniformly regardless of the throttle position. In a configuration where a throttle position detection sensor 640 for detecting the position of the throttle valve 614a is installed in the engine 610, the content of the injection processing of the divided injection may be changed depending on whether the throttle position detected by the throttle position detection sensor 640 is a maximum position, or not. In another example 1, the throttle position detection sensor 640 corresponds to a throttle position acquisition unit.

Figure 70:
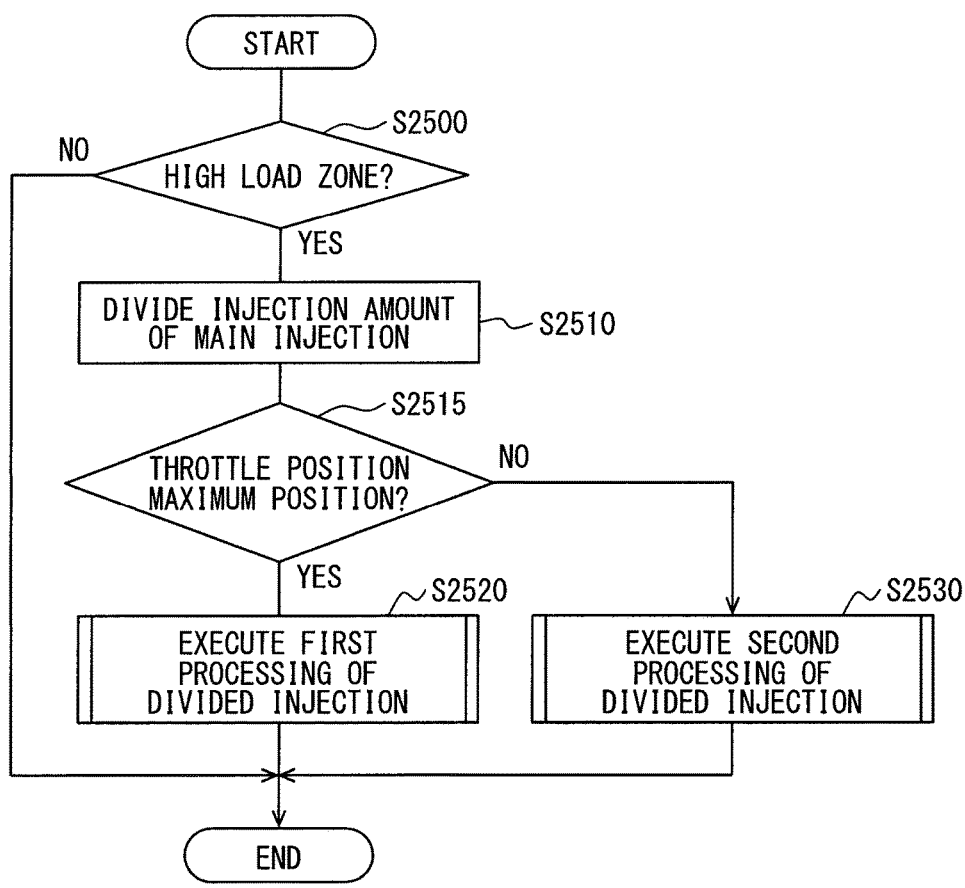
FIG. 70 is another flowchart different from that shown in FIG. 66.

FIG. 70 is a flowchart transforming a part of the flowchart in FIG. 66. In other words, S2515 is inserted between S2510 corresponding to S301 and S2520 corresponding to S302. In S2515, it is determined whether the position of the throttle valve 614a is a maximum position (WOT: wide open throttle), or not. When it is determined that the position of the throttle valve 614a is WOT (YES in S2515), the processing proceeds to S2520, the first processing of the divided injection is executed, and the control is completed. When it is determined that the position of the throttle valve 614a is not WOT (NO in S2515), the processing proceeds to S2530, the second processing of the divided injection is executed, and the control is completed. S2500 in FIG. 70 is identical with that in S300 of FIG. 66.

Then, the first processing of the divided injection executed by the ECU 630 will be described with reference to FIG. 71. The processing is sub-routine processing corresponding to S2520 in FIG. 70.

Figure 71:
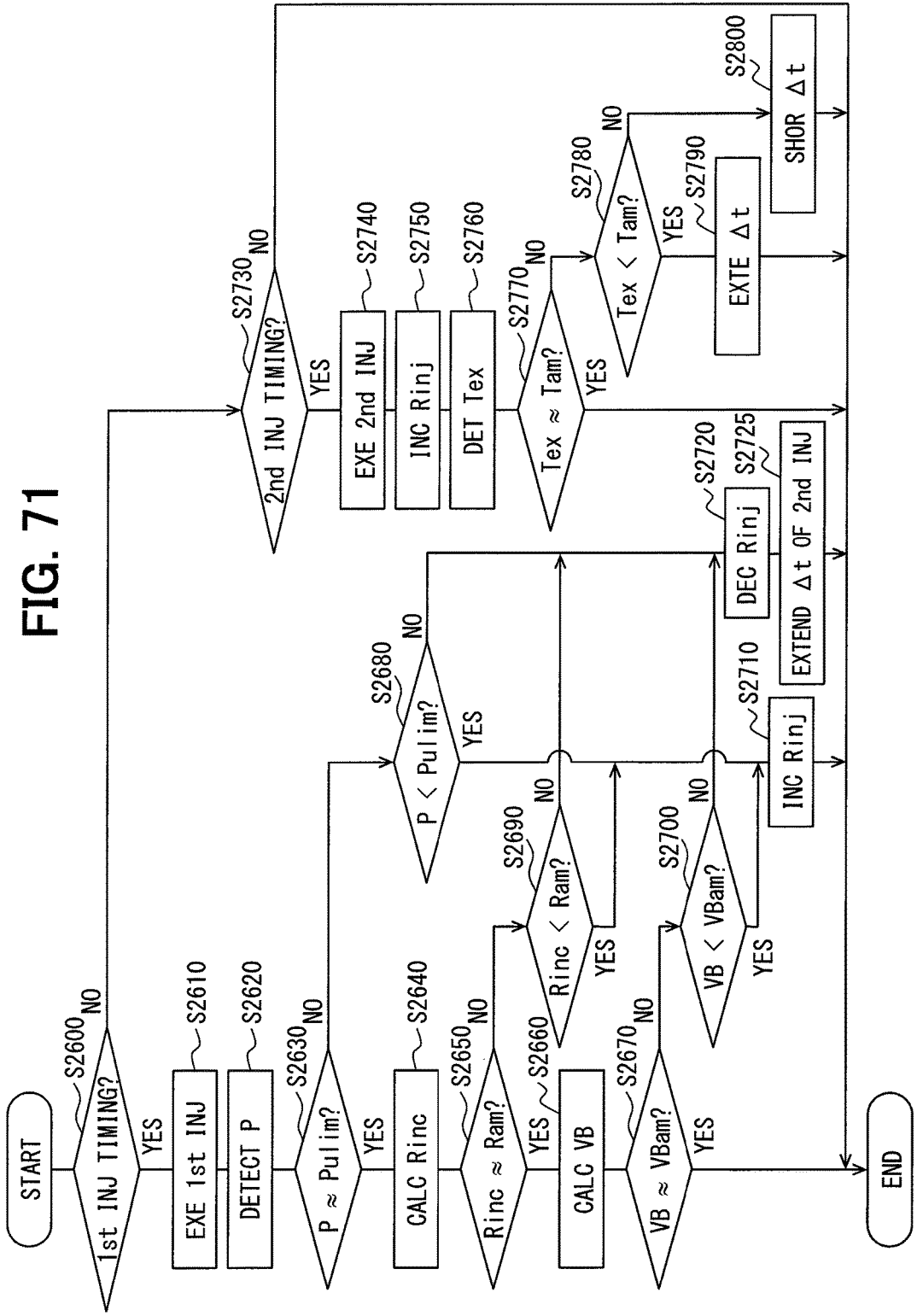
FIG. 71 is another flowchart different from that shown in FIG. 67.

FIG. 71 is a flowchart transforming a part of the flowchart in FIG. 67. In other words, S2725 that is a new step is executed after the processing of S2720 corresponding to S320 has been executed. In S2725, an injection period of the second injection is corrected to be extended at a maximum. With the correction, a period during which the in-cylinder pressure is controlled to the allowable upper limit pressure "Pulim" can be extended while the in-cylinder pressure is controlled so as not to increase beyond the allowable upper limit pressure "Pulim". For that reason, the period during which the power of the engine 610 is maintained at a high level can be extended.

The respective other steps other than S2720 in FIG. 71 are identical with the steps other than S320 in FIG. 67.

Then, the second processing of the divided injection executed by the ECU 630 will be described with reference to FIG. 72. The processing is sub-routine processing corresponding to S2530 in FIG. 70.

Figure 72:
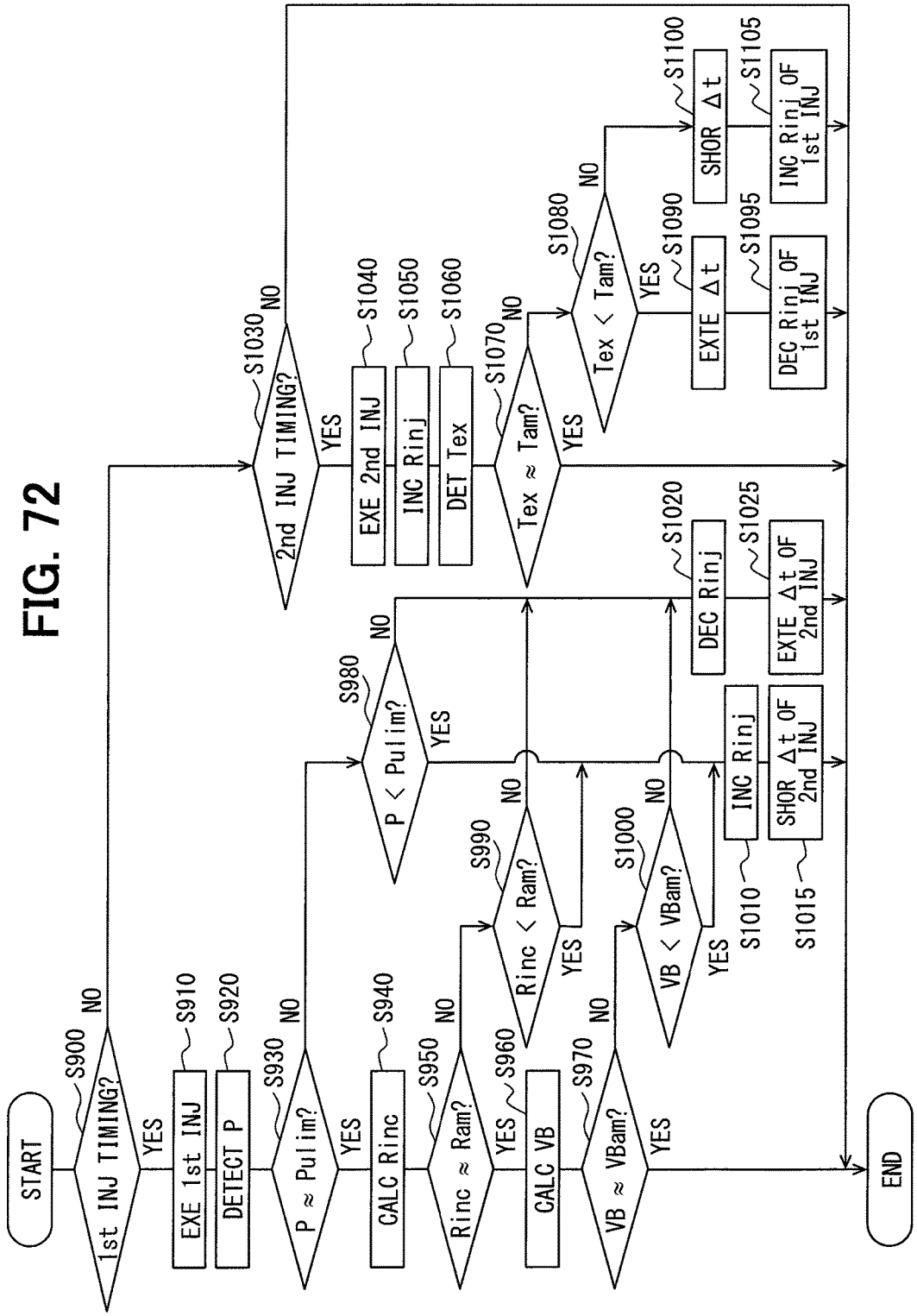
FIG. 72 is another flowchart different from that shown in FIG. 67.

FIG. 72 is a flowchart transforming a part of the flowchart in FIG. 67. In other words, S1015 that is a new step is executed after the processing of S1010 corresponding to S310 has been executed. In S1015, the injection period Δt of the second injection is corrected to be shortened so that the injection amount of the second injection is decreased by the fuel injection amount increased by the increase adjustment of the injection rate "Rinj" of the first injection which is executed in S1010. S1025 that is a new step is executed after the processing of S1020 corresponding to S320 has been executed. In S1025, the injection period Δt of the second injection is corrected to be extended so that the injection amount of the second injection is increased by the fuel injection amount decreased by the decrease adjustment of the injection rate "Rinj" of the first injection which is executed in S1020. S1095 that is a new step is executed after the processing of S1090 corresponding to S390 has been executed. In S1095, the injection rate "Rinj" of the first injection is corrected to decrease so that the injection amount of the first injection is decreased by the fuel injection amount increased by the extension adjustment of the injection period Δt of the second injection which is executed in S1090. S1105 that is a new step is executed after the processing of S1100 corresponding to S400 has been executed. In S1105, the injection rate "Rinj" of the first injection is corrected to increase so that the injection amount of the first injection is increased by the fuel injection amount decreased by the shortening adjustment of the injection period Δt of the second injection which is executed in S1100.

The respective other steps other than S1010, S1020, S1090, and S1100 in FIG. 72 are identical with the steps other than S310, S320, S390, and S400 in FIG. 67.

In the case where the position of the throttle valve 614a is not WOT, if one injection state of the first injection and the second injection is controlled, for example, so as to increase a total amount of the fuel injection amounts injected by the first injection and the second injection, there is a risk that the power of the engine 610 becomes higher than a power assumed by a driver. Therefore, in the case where the position of the throttle valve 614a is not WOT, in controlling the injection state of the first injection, the injection period Δt of the second injection is controlled so as not to change a total injection amount injected by the first injection and the second injection. Alternatively, in controlling the injection state of the second injection, the injection rate "Rinj" of the first injection is controlled so as not to change a total injection amount injected by the first injection and the second injection. As a result, the engine 610 can generate the power assumed by the driver.

In the above example, the injection rate "Rinj" of the first injection or the injection period Δt of the second injection is corrected taking the in-cylinder pressure, the increase rate of the in-cylinder pressure, the degree of vibration "VB" of the engine 610, and the exhaust gas temperature "Tex" into consideration. The amount of nitrogen oxide (NOx) generated by combusting the fuel may be taken into consideration. A larger amount of NOx is generated as a temperature (hereinafter referred to as "combustion temperature") during the combustion of the fuel is higher. Therefore, in this example applied to another example 1, the amount of NOx is estimated from the exhaust gas temperature "Tex" detected by the exhaust gas temperature detection sensor 633. Specifically, a map indicative of a relationship between the exhaust gas temperature "Tex" and the amount of NOx is stored in advance, and the amount of NOx contained in the exhaust gas is acquired from the map on the basis of the exhaust gas temperature "Tex" detected by the exhaust gas temperature detection sensor 633. For that reason, in this example, the exhaust gas temperature detection sensor 633 and the ECU 630 correspond to an NOx emission detection unit. Naturally, the method of inferring the amount of NOx is not limited to the above configuration, but the amount of NOx may be inferred from a level of the in-cylinder pressure detected by the in-cylinder pressure sensor 634. Alternatively, a pressure sensor for detecting the pressure of the exhaust gas may be provided, and the amount of NOx may be inferred from the detected pressure of the exhaust gas. The NOx sensor may be placed on a downstream side of the exhaust gas purification device 626, and the amount of NOx contained in the exhaust gas may be detected directly.

Specifically, the injection processing taking the amount of NOx contained in the exhaust gas will be described with reference to FIGS. 73 and 74. First, referring to FIG. 73, the first processing of the divided injection when the position of the throttle valve 614a is WOT will be described.

Figure 73:
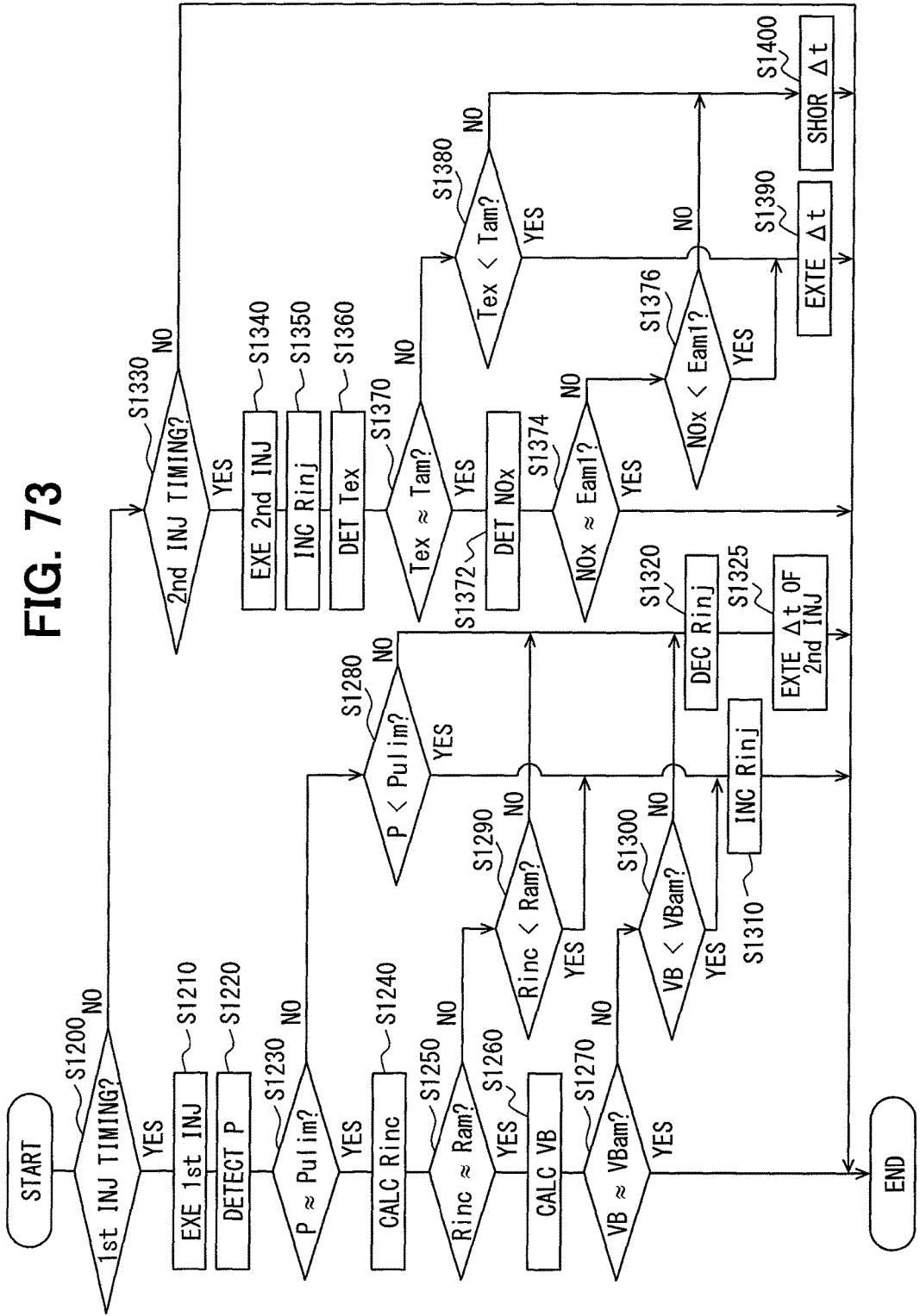
FIG. 73 is another flowchart different from that shown in FIG. 71.

FIG. 73 is a flowchart transforming a part of the flowchart in FIG. 71. In other words, in the determination processing in S1370 corresponding to S2770, if the determination is positive, S1372 and S1374 which are new steps are executed. In S1372, the amount of NOx contained in the exhaust gas is acquired from the map on the basis of the exhaust gas temperature "Tex" detected by the exhaust gas temperature detection sensor 633. In S1374, it is determined whether the acquired amount of NOx substantially coincides with a first allowable maximum emission, or not. When it is determined that the amount of NOx substantially coincides with the first allowable maximum emission (YES in S1374), the control is completed. When it is determined that the amount of NOx does not substantially coincide with the first allowable maximum emission (NO in S1374), the processing proceeds to S1376 that is a new step. In S1376, it is determined whether the amount of NOx is smaller than the first allowable maximum emission, or not. When it is determined that the amount of NOx is smaller than the first allowable maximum emission (YES in S1376), the processing proceeds to S1390 corresponding to S2790. When it is determined that the amount of NOx is larger than the first allowable maximum emission (NO in S1376), the processing proceeds to S1400 corresponding to S2800.

The respective other steps other than S1370, S1390, and S1400 in FIG. 73 are identical with the steps other than S2770, S2790, and S2800 in FIG. 71.

In a state where the position of the throttle valve 614a is WOT, the in-cylinder pressure is most likely to increase beyond the allowable upper limit pressure "Pulim". In this state, when the injection rate "Rinj" of the first injection is controlled to increase, for example, in response to a fact that the emission of NOx is lower than the first allowable maximum emission, there is a risk that the in-cylinder pressure increases beyond the allowable upper limit pressure "Pulim". Therefore, when the position of the throttle valve 614a is WOT, the injection period Δt of the second injection is controlled without any change in the injection state of the first injection. With this control, the emission of NOx can be controlled so as not to excessively increase while the in-cylinder pressure is restrained from increasing beyond the allowable upper limit pressure "Pulim".

Referring to FIG. 73, when the amount of NOx does not substantially coincide with the first allowable maximum emission, the injection period Δt of the second injection is appropriately adjusted. Instead of the appropriate adjustment of the injection period Δt of the second injection, the injection rate "Rinj" of the second injection may be appropriately adjusted.

Next, referring to FIG. 74, the second processing of the divided injection when the position of the throttle valve 614a is not WOT will be described. FIG. 74 is a flowchart transforming a part of the flowchart in FIG. 72. In other words, in the determination processing in S1570 corresponding to S970, if the determination is positive, S1572 and S1574 which are new steps are executed. The processing of S1572 and S1574 is identical with that of S1372 and S1374 illustrated in FIG. 73. In the determination processing in S1574, if the determination is positive, S1576 which is a new step is executed. Similarly, the processing in S1576 conforms to the processing of S1376 illustrated in FIG. 73. When the determination is positive in S1576, the processing proceeds to S1610 corresponding to S1010. When the determination is negative in S1576, the processing proceeds to S1620 corresponding to S1020.

Figure 74:
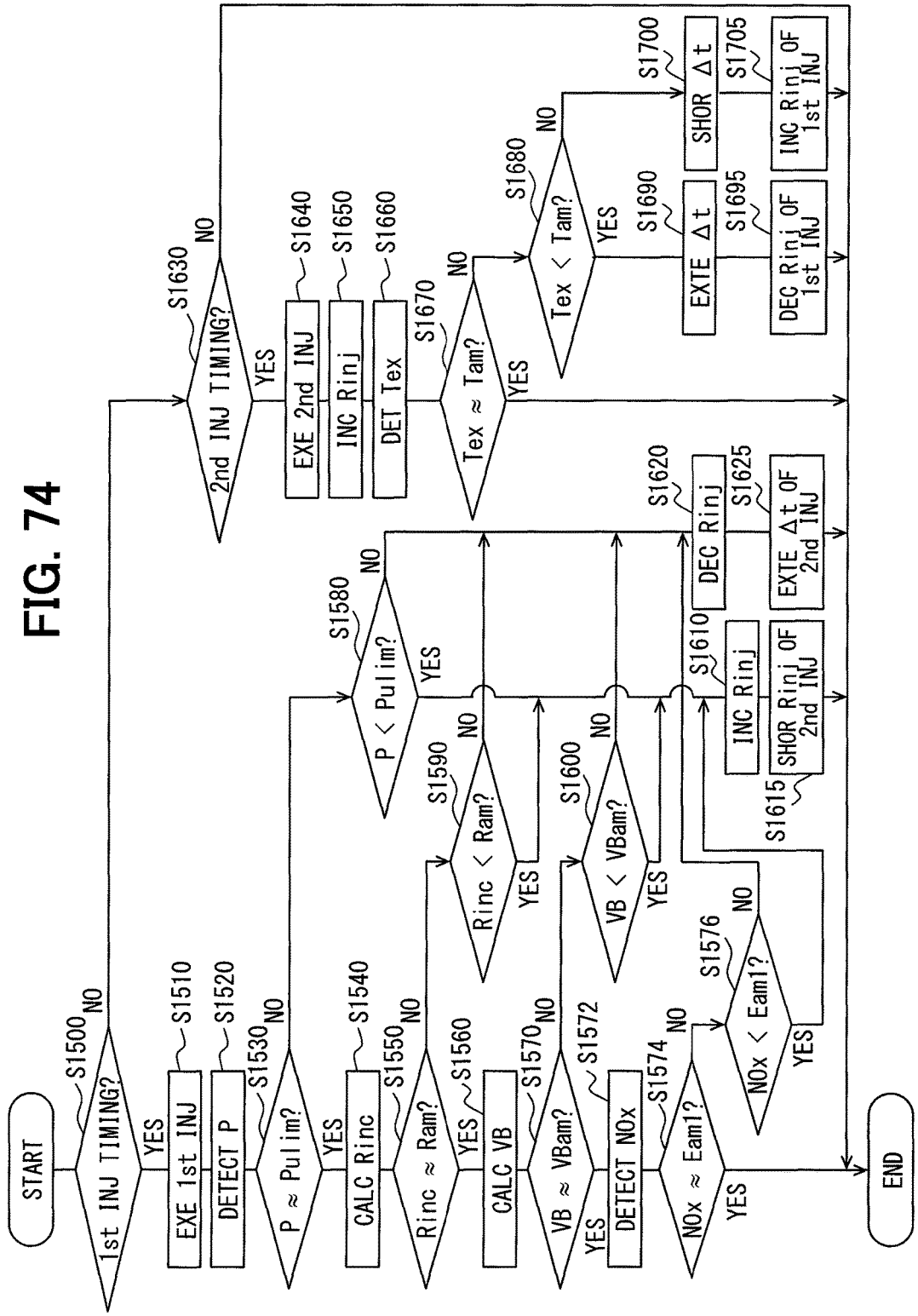
FIG. 74 is another flowchart different from that shown in FIG. 72.

The respective other steps other than S1570, S1610, and S1620 in FIG. 74 are identical with the steps other than S970, S1010, and S1020 in FIG. 72.

When the position of the throttle valve 614a is not WOT, a required injection amount required for the fuel injector 618 is relatively small, and the in-cylinder pressure is less likely to increase beyond the allowable upper limit pressure "Pulim". Therefore, when the position of the throttle valve 614a is not WOT, the injection rate "Rinj" of the first injection is controlled. As a result, the maximum peak of the combustion temperature of the fuel can be controlled so as not to excessively increase, and the emission of NOx can be more effectively suppressed.

In the above embodiment, the injection rate "Rinj" of the first injection is corrected taking the in-cylinder pressure, the increase rate of the in-cylinder pressure, or the degree of vibration "VB" of the engine 610 into consideration. Further, attention may be paid to the amount of uncombusted fuel (HC) contained in the exhaust gas. When the spray of the fuel is cooled in the vicinity of the wall surface in the combustion chamber 610a, a part of the fuel may be discharged without being combusted. The HC contained in the exhaust gas has a tendency to increase in amount as the combustion temperature is lower. Therefore, in this example, the amount of HC is inferred from the exhaust gas temperature "Tex" detected by the exhaust gas temperature detection sensor 633. Specifically, a map indicative of a relationship between the exhaust gas temperature "Tex" and the amount of HC is stored in advance, and the amount of HC contained in the exhaust gas is acquired from the map on the basis of the exhaust gas temperature "Tex" detected by the exhaust gas temperature detection sensor 633. For that reason, in this example, the exhaust gas temperature detection sensor 633 and the ECU 630 correspond to an uncombusted fuel emission detection unit. Naturally, the method of inferring the amount of HC is not limited to the above configuration, but the amount of HC may be inferred from a level of the in-cylinder pressure detected by the in-cylinder pressure sensor 634. Alternatively, a pressure sensor for detecting the pressure of the exhaust gas may be provided, and the amount of HC may be inferred from the detected pressure of the exhaust gas. The HC detection sensor may be placed on a downstream side of the exhaust gas purification device 626, and the amount of HC contained in the exhaust gas may be detected directly.

Figure 75:
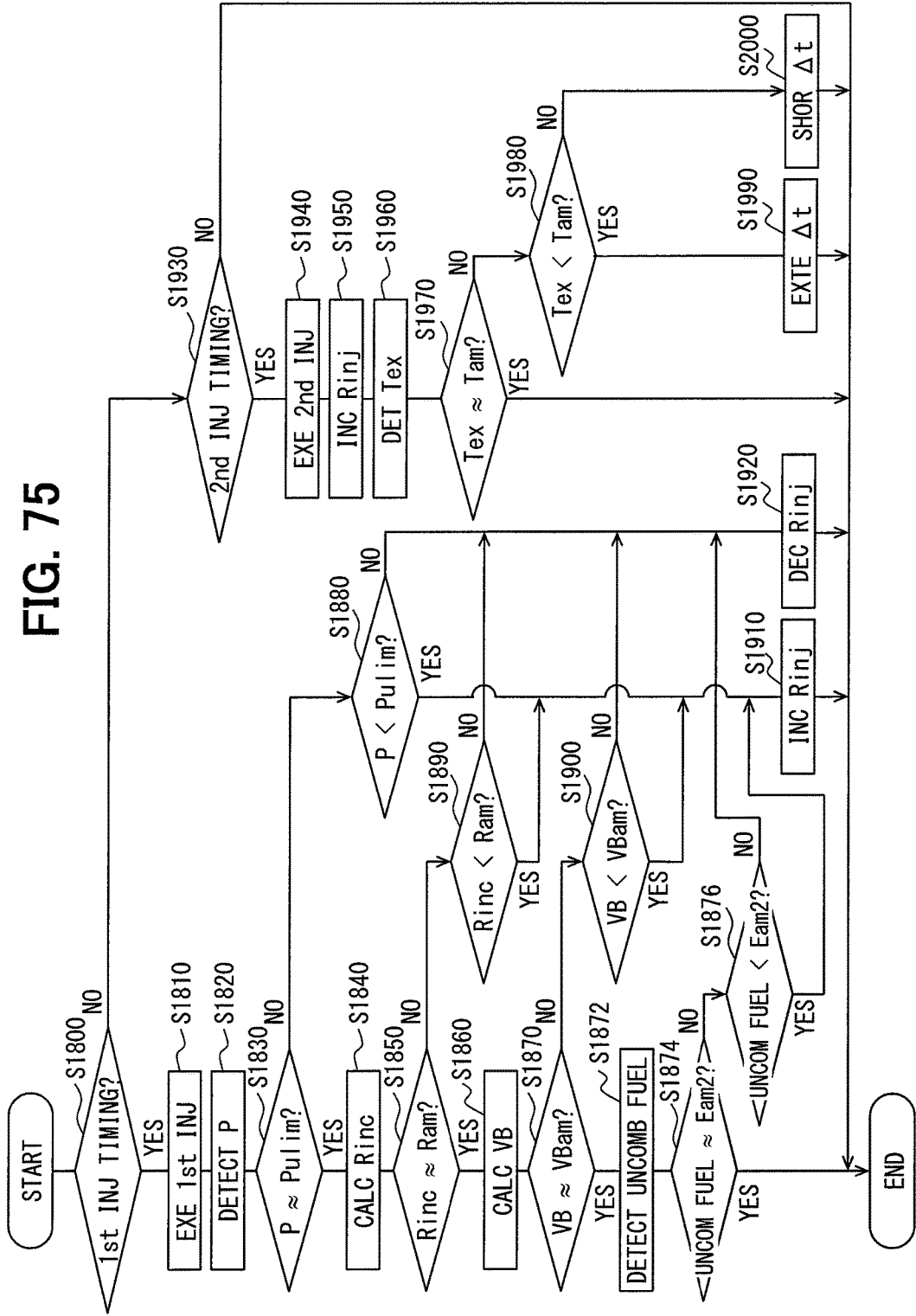
FIG. 75 is another flowchart different from that shown in FIG. 67.

Specifically, the injection processing taking the amount of HC contained in the exhaust gas into consideration will be described with reference to FIG. 75. FIG. 75 is a flowchart transforming apart of the flowchart in FIG. 67. In other words, in the determination processing in S1870 corresponding to S270, if the determination is positive, S1872 and S1874 which are new steps are executed. In S1872, the amount of HC contained in the exhaust gas is acquired from the map on the basis of the exhaust gas temperature "Tex" detected by the exhaust gas temperature detection sensor 633. In S1874, it is determined whether the acquired amount of HC substantially coincides with a second allowable maximum emission, or not. When it is determined that the amount of HC substantially coincides with the second allowable maximum emission (YES in S1874), the control is completed. When it is determined that the amount of HC does not substantially coincide with the second allowable maximum emission (NO in S1874), the processing proceeds to S1876 that is a new step. In S1876, it is determined whether the amount of HC is smaller than the second allowable maximum emission, or not. When it is determined that the amount of HC is smaller than the second allowable maximum emission (YES in S1876), the processing proceeds to S1910 corresponding to S310. When it is determined that the amount of HC is larger than the second allowable maximum emission (NO in S1876), the processing proceeds to S1920 corresponding to S320.

As a result, the diesel engine can obtain high power without excessively increasing the amount of uncombusted fuel mixed into the exhaust gas.

The control so as not to change a total injection amount of the first injection and the second injection described in another example 1 may be applied to the embodiment or a different example.

The processing for the exhaust gas temperature "Tex" may be omitted in FIG. 73, the processing for the increase rate of the in-cylinder pressure may be omitted in FIG. 74, or the processing for the increase rate of the in-cylinder pressure may be omitted in FIG. 75. The processing (S1872 to S1876 in FIG. 75) for suppressing the uncombusted fuel in the first injection may be executed, or the processing (S1374 to S1376) for suppressing NOx in the second injection may be executed. In other words, the processing for the first injection and the processing for the second injection described above may be appropriately executed in combination.

What is claimed is:

1. A fuel injection device that is applied to a diesel engine including a fuel injector that injects a fuel directly into a combustion chamber, and a state detection unit that detects a combustion state of the fuel, the fuel injection device executing a fuel injection including a first injection and a second injection when a load of the diesel engine falls within a predetermined high load zone, the fuel injection device comprising:
   a computer processing system and storage memory storing instructions which upon execution by the computer processing system at least provide:
      a first injection unit configured to execute the first injection at an injection rate higher than the injection rate of the second injection so as to increase a pressure in the combustion chamber up to a predetermined allowable upper limit pressure;

a second injection unit configured to execute the second injection at the injection rate gradually increasing with an enlargement of a combustion chamber volume in an expansion stroke of the engine after the first injection so as to maintain the pressure in the combustion chamber at the allowable upper limit pressure; and a control unit configured to control an injection state of at least one of the first injection and the second injection to put the combustion state detected by the state detection unit into a predetermined allowable state, wherein the first injection is completed when a piston of the diesel engine reaches a compression top dead center, and the second injection is started immediately after the first injection is completed when the piston reaches the compression top dead center.

2. The fuel injection device according to claim 1, wherein the diesel engine includes an exhaust passage into which an exhaust gas exhausted from the combustion chamber flows, the exhaust passage includes a catalyst for purifying the exhaust gas, the state detection unit includes a temperature detection unit configured to detect an exhaust gas temperature on a downstream side of the catalyst, and the control unit is configured to control an injection period of the second injection to maintain the exhaust gas temperature detected by the temperature detection unit at a predetermined allowable maximum temperature.

3. The fuel injection device according to claim 1, wherein the control unit is configured to control the injection rate of the first injection to maintain an increase rate of a pressure in the combustion chamber, which increases by execution of the first injection by the first injection unit at a predetermined allowable maximum increase rate.

4. The fuel injection device according to claim 1, wherein the state detection unit includes a vibration detection unit configured to detect the degree of vibration caused by the combustion of the fuel generated in the combustion chamber, and the control unit is configured to control the injection rate of the first injection to maintain the degree of vibration detected by the vibration detection unit at a predetermined allowable maximum degree.

5. The fuel injection device according to claim 4, wherein the vibration detection unit includes an acceleration sensor that is installed in the diesel engine, and is configured to detect an acceleration caused by the vibration of the diesel engine.

6. The fuel injection device according to claim 4, wherein the vibration detection unit includes a rotation angle sensor configured to detect a rotation speed of an output shaft of the diesel engine, and the control unit is configured to calculate the degree of vibration on the basis of the rotation speed detected by the rotation angle sensor.

7. The fuel injection device according to claim 1, wherein the state detection unit includes a combustion sound detection unit configured to detect a magnitude of a combustion sound of the fuel generated in the combustion chamber, and the control unit is configured to control the injection rate of the first injection to maintain the magnitude of the combustion sound detected by the combustion noise detection unit at a predetermined allowable maximum volume.

8. The fuel injection device according to claim 1, wherein the state detection unit includes an NOx emission detection unit configured to detect the amount of emission of NOx generated at the time of combusting the fuel, and the control unit is configured to control the injection state of at least one of the first injection and the second injection to maintain the amount of emission of NOx detected by the NOx emission detection unit at a predetermined first allowable maximum emission.

9. The fuel injection device according to claim 8, wherein the diesel engine includes a throttle position acquisition unit configured to acquire a position of a throttle valve, and the control unit is configured to control the injection period of the second injection to maintain the amount of emission of NOx detected by the NOx emission detection unit at the first allowable maximum emission when the position of the throttle valve acquired by the throttle position acquisition unit is a maximum position, and control the injection rate of the first injection to maintain the amount of emission of NOx detected by the NOx emission detection unit at the first allowable maximum emission when the position of the throttle valve acquired by the throttle position acquisition unit is smaller than the maximum position.

10. The fuel injection device according to claim 1, wherein the state detection unit includes an uncombusted fuel emission detection unit configured to detect the amount of emission of uncombusted fuel which is emitted without being combusted in the fuel injected into the combustion chamber, and the control unit is configure to control the injection rate of the first injection to maintain the amount of emission of uncombusted fuel detected by the uncombusted fuel emission detection unit at a predetermined second allowable maximum emission.

11. The fuel injection device according to claim 1, wherein the control unit is configured to control the injection rate of the first injection to maintain the amount of PM contained in the exhaust gas generated in the combustion chamber at a predetermined allowable upper limit amount.

12. The fuel injection device according to claim 1, wherein the control unit is configured to control a spread angle of fuel spray in the first injection to maintain the amount of PM contained in the exhaust gas generated in the combustion chamber at a predetermined allowable upper limit amount.

13. The fuel injection device according to claim 1, wherein the control unit is configured to control an injection period of the first injection to maintain the amount of PM contained in the exhaust gas generated in the combustion chamber at a predetermined allowable upper limit amount.

14. The fuel injection device according to claim 1, wherein the first injection and the second injection are two injections having the largest injection amount in the fuel injections executed in one combustion cycle.

15. The fuel injection device according to claim 1, wherein
- the diesel engine includes a throttle position acquisition unit is configured to acquire a position of a throttle valve, and
- the control unit is configured so that when the control unit controls one injection state of the first injection and the second injection in a state where the position of the throttle valve acquired by the throttle position acquisition unit is smaller than a maximum position, the control unit controls the other injection state of the first injection and the second injection to maintain a total injection amount injected by the first injection and the second injection without any change.

* * * * *